(12) United States Patent
Eddé et al.

(10) Patent No.: US 12,265,945 B1
(45) Date of Patent: Apr. 1, 2025

(54) INVENTORY MANAGEMENT WITH AUTOMATIC ALIGNMENT OF BALANCES ACROSS MULTIPLE ORTHOGONAL CATEGORIZATION SCHEMES

(71) Applicant: Murex S.A.S., Paris (FR)

(72) Inventors: Elias Eddé, Paris (FR); Heykel Jelassi, Paris (FR)

(73) Assignee: Murex S.A.S., Paris (FR)

( * ) Notice: Subject to any disclaimer, the term of this patent is extended or adjusted under 35 U.S.C. 154(b) by 0 days.

(21) Appl. No.: 18/783,387

(22) Filed: Jul. 24, 2024

Related U.S. Application Data

(63) Continuation of application No. PCT/EP2024/062993, filed on May 10, 2024.

(30) Foreign Application Priority Data

Oct. 27, 2023  (EP) .................................. 23306875.8

(51) Int. Cl.
 *G06Q 10/087* (2023.01)
(52) U.S. Cl.
 CPC .................................. *G06Q 10/087* (2013.01)
(58) Field of Classification Search
 None
 See application file for complete search history.

(56) References Cited

U.S. PATENT DOCUMENTS

| | | | | |
|---|---|---|---|---|
| 8,204,809 B1 * | 6/2012 | Wise | ...................... | G06Q 40/06 705/36 R |
| 8,306,888 B2 | 11/2012 | Blasnik et al. | | |
| 8,781,882 B1 * | 7/2014 | Arboletti | ............ | G06Q 10/0639 705/7.41 |
| 9,454,526 B1 | 9/2016 | Kapoor et al. | | |
| 10,943,199 B1 * | 3/2021 | Nidy | .................. | G06Q 30/0643 |
| 2002/0035495 A1 * | 3/2002 | Spira | .................. | G06Q 10/0637 705/7.36 |

(Continued)

FOREIGN PATENT DOCUMENTS

EP         4002259 A1      5/2022

OTHER PUBLICATIONS

Extended European Search Report, EP App. No. 23306875.8, Jan. 25, 2024, 13 pages.

(Continued)

*Primary Examiner* — Fateh M Obaid
(74) *Attorney, Agent, or Firm* — Nicholson De Vos Webster & Elliott LLP

(57) ABSTRACT

According to one aspect, responsive to an event that reflects a change made to inventory relative to a first categorization scheme, a first entry is generated that identifies that a quantity is to be used a first way to update a balance for an item type and a first category of the first categorization scheme, and that the quantity is to be used a second opposite way to update a balance that for the item type. Also, responsive to automatically determining that no entry was generated for the second categorization scheme, a second entry is automatically generated that identifies the quantity is to be used the second way to update to a balance for the item type, and that the quantity is to be used the first way to update a balance for the item type and a default category of the second categorization scheme.

28 Claims, 53 Drawing Sheets

(56) References Cited

U.S. PATENT DOCUMENTS

| | | | |
|---|---|---|---|
| 2002/0091991 A1* | 7/2002 | Castro | G06F 9/06 |
| | | | 717/106 |
| 2015/0006335 A1* | 1/2015 | Vasantham | G06Q 20/203 |
| | | | 705/28 |
| 2018/0249452 A1* | 8/2018 | Lee | H04L 5/0021 |
| 2019/0080399 A1* | 3/2019 | Jain | G06Q 40/03 |
| 2019/0124681 A1* | 4/2019 | Lee | H04L 1/0031 |
| 2021/0166330 A1 | 6/2021 | Baker et al. | |
| 2021/0269862 A1* | 9/2021 | Quake | C12Q 1/686 |
| 2021/0350010 A1 | 11/2021 | Schvey et al. | |
| 2023/0153755 A1* | 5/2023 | Thunhorst | G06Q 10/20 |
| | | | 705/29 |

OTHER PUBLICATIONS

International Search Report and Written Opinion, App. No. PCT/EP2024/062993, Jun. 17, 2024, 18 pages.
Axoni's Technology, 2023, 7 pages, Schvey, Inc.
Axoni's, 2023, 5 pages, Schvey, Inc.
Bookkeeping, 2023, 6 pages, Wikipedia.
Double-entry bookkeeping, 2023, 8 pages, Wikipedia.
General ledger, 2023, 2 pages, Wikipedia.
"How Double-Entry Bookkeeping Works in a General Ledger," Aug. 31, 2021, 6 pages, The Investopedia Team.
Ledger, 2023, 6 pages, Dictionary.com.
Ledger, 2023, 12 pages, Merriam Webster.
Ledger, 2023, 3 pages, Wikipedia.
"What is Ledger in Accounting?," 2023, 16 pages, WallStreetMojo.

* cited by examiner

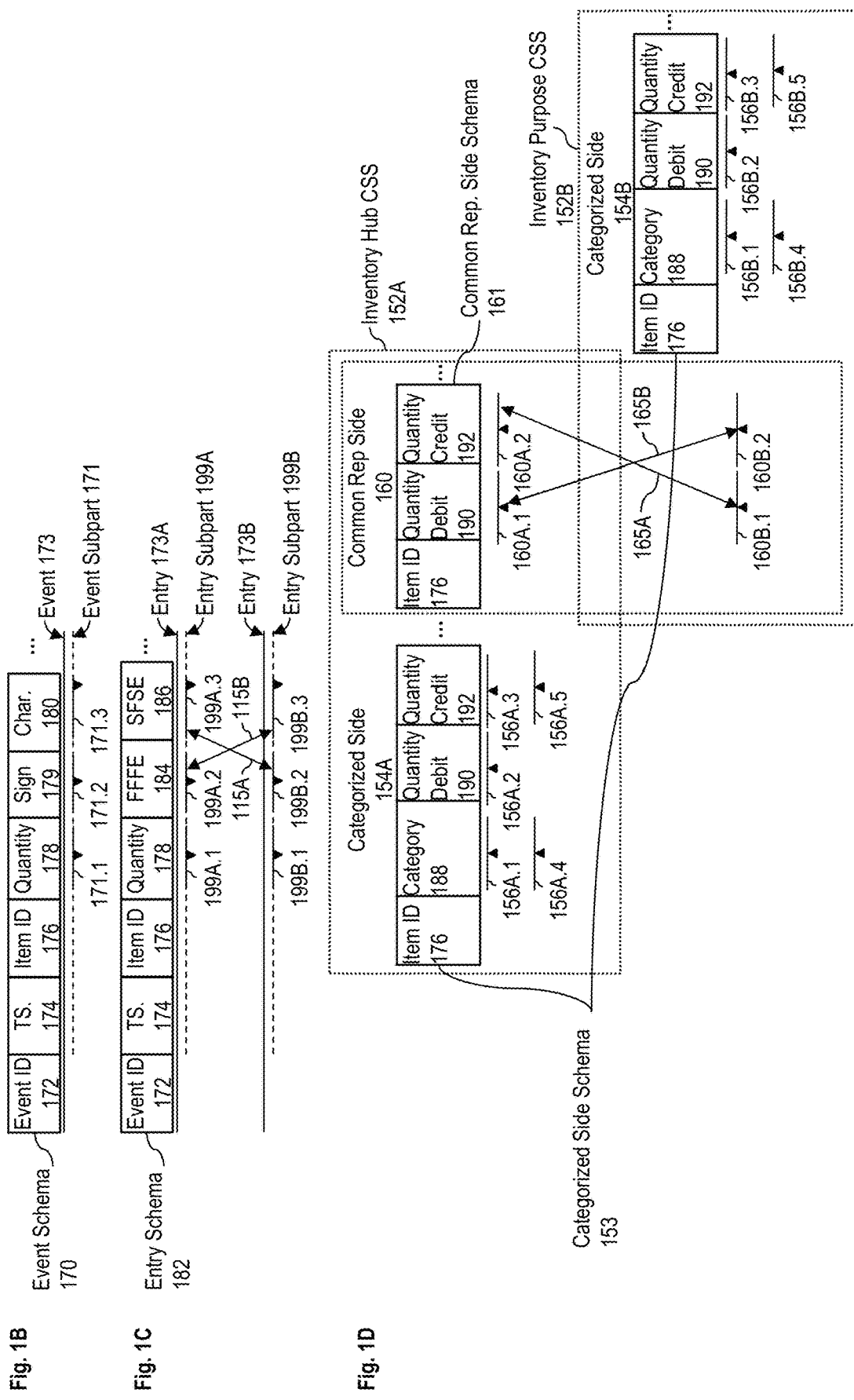

Fig. 1E Configuration 130

Orthogonal Categorization Schemes Def. 131

| Categories Def. 133 | Inventory Hub CS ID 132A<br>CS1 | Inventory Purpose CS ID 132B<br>CS2 |
|---|---|---|
| CG1.1 | x | |
| CG1.M | x | |
| CG2.1 | | x |
| CG2.N | | x |
| ... | ... | ... |

Categorization Scheme (CS) IDs 132

Mappings Def. 134

Fig. 1F

| Type | CS | Categories | Dimension | Purpose | Exemplary Application 1 |
|---|---|---|---|---|---|
| Orthogonal | CS1 (Inventory Hub CS) | CG1 Categories | Dimension1 | Track and manage inventory (aspect1) by Dimension1. | Dimension1 = Location of item.<br>CG1 Categories = Different locations.<br>Purpose = Track and manage inventory by the locations. |
| | CS2 (Inventory Purpose CS) | CG2 Categories | Dimension2 | Track and manage apect2 by Dimension2. | Dimension2 = Division within the organization responsible for the items.<br>CG2 Categories = Different divisions in the organization.<br>Purpose = Track and manage performance for inflow and outflow of items by the divisions (e.g., business units) |

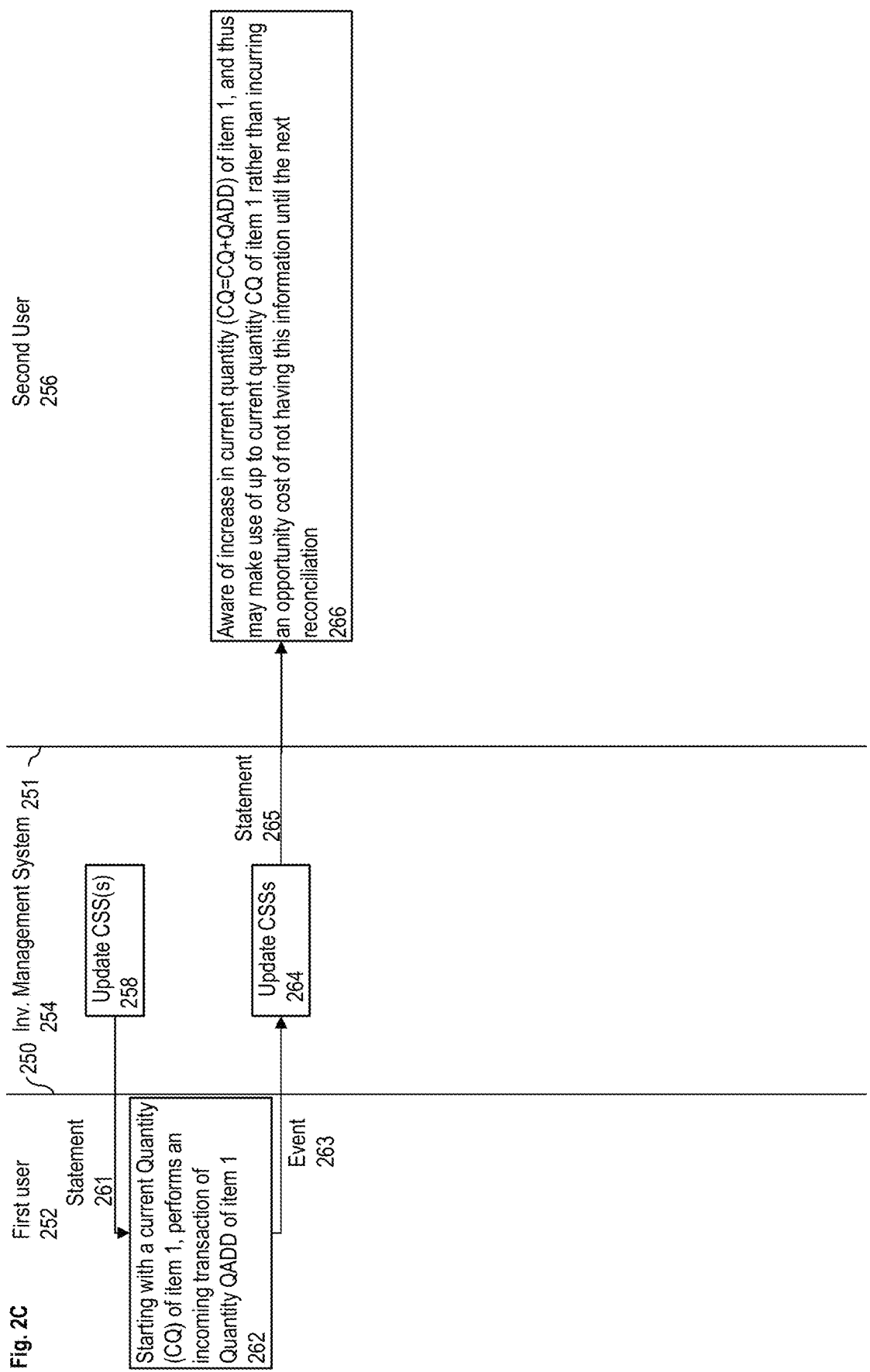

Fig. 5A

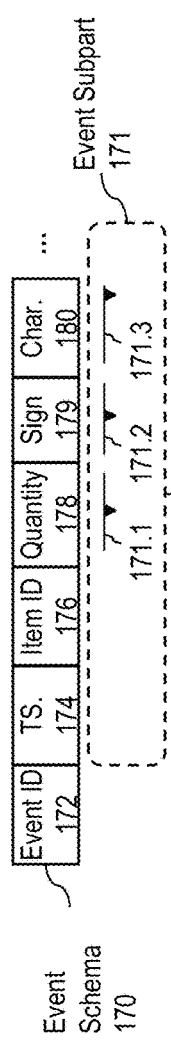

Event Schema 170

| Event ID 172 | TS. 174 | Item ID 176 | Quantity 178 | Sign 179 | Char. 180 | ... |

Event Subpart 171 (171.1, 171.2, 171.3)

| | Determined from Content of the Event | | | Update Categorized Side | | | Update Comm Rep Side | |
|---|---|---|---|---|---|---|---|---|
| Sign | CS | FFFE | SFSE | Impacted Categories | Quantity Debit | Quantity Credit | Quantity Debit | Quantity Credit |
| Hub Positive Transfer 510A | + | Inv. Hub CS | Dest. Cat. | Src. Cat. (may be Default) | Dest. Cat. | Quantity | 0 | NA | NA |
| Hub Negative Transfer 510B | − | Inv. Hub CS | Src. Cat. (may be Default) | Dest. Cat. | Src. Cat. (may be Default) | 0 | Quantity | NA | NA |
| Purpose Positive Transfer 510C | + | Inv. Purpose CS | Src. Cat. (may be Default) | Dest. Cat. | Src. Cat. (may be Default) | Quantity | 0 | NA | NA |
| Purpose Negative Transfer 510D | − | Inv. Purpose CS | Dest. Cat. | Src. Cat. (may be Default) | Src. Cat. (may be Default) | 0 | Quantity | NA | NA |

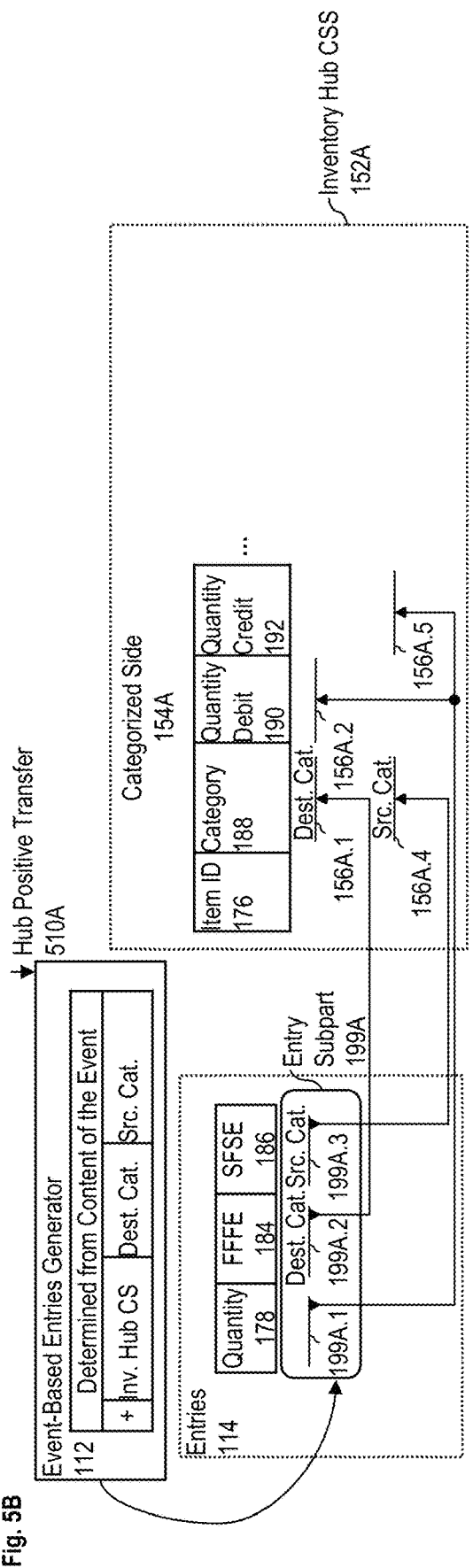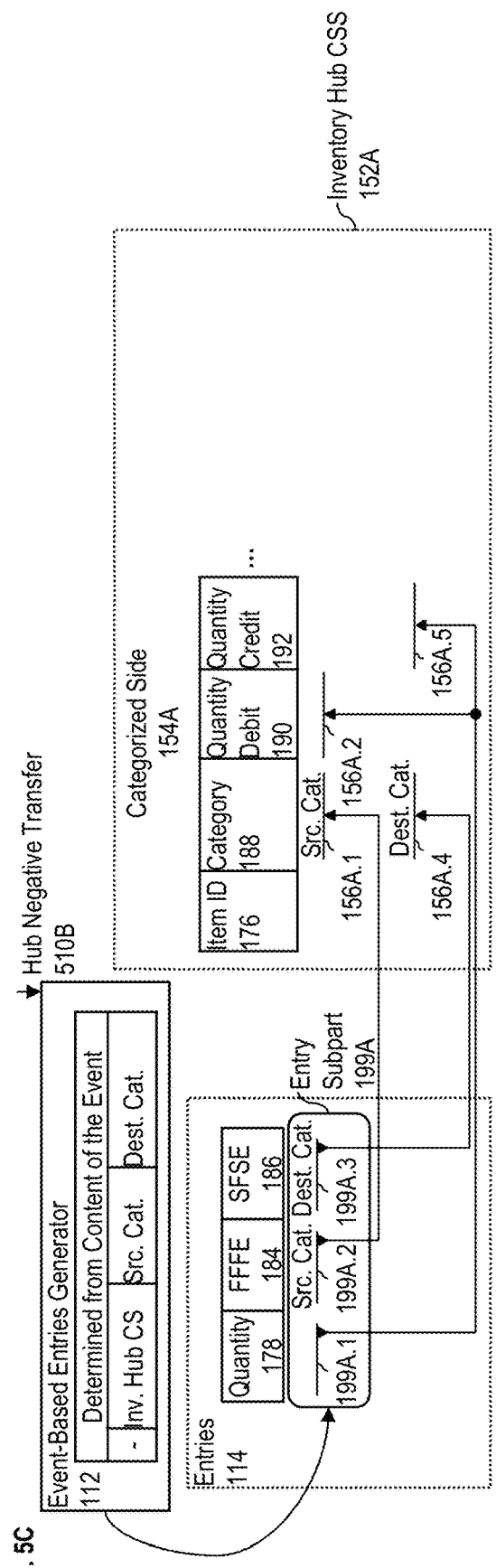

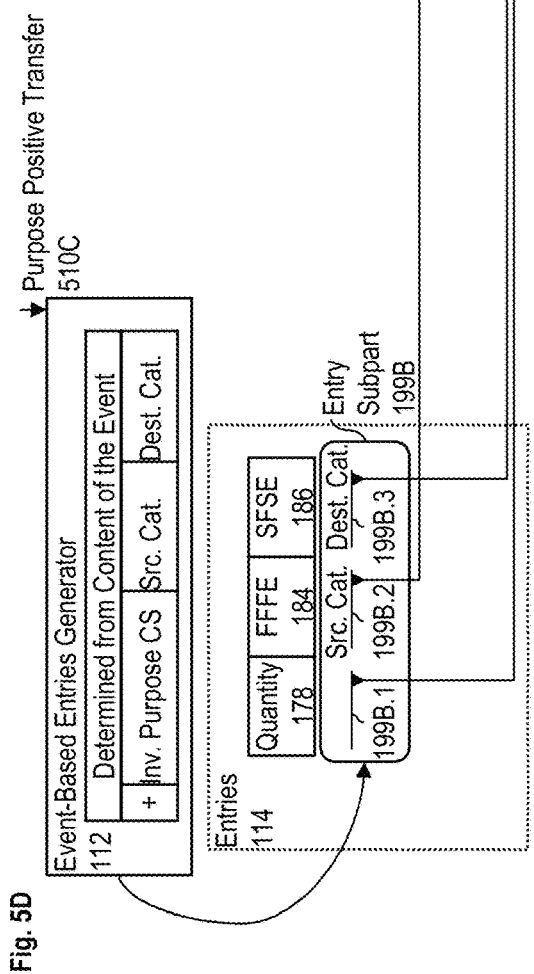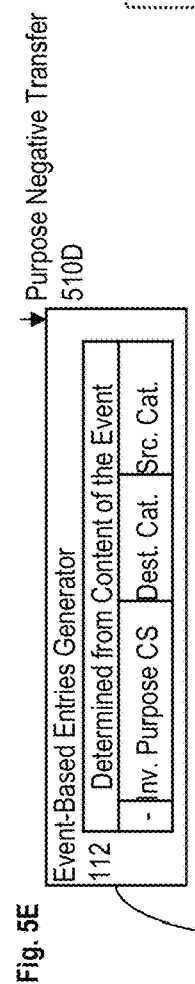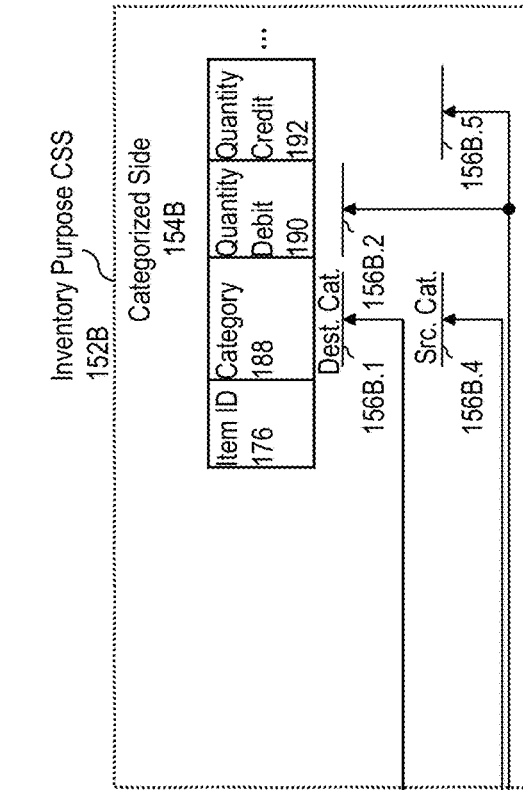
Fig. 5D
Fig. 5E

Fig. 8A

Configuration 130

Categories Def. 133

Orthogonal Categorization Schemes Def. 131

Categorization Scheme (CS) IDs 132

Mappings Def. 134

| Category Groups 800 | | Inventory Hub CS ID 132A | Inventory Purpose CS ID 132B |
|---|---|---|---|
| Category Group Names 802 | Categories 806 | CS1 | CS2 |
| CG1 | CG1.1 | x | |
| CG1 | CG1.2 | x | |
| CG1 | CG1.3 | x | |
| CG1 | CG1.4 | x | |
| CG1 | CG1.5 | x | |
| CG1 | CG1.6 | | |
| CG2 | CG2.1 | | x |
| CG2 | CG2.2 | | x |
| CG2 | CG2.3 | | x |

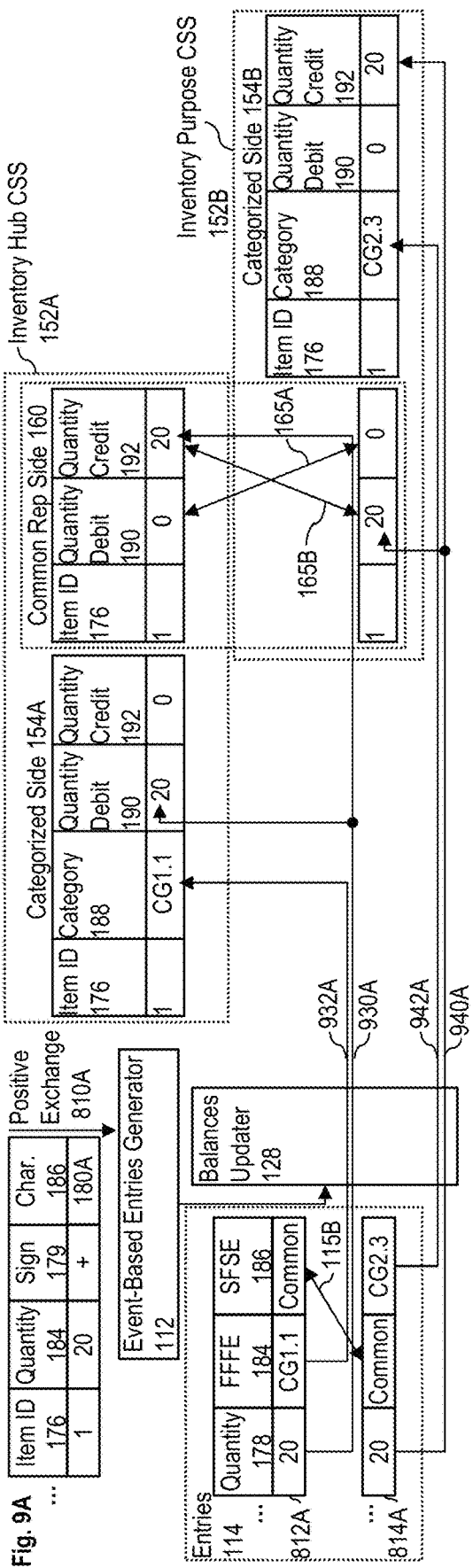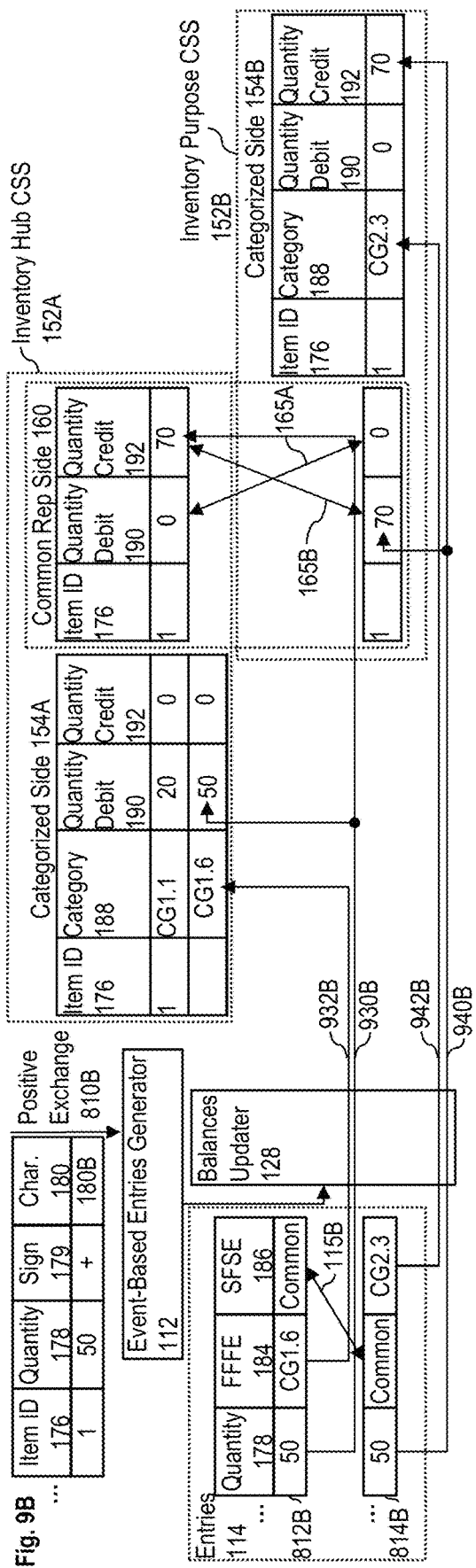
Fig. 9A
Fig. 9B

Statement to ease Explanation Part of Reconciliation 1232

| Event ID 172 | ... | Item ID 176 | Category 188 | Quantity Debit 190 | Quantity Credit 192 |
|---|---|---|---|---|---|
| 7 | ... | 1 | Default | 30 | 20 |

| Event ID 172 | ... | Item ID 176 | Sign 179 | Char. 180 |
|---|---|---|---|---|
| 6 | ... | 1 | − | 180G.1 |

| Event ID 172 | ... | Item ID 176 | Quantity 178 | Sign 179 | Char. 180 |
|---|---|---|---|---|---|
| 6 | ... | 1 | 20 | + | 180F |

Inventory Purpose CSS 152B

Categorized Side 154B

| | Item ID 176 | Category 188 | Quantity Debit 190 | Quantity Credit 192 |
|---|---|---|---|---|
| | 1 | CG2.2 | 60 | 0 |
| | | CG2.3 | 20 | 110 |
| | | Default | 50 | 20 |
| | 2 | Default | 0 | 60 |

Entries 114

| | Event ID 172 | ... | Item ID 176 | Quantity 178 | FFFE 184 | SFSE 186 |
|---|---|---|---|---|---|---|
| 814A | 1 | ... | 1 | 20 | Common | CG2.3 |
| 814B | 2 | ... | 1 | 50 | Common | CG2.3 |
| 814C | 3 | ... | 1 | 20 | Default | Common |
| 814D | 4 | ... | 1 | 40 | Common | CG2.3 |
| 814E | 5 | ... | 1 | 60 | CG2.3 | Common |
| 814F | 6 | ... | 1 | 20 | CG2.3 | Default |
| 814G.1 | 7 | ... | 1 | 30 | Default | Common |
| 814G.2 | 7 | ... | 2 | 60 | Common | Default |

Log 104

| | Event ID 172 | TS. 174 | Item ID 176 | Quantity 178 | Sign 179 | Char. 180 |
|---|---|---|---|---|---|---|
| 810A | 1 | 1 | 1 | 20 | + | 180A |
| 810B | 2 | 2 | 1 | 50 | + | 180B |
| 810C | 3 | 3 | 1 | 20 | − | 180C |
| 810D | 4 | 4 | 1 | 40 | + | 180D |
| 810E | 5 | 5 | 1 | 60 | − | 180E |
| 810F | 6 | 6 | 1 | 20 | + | 180F |
| 810G.1 | 7 | 7 | 1 | 30 | − | 180G.1 |
| 810G.2 | 7 | 7 | 2 | 60 | + | 180G.2 |

Fig. 13A Configuration 130

Categories Def. 133

Orthogonal Categorization Schemes Def. 131

Categorization Scheme (CS) IDs 132

Mappings Def. 134

| Category Group Names 802 | Categories 806 | Inventory Hub CS ID 132A — CS1 | Inventory Purpose CS ID 132B — CS2 | Inventory Purpose CS ID 132C — CS3 |
|---|---|---|---|---|
| CG1 | CG1.1 | x | | |
| CG1 | CG1.2 | x | | |
| CG1 | CG1.3 | x | | |
| CG1 | CG1.4 | x | | |
| CG1 | CG1.5 | x | | |
| CG1 | CG1.6 | x | | |
| CG2 | CG2.1 | | x | |
| CG2 | CG2.2 | | x | |
| CG2 | CG2.3 | | x | |
| CG3 | CG3.1 | | | x |
| CG3 | CG3.2 | | | x |
| CG3 | CG3.3 | | | x |

Category Groups 800

Fig. 13B Inventory Purpose CS subset(s)
135

| CS ID | Subset |
|---|---|
| CS2 | Total |
| CS3 | Exclude Set of one or more Characteristics = respective set of one or more characteristics (e.g., to include only incoming items not related to covering) |

Fig. 13C

| Type | CS | Dimension | Categories of Dimension | Purpose | Extending Application 1 |
|---|---|---|---|---|---|
| Orthogonal | CS1 | Dimension1 | CG1 Categories | Track and manage inventory (aspect1) by Dimension1. | Dimension1 = Location of item. CG1 Categories = Different locations. Purpose = Track and manage inventory by the locations. |
| | CS2 | Dimension2 | CG2 Categories | Track and manage apect2 by Dimension2. | Dimension2 = Division within the organization responsible for the items. CG2 Categories = Different divisions in the organization. Purpose = Track and manage performance for inflow and outflow of items by the divisions (e.g., business units) |
| | CS3 | Dimension3 | CG3 Categories | Track and manage apect3 by Dimension3. | Dimension3 = Supplier. CG3 Categories = Different suppliers. Purpose = Compare the suppliers of the items and create statistics. |

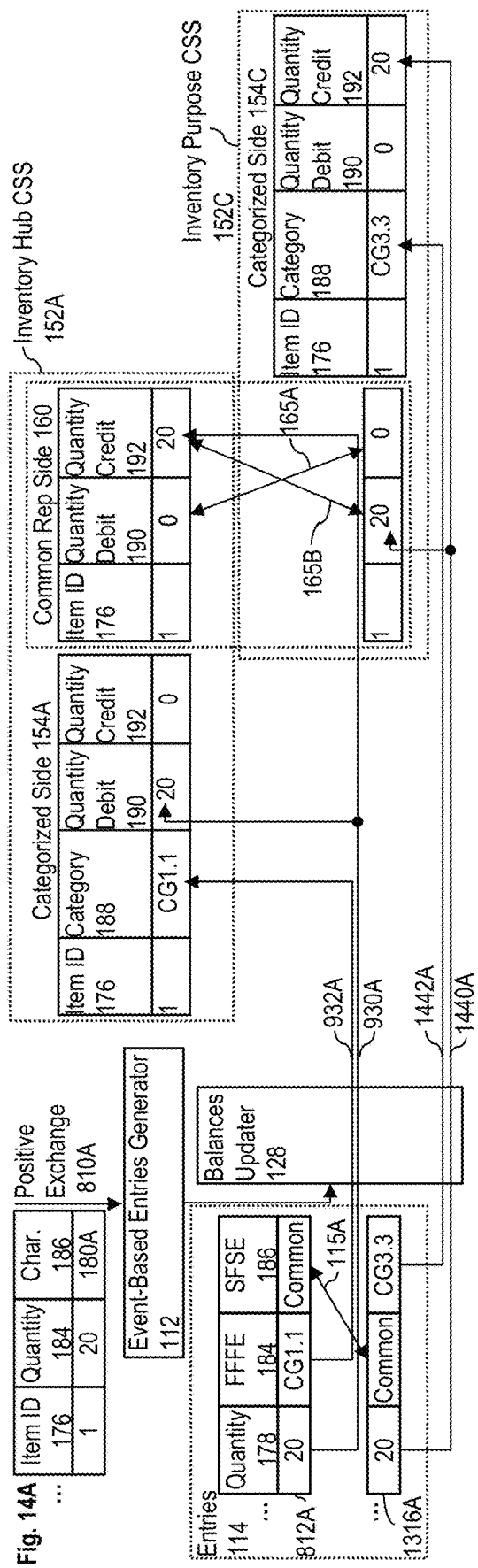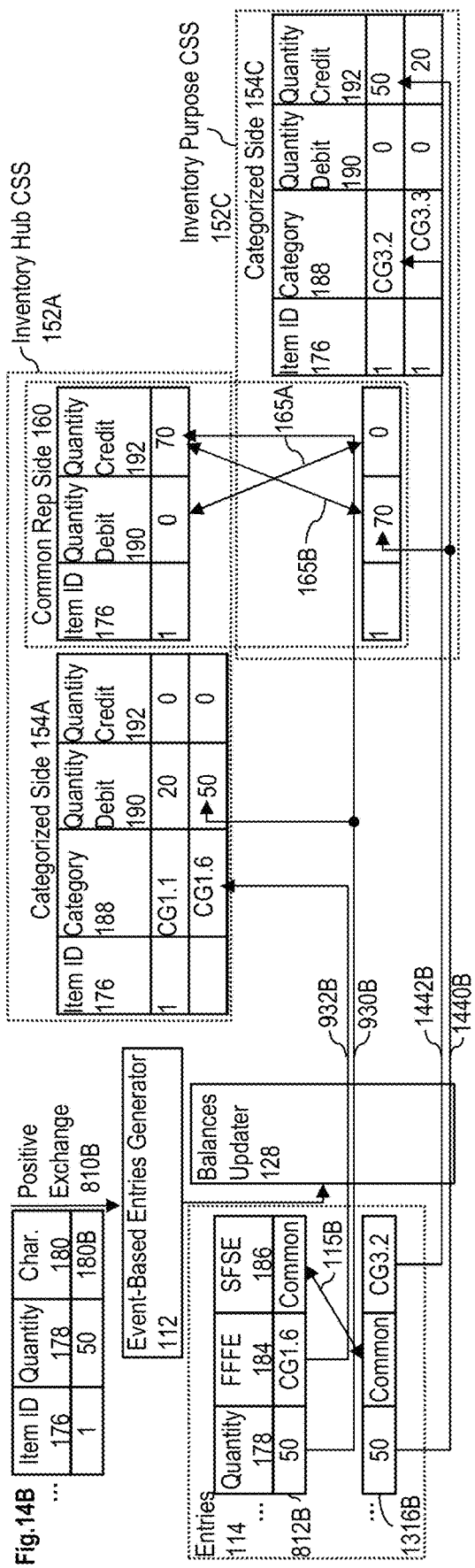
Fig. 14A
Fig. 14B

Fig. 15A Configuration 130

| Category Group Names 802 | One or more Optional Hierarchies 1504 | Categories 806 | Inventory Hub CS ID 132A / CS1 | Inventory Purpose CS ID 132B / CS2 | Inventory Purpose CS ID 132C / CS3 |
|---|---|---|---|---|---|
| CG1 | A | CG1.1 | x | | |
| CG1 | A | CG1.2 | x | | |
| CG1 | A | CG1.3 | x | | |
| CG1 | B | CG1.4 | x | | |
| CG1 | B | CG1.5 | x | | |
| CG1 | C | CG1.6 | x | | |
| CG2 | | CG2.1 | | x | |
| CG2 | | CG2.2 | | x | |
| CG2 | | CG2.3 | | x | |
| CG3 | | CG3.1 | | | x |
| CG3 | | CG3.2 | | | x |
| CG3 | | CG3.3 | | | x |
| CG4 | | CG4.1 | x | | |
| CG4 | | CG4.2 | x | | |
| CG5 | | CG5.1 | | x | |
| CG5 | | CG5.2 | | x | |

Categories Def. 133 = Category Groups 800 + Categories 806

CS IDs 132 ; Mappings Def. 134

Orthogonal Categorization Schemes Def. 131

Segmentation Scheme(s) Def. 136

Fig. 15B

| Type | CS | Dimension | Categories of Dimension | Purpose | Extending Application 1 |
|---|---|---|---|---|---|
| Orthogonal | CS1 | Dimension1 | CG1 Categories | Track and manage inventory (aspect1) by Dimension1. | Dimension1 = Location of item. CG1 Categories = Different locations. Purpose = Track and manage inventory by the locations. |
| | CS2 | Dimension2 | CG2 Categories | Track and manage apect2 by Dimension2. | Dimension2 = Division within the organization responsible for the items. CG2 Categories = Different divisions in the organization. Purpose = Track and manage performance for inflow and outflow of items by the divisions (e.g., business units) |
| | CS3 | Dimension3 | CG3 Categories | Track and manage apect3 by Dimension5. | Dimension3 = Supplier. CG3 Categories = Different suppliers. Purpose = Compare the suppliers of the items and create statistics. |
| Hierarchy1 | CS1 | Dimension1 | Higher Level Categories/ CG1 Categories | Track and manage inventory (aspect1) by Higher Level Categories, and more specifically by Dimension1. | Higher Level Categorization = Region. Higher Level Categories = Different regions including different sets of the CG1 categories. Purpose = Track and manage inventory by regions and locations within those regions. |
| Segmentation1 | CS1 | Dimension1/ Dimension4 | CG1 Categories/ CG4 Categories | Track and manage inventory (aspect1) by Dimension1, as differentiated by Dimension4. | Dimension4 = Status of availability of item. CG4 Categories = Different statuses of availability of items (e.g., in transit, in stock). Purpose = Track and manage inventory by location even when it is not yet under the control of the organization (e.g., in-transit for a location). |
| Segmentation2 | CS2 | Dimension2/ Dimension5 | CG2 Categories/ CG5 Categories | Track and manage aspect2 by Dimension2, as differentiated by Dimension5. | Dimension5 = Status of availability of item for use by divisions in organization. CG5 Categories = Different statuses of availability of items for use by divisions in the organization (e.g., reserved, available). Purpose = Track and manage performance for inflow and outflow of items by division (e.g., business unit) and to allow/prevent different divisions from using items for a certain period. |

Fig. 15C

Log 104

| | Event ID 172 | TS. 174 | Item ID 176 | Quantity 178 | Sign 179 | Char. 180 |
|---|---|---|---|---|---|---|
| 810A | 1 | 1 | 1 | 20 | + | 180A |
| 810B | 2 | 2 | 1 | 50 | + | 180B |
| 810C | 3 | 3 | 1 | 20 | - | 180C |
| 810D | 4 | 4 | 1 | 40 | + | 180D |
| 810E | 5 | 5 | 1 | 60 | - | 180E |
| 810F | 6 | 6 | 1 | 20 | + | 180F |
| 810G.1 | 7 | 7 | 2 | 30 | - | 180G.1 |
| 810G.2 | 7 | 7 | 1 | 60 | + | 180G.2 |
| 810H.1 | 8 | 8 | 1 | 60 | - | 180H.1 |
| 810H.2 | 8 | 8 | 1 | 50 | - | 180H.2 |
| 810H.3 | 8 | 8 | 1 | 40 | + | 180H.3 |
| 810H.4 | 8 | 8 | 1 | 30 | - | 180H.4 |
| 810H.5 | 8 | 8 | 2 | 60 | + | 180H.5 |

Entries 114 / Entries 812 / Entries 814

| | Event ID 172 | TS. 174 | Item ID 176 | Quantity 178 | FFFE 184 | SFSE 186 |
|---|---|---|---|---|---|---|
| 814A | 1 | 1 | 1 | 20 | Common | CG2.3 |
| 814B | 2 | 2 | 1 | 50 | Common | CG2.3 |
| 814C | 3 | 3 | 1 | 20 | Default | Common |
| 814D | 4 | 4 | 1 | 40 | Common | CG2.3 |
| 814E | 5 | 5 | 1 | 60 | CG2.2 | Common |
| 814F | 6 | 6 | 1 | 20 | CG2.3 | Default |
| 814H.1 | 8 | 8 | 1 | 60 | CG2.2/CG4.1 | CG2.2 |
| 814H.2 | 8 | 8 | 1 | 50 | CG2.3 | CG2.3/CG4.1 |
| 814H.3 | 8 | 8 | 1 | 40 | CG2.3 | CG2.3/CG4.2 |
| 814H.4 | 8 | 8 | 1 | 30 | Default/CG4.1 | Default |
| 814H.5 | 8 | 8 | 2 | 60 | Default/CG4.1 | Default |

Fig. 16A Configuration 130

Categories Def. 133:

| | | | Inventory Hub CS ID 132A<br>CS1 | Inventory Purpose CS ID 132B<br>CS2 | Inventory Purpose CS ID 132C<br>CS3 |
|---|---|---|---|---|---|
| Category Group Names 802 | One or more Optional Hierarchies 1504 | Categories 806 | | | |
| CG1 | A | CG1.1 | x | | |
| | | CG1.2 | x | | |
| | | CG1.3 | x | | |
| | B | CG1.4 | x | | |
| | | CG1.5 | x | | |
| | C | CG1.6 | x | | |
| CG2 | | CG2.1 | | x | |
| | | CG2.2 | | x | |
| | | CG2.3 | | x | |
| CG3 | | CG3.1 | | | x |
| | | CG3.2 | | | x |
| | | CG3.3 | | | x |
| CG4 | | CG4.1 | x | x | |
| | | CG4.2 | x | x | |

- Category Groups 800
- CS IDs 132
- Mappings Def. 134
- Orthogonal Categorization Schemes Def. 131
- Segmentation Scheme(s) Def. 136

Fig. 16B

| Type | CS | Dimension | Categories of Dimension | Purpose | Example Application 2 |
|---|---|---|---|---|---|
| Orthogonal | CS1 | Dimension1 | CG1 Categories | Track and manage inventory (aspect1) by Dimension1. | Dimension1 = Accounts. CG1 Categories = Different accounts. Purpose = Track and manage inventory by the Accounts. |
| | CS2 | Dimension2 | CG2 Categories | Track and manage apect2 by Dimension2. | Dimension2 = Trading Desk. CG2 Categories = Different trading desks. Purpose = Track and manage performance for inflow and outflow of items by trading desk. |
| | CS3 | Dimension3 | CG3 Categories | Track and manage apect3 by Dimension3. | Dimension3 = Market. CG3 Categories = Different markets. Purpose = Compare the markets of the items and create statistics. |
| Hierarchy1 | CS1 | Dimension1 | Higher Level Categories/ CG1 Categories | Track and manage inventory (aspect1) by Higher Level Categories, and more specifically by Dimension1. | Higher Level Categorization = Custodian. Higher Level Categories = Different custodians. Purpose = Track and manage performance for inflow and outflow of items by Custodian, and more specifically by account. |
| Segmentation1 | CS1 And CS2 | Dimension1/ Dimension4 And Dimension2/ Dimension4 | CG1 Categories/ CG4 Categories and CG2 Categories/ CG4 Categories | Track and manage inventory (aspect1) by Dimension1, as differentiated by Dimension4. And Track and manage aspect2 by Dimension2, as differentiated by Dimension4. | Dimension4 = Settlement status. CG4 Categories = Different settlement statuses of items (e.g., settled, not settled). Purpose for CS1 = Track and manage inventory by account, as differentiated by settlement status. Purpose for CS2 = Track and manage performance for inflow and outflow of items by trading desk, as differentiated by settlement status. |

INVENTORY MANAGEMENT WITH AUTOMATIC ALIGNMENT OF BALANCES ACROSS MULTIPLE ORTHOGONAL CATEGORIZATION SCHEMES

CROSS-REFERENCE TO RELATED APPLICATIONS

This application is a continuation of International Application No. PCT/EP2024/062993, filed May 10, 2024, which claims the benefit of EP Application No. 23306875.8, filed Oct. 27, 2023, which are hereby incorporated by reference.

TECHNICAL FIELD

One or more embodiments relate to the field of inventory management; and more specifically, to the across multiple orthogonal categorization schemes.

DESCRIPTION OF THE RELATED ART

At certain organizations, there is a need for inventory management to track/reflect the lifecycle of the inventory (e.g., movement of the inventory, which can include incoming and outgoing inventory to the organization). In certain organizations, this requires multiple users (optionally in different time zones) using different categorization schemes. These different categorization schemes are orthogonal in that they represent the same or subsets of the same inventory but organized in different ways. In other words, the different categorization schemes allow different users/systems to view some or all the inventory from a different perspective. Inventory management systems that support such multiple categorization schemes are sometimes referred to as multi-dimensional because the categories of each categorization scheme provide a different dimension.

For example, where the inventory includes multiple different types of items, there may be: 1) a first of the categorization schemes including a different category for each type of item, and a quantity for each of these categories that reflects the number of the items of that type that are on hand; and 2) a second of the categorization schemes including different categories, and a quantity for each of these categories that reflects the number of the items that fall within these categories. To provide an overly simplistic example, assuming there are quantities X and Y respectively of a first and second types of items, then: 1) there may be quantities X and Y respectively for a first and second categories of the first categorization scheme; and 2) quantities A and B respectively for a first and second category of the second categorization scheme, where A represents some of the X items of the first type and some of the Y items of the second type, while B represents others of the X items of the first type and others of the Y items of the second type. So, while A+B may equal X+Y, the quantity A typically will not equal X and the quantity B typically will not equal Y.

To continue the example, an update to the quantity X (e.g., a reduction of Z such that the current quantity for the first category is now X−Z) will typically require a corresponding update in the quantity A and/or B because, as said before, both the first and second categorization schemes are effectively being used to track the same items in the same inventory in different ways. For this corresponding update, determining which one(s) of the categories in the second categorization scheme require a corresponding update to their quantity (e.g., quantity A and/or B) is referred to as "categorizing the update." If the corresponding update can be categorized and the quantity of the determined category updated, then the quantities for the first and second categorization scheme are kept in sync (also referred to as "aligned"). However, if the update is made to quantity X, but the corresponding update(s) is not made to the quantity A and/or B (e.g., because the corresponding update could not be categorized at that time), then the quantities for the first and second categorization schemes are no longer in sync (also referred to as "unaligned," no longer aligned, etc.) because there is a "mismatch" (an update was made relative to the first categorization scheme without a necessary corresponding update being made relative to the second categorization scheme).

One approach to keep all the quantities in sync would be to use a single database to store all the quantities for all the categories of all the categorization schemes. However, this is often impractical for a variety of reasons. For instance, for every event that impacts one of the categorization schemes, the system must know whether and which others of the categorization schemes require corresponding updates, as well as how to categorize the corresponding updates. To do this, all possibilities must be covered by logic entered into the system ahead of time (a relatively large overhead), and/or the different users responsible for the different categorizations schemes categorize each corresponding event immediately because the system must be paused and events queued until the missing categorization(s) is provided (and any delay means that the quantities would no longer be keep current in real time or near real time). Additional reasons include the need to allow for correcting errors and, in some use cases, the ability to communicate with systems outside of the organization.

Another approach is to have a different data structure to store the quantities of the items in the inventory for each of the different categorization schemes. These data structures may be hosted on a single system but are often spread across multiple systems (e.g., a first set of one or more electronic devices implementing a first system that manages a first set of one or more of the data structures, a second set implementing a second system that manages a second set, and so on). Unfortunately, it is even more impractical in such implementations to keep the multiple systems constantly synchronized because of, for example, the number and/or frequency with which updates are input into the different systems, the need to propagate the updates to the other systems, the need to categorize the propagated updates according to the different ones of the categorization schemes, the practice of having different users/systems be responsible for categorizing the propagated updates according to the different ones of the categorization schemes, etc. Instead, such fragmented implementations (multiple systems, multiple users, multiple categorization schemes, and possibly multiple time zones) often: 1) attempt to have each of the systems make any necessary updates to their data structure responsive to a given event; 2) know that mismatches will be created; and 3) periodically (e.g., daily, monthly, etc.) reconcile the data structures to bring them back into alignment. In other words, the different systems try to track the inventory relative to their categorization scheme so users can make decisions using real time or near real time data, but periodically reconcile their data structures to bring them back into alignment.

There are several problems with periodic reconciliations. First, periodic reconciliations require a relatively large effort, and that effort grows exponentially with the number of users/systems/categorization schemes involved. In practice, a periodic reconciliation starts from the result of all the events that occurred in the preceding period. As a preliminary step, some implementations check whether the different data structures reflect the same total quantities. This is done to determine how to prioritize the reconciliation (e.g., a large discrepancy may result in high prioritization), but is insufficient to identify all mismatches (e.g., by happenstance, two different ones of the data structures may reflect the same total (be aligned) even though two or more of the underlying changes did not match). Thus, the first required step is to re-discover the relationships between changes made to different ones of the data structures responsive to a given event to confirm: 1) all the data structures that should have been updated were updated; and 2) the updated to the different data structures "match." In other words, a mismatch may be a result of: 1) a lack of a corresponding update(s) to one of the data structures (a mismatch at the structure level); or 2) the corresponding update(s) exists but has a different quantity (a mismatch at the change level). This re-discovery is particularly difficult because the relationship(s) between changes in any two different ones of the data structures may be 1:1, M:1, 1:N, or M:N. The second step is to explain the mismatch(es) (that is, "drill down" into the mismatch(es) to determine the cause(s)). The third step is to make the necessary adjustments to address the mismatches so that the data structures are brought back into alignment (this third step may: a) be broken into different stages involving different users; b) require providing additional events to one or more of the systems; and c) concludes with the required categorization(s) according to the applicable categorization scheme(s)) having been determined).

The second problem with periodic reconciliations is that the mismatches between data structures that develop in-between the periodic reconciliations (e.g., incoming and/or outgoing inventory movements that are reflected in at least one, but not all, of the data structures in which those movements should be reflected) represent a lack of awareness regarding quantities of inventory that can lead to other consequences. A first type of consequence is the opportunity cost that can occur in-between reconciliations. For instance, a given user/system may not be made aware of, and thus be able to make use of, inventory being received by the organization because of activity of other user(s)/system(s) until after the next reconciliation.

A second type of consequence is the risk of a user/system, in between the reconciliations, attempting to perform a transaction(s) for which there is no longer sufficient inventory. For example, user U may use system 1 to perform a transaction based on certain inventory without knowing that other user(s) of other system(s) have already engaged in transactions that transferred out some or all that inventory. As another example, user U may use system 1 to perform a transaction for which there is not sufficient inventory knowing that other users/systems will not be aware of the transaction until the next reconciliation (such actions may be malicious or performed with the belief/speculation that the needed inventory will become available before the next reconciliation).

There are a variety of techniques to attempt to mitigate this second type of consequence. One such technique involves an organization imposing a "buffer limit" on the quantity a given user or group of users may transfer out of the organization between reconciliations. A first way to do this is to set a quantity as the limit, where the quantity is believed to be sufficiently low to prevent the transactions in-between reconciliations from exceeding the available inventory. Unfortunately, such a limit only reduces the risk because the limit is a guess and there are typically scenarios in which the activity of other user(s)/system(s) will result in the second type of consequence occurring anyway. In addition, such a limit comes at an opportunity cost because there is typically more inventory available for the given user or group of users to work with, but they are prevented from doing so by the limit. A second way to do this is to represent to the given user or group of users that the organization has less inventory than the organization has (e.g., representing to the given user or group of users only 75% of inventory that the organization has). In other words, the organization holds back a reserve of inventory as a buffer. This second way has the same problems as the first way, but the opportunity costs are typically lower.

Another technique to attempt to mitigate the second type of consequence involves an organization having: 1) a first user/system capable of agreeing to transfer out (and possible in) inventory (a first event); and 2) a second user/system responsible for the actual transfer (a second event). In other words, transfers of inventory out of (and possibly in to) the organization (and thus, transactions involving other organizations) are centralized in the second user/system (sometimes referred to as a "centralized transfer system," "centralized externally facing transfer system," "centralized inter-organization transfer system," "centralized payment system", etc.). As noted above, this means that the activity involves two separate, but related, steps/events. This makes the second user/system in the organization aware, at step 2, of the lack of sufficient inventory. Unfortunately, this solution: 1) does not make the first user/system aware of the issue during step 1, and thus allows for action by the first user/system; 2) does not notify any other users/systems in the organization which may need to be involved to solve the problem; 3) increases the complexity of the inventory management system; 4) can result in not tracking the relationship between the 2 separate events.

The above two techniques that attempt to mitigate the second type of consequence can be combined, but the above deficiencies remain.

BRIEF DESCRIPTION OF THE DRAWINGS

The following figures use like reference numbers to refer to like elements. Although the following figures depict various example embodiments, alternative embodiments are within the spirit and scope of the appended claims. In the drawings:

FIG. 1B is a block diagram illustrating an event schema according to some embodiments of the invention.

FIG. 1C is a block diagram illustrating an entry schema according to some embodiments of the invention.

FIG. 1D is a block diagram illustrating schemas for categorized and common representation sides of CSSs according to some embodiments of the invention.

FIG. 1E is a block diagram illustrating some detail regarding configuration 130 according to some embodiments of the invention.

FIG. 1F is a block diagram describing relationships between CSSs according to some embodiments of the invention.

FIG. 2C is a transaction diagram illustrating the capturing of an opportunity according to some embodiments of the invention.

FIG. 5A is a block diagram illustrating transfer events according to some embodiments of the invention.

FIG. 5B is a block diagram illustrating the processing of a hub positive transfer event according to some embodiments of the invention.

FIG. 5C is a block diagram illustrating the processing of a hub negative transfer event according to some embodiments of the invention.

FIG. 5D is a block diagram illustrating the processing of a purpose positive transfer event according to some embodiments of the invention.

FIG. 5E is a block diagram illustrating the processing of a purpose negative transfer event according to some embodiments of the invention.

FIG. 8A is a block diagram illustrating more detailed configuration information according to some embodiments of the invention.

FIG. 9A is a block diagram illustrating a first positive exchange event with complete information according to some embodiments of the invention.

FIG. 9B is a block diagram illustrating a second positive exchange event with complete information according to some embodiments of the invention.

FIG. 12A is a block diagram illustrating a manner of easing explanation after example event 810E according to some embodiments.

FIG. 12D is a block diagram illustrating a second manner of easing explanation after example event 810G using a time range according to some embodiments of the invention.

FIG. 13A is a block diagram illustrating the configuration information for the first example with the addition of a third CSS according to some embodiments of the invention.

FIG. 13B is a block diagram illustrating configuration information including a subset(s) definition according to some embodiments of the invention.

FIG. 13C is a block diagram describing additional relationships between CSSs, including the third CSS, according to some embodiments of the invention.

FIG. 14A is a block diagram illustrating the first positive exchange event with complete information, but relative to the third CSS, according to some embodiments of the invention.

FIG. 14B is a block diagram illustrating the second positive exchange event with complete information, but relative to the third CSS, according to some embodiments of the invention.

FIG. 15A is a block diagram illustrating the configuration information for the first example with the addition of a hierarchy and segmentation schemes according to some embodiments of the invention.

FIG. 15B is a block diagram illustrating additional relationships between CSSs, including hierarchy and segmentation, according to some embodiments.

FIG. 15C is a block diagram illustrating an additional example event in the log and the additional example entries generated based on the additional example event according to some embodiments of the invention.

FIG. 16A is a block diagram illustrating a second example of configuration information including a hierarchy and a segmentation scheme according to some embodiments of the invention.

FIG. 16B is a block diagram illustrating a second example of relationships between CSSs, including the third CSS, according to some embodiments of the invention.

DETAILED DESCRIPTION

Figure 1A:
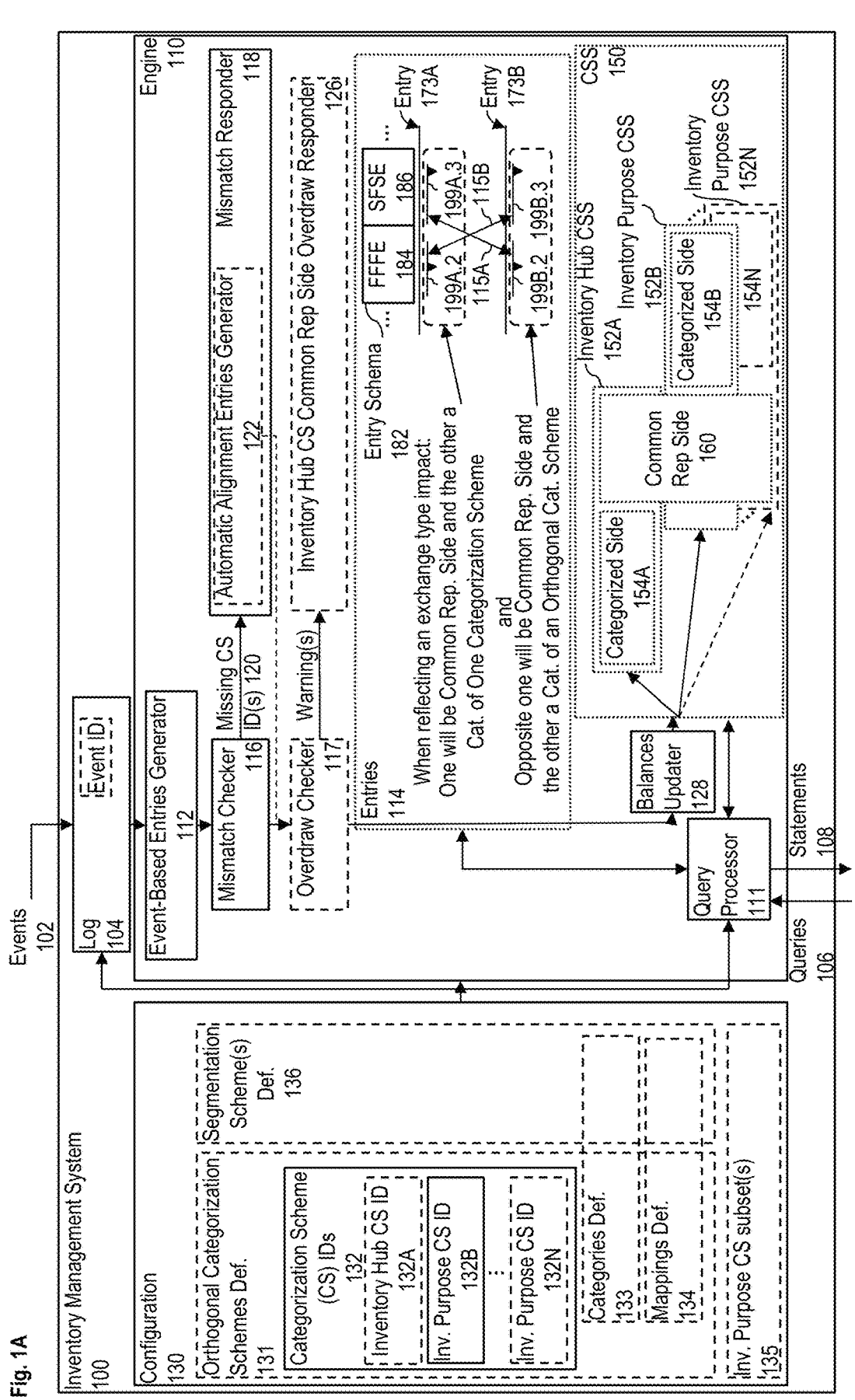
FIG. 1A is a block diagram inventory management with automatic alignment of balances across multiple orthogonal categorization schemes according to some embodiments.

The following description describes embodiments for inventory management with automatic alignment of balances across multiple orthogonal categorization schemes. In the following description, numerous specific details such as logic implementations, opcodes, means to specify operands, resource partitioning/sharing/duplication implementations, types and interrelationships of system components, and logic partitioning/integration choices are set forth to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, the operations of the flow diagrams can be performed by embodiments of the invention other than those discussed with reference to the other figures, and the embodiments of the invention discussed with reference to these other figures can perform operations different than those discussed with reference to the flow diagrams.

Overview

In some embodiments, multiple categorization schemes (e.g., first and second categorization schemes), which are orthogonal to each other, are used to categorize the inventory of an organization in different ways. Also, responsive to an event that reflects a change made to the inventory relative to a first of the categorization schemes, a first entry is generated that: 1) is based on the event; 2) is for the first categorization scheme; 3) identifies a type of item in the inventory; 4) identifies a first quantity of the type of item; 5) identifies the first quantity is to be used a first way to perform an update to a first balance for a combination of the type of item and a first category of the first categorization scheme; and 6) the first quantity is to be used a second way to perform a second update to a second balance that is for the type of item and that is irrespective of the first categorization scheme, wherein the first way is opposite to the second way. In addition, it is automatically determined that an entry should have been, but was not, generated based on the event for the second categorization scheme. Responsive to this determination, a second entry is automatically generated, where that second entry: 1) is based on the event; 2) is for the second categorization scheme; 3) identifies the type of item in the inventory; 4) identifies the first quantity of the type of item; 5) identifies the first quantity is to be used the second way to perform a third update to a third balance that is for the type of item and that is irrespective of the second categorization scheme, and 5) identifies that the first quantity is to be used the first way to perform a fourth update to a fourth balance that is for a combination of the type of item and a default category of the second categorization scheme.

As a result, if an event is received that requires an update relative to a first type of item and a first categorization scheme, and a necessary corresponding update relative to a second categorization scheme is not identified from the event, then the system will automatically detect this and generate a temporary version of the corresponding update using a default category of the second categorization scheme. This temporary version of the corresponding update means that the total balance for the first type of item can be determined relative to the second categorization scheme in real time or near real time, even though the corresponding update was not categorized. In this manner, all the categorization schemes that need to be informed of a change in the inventory will at least be informed of the impact on the total balance of the first type of item. Ways of determining this total balance will be described later herein.

Therefore, relative to above-described periodic reconciliation, the inventory management system can reduce or avoid the above-described problems (e.g., the relatively large effort, the lack of awareness regarding quantities of inventory) and consequences (e.g., lost opportunity costs, unknowingly performing transaction(s) for which there is no longer sufficient inventory) of periodic reconciliation, and thus avoid using the techniques (e.g., buffer limits, a centralized transfer system) that attempt to mitigate the consequences. In particular, a user basing a decision on balances according to the second categorization scheme will at least be aware of the change in the total balance for the first type of item because at least that information regarding the update will have been propagated to the second categorization scheme.

Databases may be implemented according to a variety of different database models, such as relational, non-relational, graph, columnar (also known as extensible record; e.g., HBase), object, tabular, tuple store, and multi-model. Examples of non-relational database models (which may also be referred to as schema-less and NoSQL database models) include key-value store and document store (also known as document-oriented as they store document-oriented information, which is also known as semi-structured data). A database may comprise one or more database objects that are managed by a database management system (DBMS), each database object may include a number of data records, and each record may comprise a set of fields. A database record may take different forms based on the database model being used and/or the specific database object to which it belongs; for example, a database record may be: 1) a row in a table of a relational database; 2) a JavaScript Object Notation (JSON) object; 3) an Extensible Markup Language (XML) document; 4) a key-value pair; etc. A database object can be unstructured or have a structure defined by the DBMS (a standard database object) and/or defined by a user (a custom database object). In some implementations of a cloud database (a database that runs on a cloud platform and that is provided as a database service), identifiers are used instead of database keys, and relationships are used instead of foreign keys. While implementations may use one or more types of databases, a relational database with tables is sometimes described to simplify understanding. In a relational database management system (RDBMS), each relational database table (which is a type of database object) generally contains one or more data categories logically arranged as columns according to a schema, where the columns of the relational database table form different ones of the fields from the plurality of data records, and where rows of the relational database table are different ones of a plurality of data records and each contains an instance of data for each category defined by the fields. Thus, the fields of a database record are defined by the structure of the database object to which the record belongs. A temporal database contains time-referenced, or time stamped, data records. A temporal-relational database includes temporal tables, where each such temporal table is to store data in data records. For each temporal table, the data records of that temporal table are each composed of a number of fields, one or more of which stores data and one or more of which stores timestamp(s) for that data record. Temporal tables are designed such that data records stored in the temporal tables are not overwritten. Rather, a change to data in a data record in a temporal table is performed by: 1) changing the timestamp of the data record which would otherwise have been overwritten or modified to reflect the time of the change; and 2) creating an additional data record that reflects the change. Because temporal tables capture the changes in their data records over time, a "delta" of the temporal table between two times can be determined. The data stored in the temporal table is sometimes referred to as the contents of the temporal table and is distinguishable from the schema of the temporal table. Taking a logical view, a temporal table can be thought of as a table with rows and columns, where a header of the table defines the schema of the table, each of the rows (which store the contents of the temporal table) is a data record, each intersection of a column and a row is a field of one of the data records, and one or more of the columns stores the above discussed timestamp(s). However, the contents of temporal tables may be stored in different ways (e.g., a "row-oriented" organization that mimics the above discussed logical view (sometimes referred to as "row-oriented" temporal tables), a "column-oriented" (also known as a "columnar") organization (sometimes referred to as "column-oriented" or "columnar" temporal tables), etc.).

FIG. 1A

FIG. 1A is a block diagram inventory management with automatic alignment of balances across multiple orthogonal categorization schemes according to some embodiments. An inventory management system 100 receives events 102, which are entered into log 104.

In some embodiments, each event is assigned an event ID to distinguish that event from other events currently in inventory management system 100. While in some embodiments the inventory management system 100 assigns an event ID to each event, in alternative embodiments some or all events are received by the management system already having an event ID. In some embodiments the inventory management system 100 is an interface to record transactions across an entire organization. Thus, the transactions an organization wants to record in the inventory management system 100 should be submitted to the inventory management system 100 in the events 102.

Log and Event IDs

The events are stored with the assigned event IDs in log 104. In some embodiments, the log is immutable, the events in the log are re-playable (including mistakes), and/or a later event in the log can cancel part or all a prior event in the log.

Engine

The events (and optionally the event IDs) are provided to an engine 110 (while the events 102 are shown as being provided through the log 104, alternative embodiments may assign event IDs outside of the log and provide the combination of the events 102 and event IDs to the log 104 and the engine 110 at the same time). The events are sent responsive to different decisions. Each event reflects a change made to the inventory relative to one of the categorization schemes. Typically, at least some of the different categorization schemes are managed by different sets of one or more users. As described later herein, in some deployments different sets of one or more systems are used to make decisions relative to different ones of the categorization schemes.

Events/Impacts/Entries

Responsive to each event, the engine 110 attempts to generate a complete set of one or more entries. In some embodiments, each event represents one impact, and the complete set of entries for the event is the same as the complete set of entries for the one impact. In other embodiments each event may represent one or more impacts, and the complete set of entries for the event includes a complete set of one or more entries for each of the impacts; in other words, the union of the sets of entries for the impacts within an event forms the complete set of entries for the event. Additionally, some embodiments support impacts of at least two types, which are referred to herein as exchange type and transfer type. In embodiments in which each event represents one impact, the event type is the same as the impact type (e.g., if the impact type is transfer type, then the event type is transfer type). In contrast, in embodiments that support each event representing one or more impacts, then the types of all the impacts need to be the same for the event type to be the same. While the below description contemplates one impact per event except where indicated, this is done to simplify understanding and not by way of limiting the scope of this description. In some embodiments, an exchange type impact/event reflects an agreement to exchange or an actual exchange of a quantity of items in the real world.

Item IDs

Each type of item in the inventory is assigned a common item ID, and thus each categorization scheme operates relative to these item IDs. Each impact involves one or more item IDs. For instance, an exchange type impact involves two item IDs, while a transfer type impact involves one item ID. In embodiments in which events reflect one impact, an event with one exchange type impact or one transfer type impact will respectively involve two item IDs and one item ID.

Engine Components

The engine 110 includes an event-based entries generator 112, a mismatch checker 116, a mismatch responder 118, and a balances updater 128. The event-based entries generator 112 generates a set of one or more entries based on each of the events it is provided. Each entry is for one of the categorization schemes (CSs). The mismatch checker 116 receives each set of entries and determines if the set should include, but lacks, an entry for one or more of the categorization schemes. If there are any missing entries, the identifier(s) (ID(s)) of the categorization scheme(s) are provided to the mismatch responder 118, which takes corrective action to generate the missing one or more entries. Depending on the embodiment, the corrective action responsive to a given categorization scheme identifier (CS ID) may include: 1) invoking an automatic alignment entries generator 122 to automatically generate a temporary substitute for each missing entry; 2) notifying the set of one or more users and/or systems responsible for the categorization scheme; 3) requesting the set of one or more users and/or systems responsible for the categorization scheme to provide the missing information or entry; etc.

Balances Updater

Once the complete set of entries for a given event has been generated (e.g., all necessary entries were generated by the event-based entries generator 112 or the combination of the event-based entries generator 112 and the mismatch responder 118), the entries 114 are provided by the balances updater 128. The balances updater 128 which updates balances within the categorization scheme state (CSS 150). More specifically, each entry provided to the balances updater 128 indicates a CS ID, and the balances updater 128 updates a respective categorization scheme state (respective CSS) for the CS identified by that CS ID. In other words, balances generated for each of the CSs are stored in respective CSSs within CSS 150. In FIG. 1A, the CSSs within CSS 150 include CSS 152A through CSS 152N. For instance, assuming there are N categorization schemes that respectively have CS IDs 1 through N (CS1 to CSN), the CS1 to CSN respectively identify CSS 152A to CSS 152N.

Categorized Side

Each of CSS 152A through CSS 152N includes a respective categorized side 154A through categorized side 154N. The categorized side 154A to categorized side 154N respectively store balances by combinations of item type and categories of the respective CSs. For instance, the categorized side 154A store balances by combination of item type and the categories of the categorization scheme assigned CS1. That is, balances of the inventory broken down by combinations of the types of items and categories. The CSSs are used to bring together collections of impacts from events in the different ways in which the organization desires to analyze those impacts.

Common Representation Side

Additionally, CSS 152A through CSS 152N includes a common representation side 160. While in some embodiments each of CSS 152A through CSS 152N has a respective version of the common representation side 160, alternative embodiments may have some of all CSSs share a single version of the common representation side 160. The common representation side 160 is referred to as common because it stores balances by item type (irrespective of any of the categorization schemes). That is, balances of the inventory broken down by types of items irrespective of categories.

Category IDs

For instance, assume that each category in a categorization scheme is assigned a respective category ID (cat. ID). A categorized side maintains running balances by item ID and category ID, while the common representation side maintains running balances by item ID (irrespective of any category IDs). As such, the common representation side of a given CSS 152 can be viewed as a pivot table of the categorized side of that CSS, where the pivot table sums the balances across the categories by the item IDs (irrespective of category). While in some embodiments each category is uniquely identified by the combination its category ID and the CS ID to which the category belongs, other embodiments do so differently (e.g., each category is uniquely identified by its category ID alone).

Main and Purpose

In some embodiments: 1) there is a main categorization scheme for inventory that is referred to as the inventory hub categorization scheme, and this categorization scheme is assigned CS1 and its respective CSS is referred to as inventory hub CSS 152A; and 2) there are one or more other categorization schemes referred to as inventory purpose categorization schemes, and these categorization schemes are respectively assigned CS1 to CSN and referred to as inventory purpose CSS 152B to inventory purpose CSS 152N. However, alternative embodiments may use a different assignment of CS IDs.

Some embodiments use: 1) the categorized side 154A of the inventory hub CSS 152A to express the balances of the item IDs according to an organization wide categorization scheme (CS1); 2) the common representation side of the inventory hub CSS 152A to express the balances of the item IDs; 3) the categorized side 154B of the inventory purpose CSS 152B to express the balances of at least a set of one or more of the item IDs (which may be all of the items IDs or a subset of the item IDs) according to one of the categorization schemes (e.g., CS2); and 4) the common representation side of the inventory purpose CSS 152B to express the balances of the set of item IDs.

Links

The inventory hub CSS 152A is linked by the common representation side 160 to all inventory purpose CSSs, and each inventory purpose CSS (e.g., CSS 152B) is linked by the common representation side 160 to the inventory hub CSS 152A. This linkage is a result of the common representation side 160 expressing the balances by item ID (and irrespective of category). In other words, if the inventory hub CSS 152A and the inventory purpose CSS 152B categorizes all the events/impacts, the respective categorized sides will be broken down according to the different categorization schemes, but the respective common representation sides will have the same breakdown (by item ID) with the same balances. In other words, the common representation side of a given CSS reflects, without a categorization scheme, what is being done by transactions performed relative to categories of the respective CS. For example, if there is a transaction performed relative to item ID 1 in category ID 1 of CS1, what that transaction does will be reflected: 1) relative to item ID 1 in category ID 1 of CS1 in categorized side 154A of CSS 152A; and 2) relative to item ID in the common representation side 160 of CSS 152A, and thus in a manner understandable relative to the common representation side 160 of the other CSSs.

Thus, the categories used for the inventory hub CSS 152A can be viewed as the reference to which other inventory purpose CSSs are balanced. While the common representation side of the inventory hub CSS 152A indicates the types of items and the quantity of those types of items the organization has, the purpose inventory CSSs organize the information in a different way. The common representation side can be viewed as a way to propagate or broadcast the impact across the CSSs, and thus the organization. Thus, it is where changes to the inventory performed relative to a given one of the categorization schemes reflect what those changes are without using one of the categorization schemes.

Persistence

Entries 114 and the CSS 150 are shown using dotted lines to represent that different embodiments may store one or both, or subparts thereof, for different amounts of time. For instance, embodiments may keep each set of entries in memory for a time (e.g., until the balances updater 128 has updated the balances with them; until a condition is met, such as a threshold amount of time and/or a threshold amount of memory is used; etc.) before taking additional action (e.g., deletion, archiving, etc.). To the extent that some of this data is needed that has been deleted, that data may be recreated by replaying the events from log 104. In fact, in some embodiments it is desirable to separately generate the sets of entries based on selected ones of the events. In some embodiments, the selection of events to replay can be based on a range of time, where the range could be: 1) a range of time within the current day, a prior day, etc.; 2) a range of time spanning multiple days; 3) one or more entire days (which may be identified using dates without specific times in those dates); 4) as far back as the log goes (in other words, all events in the log 104); etc. Similarly, embodiments may keep one or more CSSs in memory for different amount of time and the entries are used to performed updates to the balances kept in those CSSs.

Balances

The balances identify the CSSs are running balances, and where the CSSs have been updated responsive to all events received that reflect agreed upon transactions, the balances of the inventory CSSs identify the quantities of the different types of items that are on hand (also referred to as the organization's "current position" relative to each of these types of items). Different embodiments may represent these balances in different ways, and some embodiments represent a balance in different ways depending on the context. Some ways of representing a balance include: 1) a single value that can be positive or negative; 2) a single quantity and a sign, where the sign can be positive or negative; 3) two quantities, one for an effect and the other for the opposite effect (in accounting terminology, these two effects are commonly referred to as debit and credit), where subtracting one of the quantities from the other converts the two-quantity representation into the single value representation. Balances are sometimes tracked using the two quantities and two effects representation because that format can make it easier to locate error(s).

Some ways of representing an update to balance include: 1) a single value, where the value can be positive or negative and this reflects the effect of the update; 2) a single quantity and a sign, where the sign can be positive or negative and represents the effect of the update; 3) a single quantity and an indication of one of the first and second effect, where the indication of the effect represents how to update the balance (e.g., in the case of a balance being represented using the two quantities and two effect representation, the indication in the update identifies which of the two quantities of the balance to update; in other words, the quantity of the balance for the same effect as the indication in the update is the quantity of the balance to update). While embodiments will be described herein that use the accounting terminology debit and credit in some places, it will be clear to one of ordinary skill in the art that alternative embodiments could represent balances and updates other ways (e.g., those discussed above).

Opposite Effects within and Between Entries

Each entry reflects an update to at least two of the running balances on the CSS. Where only two running balances are being updated by an entry: 1) either both running balances are on the categorized side (the transfer type) or one is on the categorized side and the other in on the common representation side (the exchange type); 2) the two updates are of the same quantity; and 3) that quantity is to be used to perform opposite ones of two ways to update (also referred to as the two updates have opposite ones of two effects on) the two running balances. Thus, an entry includes "side information" that indicates: 1) two different categories to update on the categorized side, as well as the assignment of the two different categories to different ones of the two opposite effects; or 2) the common representation side and a category to update on the categorized side, as well as the assignment of the common representation side and the category to different ones of the two opposite effects.

Assuming an exchange type impact/event for which a first and second entry are respectively generated for a first and second categorization schemes, and where only two running balances are being updated by each of the entries, then: 1) the first entry will indicate that the quantity is to be used (i) the first way to perform an update to a balance for a combination of the type of item and a category of the first categorization scheme and (ii) the second way to perform an update to a balance that is for the type of item and that is irrespective of the first categorization scheme; and 2) the second entry will indicate that the quantity is to be used (i) the second way to perform an update to a balance that is for the type of item and that is irrespective of the second categorization scheme and (ii) the first way to perform an update to a balance that is for a combination of the type of item and a category of the second categorization scheme. For an exchange type impact/event, this relationship between the generated entries applies between the inventory hub CS and each of the inventory purpose CSs. That is, for the set of entries generated for an exchange type impact/event, there is a relationship between the entry for the inventory hub CS and an entry for an inventory purpose CS; this relationship (sometimes referred to as the "opposite sides relationship") is that the opposite effects within those entries are for opposite ones of the categorized side and the common representation side. Put another way, the one of the two ways to perform the update to a balance that is by item type (and irrespective of a categorization scheme) in an entry for the purpose hub CS should be the opposite of the two ways to perform the update to the balance that is by item type (and irrespective of a categorization scheme) in the entry for the inventory hub CS.

As indicated above, the automatic alignment entries generator 122 automatically generates a temporary substitute for each missing entry (also referred to as temporary substitute entries). Each of these temporary substitute entries complies with the "opposite sides relationship" described above but uses a default category of the relevant categorization scheme. Thus, assuming that the second entry was not initially generated, a temporary substitute entry would be automatically generated to operate as the second entry, but this version of the second entry would identify the category of the second categorization scheme to be the default category of the second categorization scheme.

If, as just described, the set of entries for a single impact is missing an entry for one or more the CSs, it is often because the received event from which the set of entries was generated lacked sufficient information to generate the complete set of entries. In such cases, any automatically generated temporary substitute entries can maintain alignment. However, such a missing entry can also result from other types of errors. For instance, another type of error occurs if the set of entries for a single impact includes all the entries it should, but the "opposite sides relationship" does not exist between the entry for the inventory hub CS and the entry for an inventory purpose CS. In some embodiments, the mismatch checker 116 additionally checks the set of entries for compliance with the "opposite sides" relationship. Different embodiments may respond to a failure to comply with the "opposite sides" relationship differently. In some embodiments, the mismatch checker 116 effectively treats the inventory purpose entry as the non-compliant entry, automatically generates a temporary substitute entry that properly reflects the opposite sides relationship and uses the default category, and the non-compliant entry is treated as a separate second impact (meaning, that additional entries will need to be automatically generated to complete this second separate impact).

Thus, the inventory management system 100 can determine, based on the event, the quantity to move from one category to another within or between CSSs, and relative to a given entry generated for a given CSS the inventory management system 100 determines: a) whether one or both of the categories should be reflected in that entry (a transfer event/impact); and b) which of those categories should be reflected under the first way and the second way to process the update.

A variety of terms can be used to refer to the two ways/effects, including: 1) a first way/effect and a second way/effect; 2) an effect and its counter effect; 2) a first way/effect and an opposite second way/effect; 4) a first way/effect and an opposite way/effect; 5) using the accounting terminology debit, and credit; etc.

Exemplary Entry Implementations

Different embodiments may implement the entries differently to reflect which of the running balances of the CSS to update. For instance, in some embodiments, the running balances of the CSS to update can be identified from a combination of data of the entry and the location of the data in that entry. By way of some specific embodiments, each entry may include a first field for the first of the effects to store a first ID, and a second field for the second opposite effect to store second ID. The first and second IDs determine whether the first and second fields will be used to update two running balances on the categorized side or to update one on the categorized side and one on the common representation side. The first ID in the first field, which is for the first effect, identifies which side of the CSS on which to perform the first effect for the update; while the combination of the second ID in the second field, which is of the second opposite effect, identifies which side of the CSS on which to perform the second effect for the update.

Depending on the entry, the first ID and the second ID will be: 1) a destination ID (dest. ID); which is a category ID of the destination of an impact of the event) and a source ID (src. ID); which is a category ID of the destination of an impact of the event); 2) a source ID and a destination ID; 3) a destination ID and the common representation side ID; 4) a source ID and the common representation side ID; 5) the common representation side ID and a destination ID; or 6) the common representation side ID; and a source ID).

Different terms are used for the first field for the first effect (FFFE) and the second field for the second effect (SFSE) (e.g., these fields may be referred to as a category field for the first effect and a category field for the second effect; a first field for the first effect and a second field for the second/opposite effect; a first field for one of the effects and a second field for the other/opposite effect; using accounting terminology, the types may respectively be referred to as debit and credit and the fields may respectively be referred to as debit ID and credit ID), where the first and second IDs stored in these fields: 1) each identify a category ID for use on the categorized side; or 2) one identifies a category ID for use on the categorized side and the other the common representation side ID (while the common representation side ID may be considered separate from the category IDs, the common representation side ID may be considered one of the category IDs that is of a unique type).

By way of example, FIG. 1A shows part of a schema for entries (entry schema 182) according to some embodiments that identify the two opposite effects. In particular, entry schema 182 is shown including a FFFE 184 and a SFSE 186, such that each entry includes a FFE **199*x*.2 and a SFSE 199*x*.3**, where x is used to distinguish between entries. Each of these fields stores a category ID or an ID for the common representation side ID. In embodiments in which the first and second effects are respectively referred to as debit and credit: 1) the debit ID field of an entry storing a category ID indicates that the balance for the combination of the item ID and the category ID on the categorized side of the respective CSS is to be debited; the credit ID field of an entry storing a category ID indicates that the balance for the combination of the item ID and the category ID on the categorized side of the respective CSS is to be credited; 3) the debit ID field of an entry storing the common representation side ID indicates that the balance for the item ID on the common representation side of the respective CSS is to be debited; and 4) the credit ID field of an entry storing the common representation side ID indicates that the balance for the item ID on the common representation side of the respective CSS is to be credited.

FIG. 1A additionally shows parts of entry 173A and entry 173B generated for an exchange type event/impact. Entry 173A includes FFFE 199A.2 and SFSE 199A.3, while entry 173B includes FFFE 199B.2 and SFSE 199B.3. As described above, when an exchange type impact causes the generation of the entry 173A and the entry 173B respectively for CS1 and CS2, one of the FFFE 199A.2 and SFSE 199A.3 will store the common representation side ID and the other will store a category ID for CS1, while the opposite one of the FFFE 199B.2 and SFSE 199B.3 will store the common representation side ID and the other will store a category ID for CS2. This opposite sides relationship between entry 173A and the entry 173B is shown in FIG. 1A by: 1) a double arrowed line 115A between FFFE 199A.2 and SFSE 199B.3; and 2) a double arrowed line 115B between SFSE 199A.3 and FFFE 199B.2. Thus, if FFFE 199A.2 stores the common representation side ID, then SFSE 199B.3 also stores the common representation side ID, the first effect is applied when updating a balance on the common representation side of CSS 152A, and the second effect is applied when updating a balance on the common representation side of CSS 152B. Similarly, if SFSE 199A.3 stores a category ID from CS1, then FFFE 199B.2 stores a category ID from CS2, the second effect is applied when updating a balance on the categorize side of CSS 152A, and the first effect is applied when updating a balance on the categorize side of CSS 152B. Thus, the opposite one of the two effects is applied to update the same type of side of CSS 152A and CS 152B, and the same one of the two effects is applied to update the opposite types of sides of CSS 152A and CSS 152B.

Again, for exchange type impacts/events, this opposite sides relationship applies between the entry for the inventory hub CSS 152A and the entry for each of the inventory purpose CSS 152B to the inventory purpose CSS 152N. Thus, based on which of the fields of a set of entries generated for an impact store the common representation side ID may be used to check that the entry (if any) for the inventory hub CSS has the common representation side ID stored in the field with the opposite effect to the field(s) of each entry (if any) for the inventory purpose CSSs.

Event to Entry

As described above, a set of one or more entries is generated based on an event, where each entry is for one of the CSs and includes side information that identifies: 1) the categorized side and two categories; or 2) the common representation side and a category for the categorized side. For entries generated by the event-based entries generator 112, the CS for an entry and/or the side information may be determined differently in different embodiments. For example, as described later herein, in some embodiments the CS ID and the side information is included in the event. As another example, described later herein, the CS ID and the side information is not within the event, but is determined from information included in the event using categorization rules.

For the entries generated by the automatic alignment entries generator 122, the CS ID and the side information can also be generated differently in different embodiments. For example, in some embodiments the mismatch checker 116 identifies the missing CS IDs based on one or more of the events, the entries generated by the event-based entries generator 112, the orthogonal categorization schemes definition 131, the inventory purpose CS subset(s) 135 (if implemented).

In some embodiments, the determination as to what categories to assign to the entries depends on processes external to the management system. These processes may, at least partially, be based on the organization's internal business processes. As mentioned above and described later, while these assignments may be explicitly provided in the event, these assignments may additionally or alternatively be entered in the management system programmatically (e.g., as categorization rules). For a given transaction involving a given item ID and a given CSS, a given category may be determined based on the event where the event includes sufficient information (e.g., the event may explicitly include the category, or includes characteristic(s) from which the inventory management system 100 can determine the category). In this case, the categorization is performed by the inventory management system 100 when processing that event. Additionally, the categorization may be performed in a sequence of events; such as: 1) an initial event, which lacks sufficient information (e.g., explicitly includes a "default" category, or lacks characteristic(s) from which the inventory management system 100 can determine the category) to generate the needed entry, results in the generation of a temporary substitute entry is generated that identifies a default category; and 2) a subsequent event provides the category (e.g., explicitly includes the category, or includes the missing characteristic(s) from which the management system can now determine the category).

Operation

In some embodiments, the event-based entries generator 112, the mismatch checker 116, and the automatic alignment entries generator 122 operate on each event responsive to receipt by the event-based entries generator 112. In such embodiments, the event-based entries generator 112 responds to each event when that event is provided to the event-based entries generator 112, and the response is to produce a set of entries that are for that event and that are provided to the mismatch checker 116. These entries include, where relevant, the concept of updating the common representation side (e.g., based on the inclusion of the common representation side ID), which facilitates the generation of the temporary substitute entries in some embodiments. This is a first step in providing at least some level of real or near real time awareness of changes in inventory relative to all the categorization schemes.

Similarly, the mismatch checker 116 responds to each set of entries when that set of entries is provided to mismatch checker 116, and the response is to check whether that set of entries is complete and provide any missing CS ID(s) to the automatic alignment entries generator 122. Thus, assuming the events are provided in real or near-real time, any mismatches are detected in real or near-real time on an event-by-event basis. This is a second step in providing at least some level of real or near real time awareness of changes in inventory relative to all the categorization schemes.

Similarly, the automatic alignment entries generator 122 responds to the missing CS ID(s) for each set of events when the missing CS ID(s) are provided to the automatic alignment entries generator 122, and the response is to (in some embodiments, based on the inclusion of the concept of the common representation side in the set of entries from the event-based entries generator 112) generate one or more temporary substitute entries to complete the set of entries for the event. Thus, again assuming the events are provided in real or near-real time, a complete set of entries (an entry for each CSS for which one should have been generated) for the event is provided to the balances updater 128; meaning that the CSSs will be kept in alignment (in terms of at least the total balance for each item type) on an event-by-event basis in real or near-real time. This is a third step in providing at least some level of real or near real time awareness of changes in inventory relative to all the categorization schemes.

Here, "real time" or near real time refers to an inventory management system that can process updates at or near the rate at which they are received, and thus update the balances for the different categorization schemes at or near the rate at which events/impacts/updates are received. This allows a user to base decisions on the current balances as opposed to balances which are out of sync.

In terms of the above described three steps of periodic reconciliation (which are mismatch detection, explanation, and alignment), some embodiments prioritize alignment over explanation. In other words, some embodiments change the order of these steps by performing mismatch detection directly followed by alignment. Thus, such embodiments provide for an inventory management system that performs automatic mismatch detection and automatic alignment in real time or near real time, but delays the categorization as needed using default categories. As a result, if an event is received that requires an update relative for a first type of item and a first categorization scheme, and a necessary corresponding update relative to a second categorization scheme cannot be identified from the event, then the system will automatically detect this mismatch and generate a temporary version of the corresponding update relative to the second categorization scheme. This allows the inventory management system to move forward, even if it is provided incomplete. In addition, this temporary version of the corresponding update means that the total balance for the first type of item can be determined relative to the second categorization scheme in real time or near real time, even though the corresponding update was not categorized. Thus, through this automatic alignment, the total running balances by at least item type are available across the organization in real or near-real time and provide visibility of what inventory can be used. This automatic alignment in terms of quantities and item IDs, but without providing the categorizations, is automatically and in real-time or near real-time performing part of the third step required by periodic reconciliation—that is, providing any required additional entries, but with default categorizations rather than non-default categorizations of the categorization scheme(s)). This ensures that the balances are aligned in terms of quantities and item IDs on a per event basis and does so prior to the second step (explanation) of periodic reconciliation.

Additionally, the second (explanation) step of periodic reconciliation is made easier by allowing for the identification of the entries and events that contributed to change the balance for any default categories. In some embodiments, this is done by: 1) supporting, for a single real world event, the inputting of a single event to the system responsive to which the system can update all relevant CSSs; 2) assigning an event ID to each event; 3) requiring events to be immutable; 4) including the event IDs in the log with the events and in the entries; 5) including in the entries whether they contribute to a default category; and 6) supporting the use of the event IDs in the entries (and the log) to lookup/determine the content of an event and resulting entries (e.g., responsive to a non-zero balance for a given default category in a given CSS, lookup/determine the contributing one or more entries to determine the content of the event(s) and that caused the creation of and/or contributed to the balance in that default category).

Overdraw Checking

In some embodiments, the complete set of entries is provided to an overdraw checker 117 before being provided to the balances updater 128. The overdraw checker 117 can determine whether the event, for which the set of entries was generated, will result in the organization's total balance of one or more of the item types to go negative. In other words, the event is obligating the organization to provide more inventory than the organization currently has on hand. While some embodiments determine whether the update represented by the entries will cause the balance for the item type on the common representation side of the inventory hub CSS 152A to go negative, other embodiments do this in other ways (e.g., use the common representation side of a different CSS; determine whether the update represented by the entries will cause the total of the balances for the items type across all categories on the categorized side of a CSS will go negative; etc.). If the event will cause an overdraw, warning(s) can be provided to an inventory hub CS common representation side overdraw responder 126, which can request confirmation; and if confirmed, allow the set of entries to update the CSSs but also cause a relevant entity (e.g., user) to be notified as soon as possible so corrective action can be taken (e.g., cover the overdraw by acquiring additional inventory of the type of item).

Query Processing

In some embodiments, the engine 110 includes a query processor 111 to receive queries 106. In response, the query processor 111 may: 1) access log 104, the entries 114, and/or the CSS 152A to CSS 152N to collect the relevant data to respond to the queries 106; and 2) generate and provide the query results (e.g., in the form of statements 108) in response to the queries 106.

Assume that there is an exchange type impact/event for which: 1) a first entry is generated for a first categorization scheme; and 2) a second entry should have been generated for a second categorization scheme. As indicated above, the automatic alignment entries generator 122 automatically generates a temporary substitute for each missing entry (also referred to as temporary substitute entries). Thus, assuming only two running balances are being updated by each of the entries: 1) the first entry will indicate that the quantity is to be used (i) the first way to perform an update to a balance for a combination of the type of item and a category of the first categorization scheme and (ii) the second way to perform an update to a balance that is for the type of item and that is irrespective of the first categorization scheme; and 2) the second entry will indicate that the quantity is to be used (i) the second way to perform an update to a balance that is for the type of item and that is irrespective of the second categorization scheme and (ii) the first way to perform an update to a balance that is for a combination of the type of item and a default category of the second categorization scheme.

Performing the update indicated by the second entry generated an updated version of the balance that is for the combination of the type of item and the default category of the second categorization scheme. Data based on the updated version of this balance may be provided for a user to make a decision (e.g., this data may be provided to a second system which will provide it to the user). In some embodiments, the query processor 111 generates a report by:

1) determining that a specific one of the balances is for a combination of the type of item and the default category of the second categorization scheme; 2) determining, based on the type of item, a set of one or more of entries that contributed to the specific one of the balances; 3) determining a set of one or more of the event IDs are associated with the set of one or more of the entries; and 4) accessing a set of one or more of the events from the log based on the set of one or more of the event IDs.

Additionally or alternatively, in some embodiments the inventory management system 100 receives an additional event (e.g., from the second system) that reflects a second change made to the inventory relative to the second categorization scheme; and generates a third entry that is based on the second event, that is for the second categorization scheme, that identifies the type of item, that identifies a second quantity of the type of item, that identifies the default category, that identifies another category of the second categorization scheme, that indicates the second way to perform an update to the updated version of the balance. In this manner, the category that should have been used in the second entry can be later provided by this additional event. That is, the change to the balance for the default category responsive to the exchange type impact/event can be transferred from that default category to the category supplied by the additional event.

Configuration

In some embodiments, the inventory management system 100 includes configuration 130. In some embodiments, configuration 130 includes an orthogonal categorization schemes definition 131 that defines two or more different categorization schemes. In some embodiments, the orthogonal categorization schemes definition 131 includes categorization scheme (CS) IDs 132, which include: 1) an inventory hub CS ID 132A to identify the inventory hub CS and the inventory hub CSS 152A; and 2) inventory purpose CS ID 132B through inventory purpose CS ID 132N to respectively identify inventory purpose CS/inventory purpose CSS 152B through inventory purpose CS/inventory purpose CSS 152N. As described above, the inventory hub CS (e.g., assigned CS1) is treated differently than the other CSs. The inclusion of the inventory hub CS ID 132A allows for this ID to be configurable. While in some embodiments this is configurable, in other embodiments the CS ID used for the inventory hub CS is predefined and unconfigurable.

In some embodiments, configuration 130 additionally includes segmentation scheme(s) definition 136.

In some embodiments, the configuration 130 additionally includes: 1) a categories definition 133 to identify the categories in the different categorization schemes, as well as any optional segmentation scheme(s); and 2) a mappings definition 134 to identify which categories are part of which of the different categorization schemes, as well as any optional segmentation scheme(s).

In some embodiments, the inventory management system 100 additionally or alternatively includes inventory purpose CS subset(s) 135. As described later herein in more detail, one or more of the inventory purpose CSs may have a subset. The subset of a given CS is used in some embodiments to allow for the exclusion of certain impacts from the CS, and thus from excluding the respective CSS from being updated responsive to those updates.

While in some embodiments the configuration information is provided in the manner shown, alternative embodiments may provide it in another manner (e.g., a list of categories in each categorization scheme).

FIG. 1B

FIG. 1B is a block diagram illustrating an event schema according to some embodiments of the invention. In FIG. 1B, the event schema 170 includes: 1) an event ID 172; 2) a timestamp (TS. 174); 3) an item ID; 4) a quantity 178; 5) a sign 179 for the quantity 178; and 6) a set of one or more characteristics 180.

As described above, the event ID 172 may be added by the inventory management system 100 or already be part of the received event. As described above, the event ID may be used to group/identify the set of entries generated for that event. Further, in embodiments that support one or more impacts per event, the event ID may be used to group/identify the set of entries for all these impacts generated for that event.

The timestamp 174 (sometimes referred to as an impact timestamp or impact date) can include a time and date, just a time, or just a date. In embodiments that include the timestamp 174, the timestamp 174 may be used to limit a query to a specific timestamp or range of timestamps. For instance, a query may be for the balance of an item ID in a certain category of a certain CSS at a specific timestamp. If such a query is for a timestamp that is not the current time, different embodiments may be implemented to generate the query result in different ways. For instance, some embodiments store the events and/or entries in temporal database(s) because they provide for more robust time-based querying. As another example, some embodiment reconstructing the balance for the relevant combination of item ID and category ID for the relevant CSS (e.g., if the entries 114 for the CS ID were kept in memory and/or persisted, querying the entries 114 generated for the CS ID that involve that item ID and category ID, and then updating the balances of a temporary version of the CSS with those entries; replaying certain events from the log 104 (e.g., those that impact that item ID, category ID, and CS ID up to and including the specific timestamp) to generate the needed entries and then updating the balances of a temporary version of the CSS; replaying all events from the log 104 up to the timestamp and doing the same; etc.).

The quantity 178 and sign 179 reflect the above-described design choice of representing the balance of the impact/event using a single quantity and a sign, where the sign can be positive or negative. Alternative embodiments could use alternative techniques as discussed above.

The set of one or more characteristics (char. 180) may be used for one or more purposes depending on the embodiment. As described above, a set of entries is generated for each event, and each entry is for one CS.

One example is described later herein with reference to embodiments that use categorization rules. In some embodiments, the set of characteristics includes one or more: 1) a set of one or more event characteristics; 2) a set of one or more impact characteristics; and 3) a set of one or more item characteristics, of which the item ID may be considered one. In some embodiments with event characteristics, an event taxonomy is defined based on events expected to be received from across the entire entity (standardized). In some embodiments, the event taxonomy is used to identify what happened to the item ID(s) and/or to segregate where an item is in a lifecycle. In some embodiments with item characteristics, an item taxonomy is defined. While the event taxonomy is typically at a high level, the item taxonomy tends to be more specific. In some embodiments, the event taxonomy has an implicit relationship with the item taxonomy. In some embodiments that support multiple impacts per event, impact characteristics may be used to provide different characteristics for different impacts on the same item ID(s).

FIG. 1B additionally illustrates event 173 and an event subpart 171 respectively representing all the data in an event according to the event schema 170 and only some of that data. In particular, the event subpart 171 includes a quantity 171.1, a sign 171.2, and a set of characteristics 171.3, as well as optionally other data from the event 173.

FIG. 1C

FIG. 1C is a block diagram illustrating an entry schema according to some embodiments of the invention. In FIG. 1C, entry schema 182 includes: 1) the event ID 172; 2) the timestamp (TS. 174); 3) the item ID 176; 4) the quantity 178; 5) the FFFE 184; and 6) the SFSE 186. Use of the event ID 172 in the event schema 170 and the entry schema 182 is used in some embodiments, as described above, to group/identify from the sets of entries generated for different events. In a similar manner to the event schema 170, the entry schema 182 also includes the timestamp (TS. 174) to support querying by timestamp or range of timestamps are described above. The other parts of the entry schema 182 have been previously described.

FIG. 1C additionally illustrates entry 173A and an entry subpart 199A respectively representing all the data in an entry according to the entry schema 182 and only some of that data. Entry subpart 199A includes the data for the quantity 199A.1, the FFFE 199A.2, and the SFSE 199A.3, as well as optionally other data from the entry 173A. Also, FIG. 1C illustrates entry 173B and an entry subpart 199B respectively representing all the data in an entry according to the entry schema 182 and only some of that data. Entry subpart 199B includes a quantity 199B.1, a FFFE 199B.2, and a SFSE 199B.3, as well as optionally other data from entry 173A. As in FIG. 1A, FIG. 1C also includes double arrowed lines 115A and 115B to show the opposite sides relationship between 1) FFFE 199A.2 and SFSE 199B.3; and 2) SFSE 199A.3 and FFFE 199B.2.

In some embodiments, where the event 173 is an exchange type event involves two balances on each of the inventory hub CS and an inventory purpose CS, the generating the entry 173A from the event 173 includes: 1) determining, based on the set of one or more characteristics, that the entry 173A is for the categorization scheme CS1; and 2) determining, based on the entry 173A being for the categorization scheme CS1 and the sign 171.2, which of the first way and the second way is to be used to perform the update to the categorized side 154A and the common representation side 160 of the inventory hub CSS 152A (and thus, the data for FFFE 199A.2 and SFSE 199A.3). The same is true for the entry 173B for CS2, and thus, the data for FFFE 199B.2 and SFSE 199B.3; but recall that which of the categorized side 154B and the common representation side 160 of the inventory purpose CSS 152B is to be updated using the first and second ways will be opposite relative to entry 173A per the opposite sides relationship described above.

As illustrated, entry schema 182 includes one quantity 178 for both FFFE 184 and SFSE 186, where FFFE 184 and SFSE 186 may be considered two parts of an entry. Where the first part has an effect that is opposite of the second part, but both parts involve the same quantity. Other embodiments may have a separate quantity for each FFFE 184 and SFSE 186, but the quantities are the same. In alternative embodiments, an entry may include a plurality of parts, each of the parts includes a quantity and a category for an effect (either the first way/effect or the second way effect), a single first one of the plurality of parts has a quantity that is equal to a cumulative quantity of the others of the plurality of parts, and the effect for category of the single first part is opposite of the effect for the categories of the others of the plurality of parts.

FIG. 1D

FIG. 1D is a block diagram illustrating schemas for categorized and common representation sides of CSSs according to some embodiments of the invention. FIG. 1D shows: 1) the inventory hub CSS 152A that includes the categorized side 154A; 2) the inventory purpose CSS 152B that includes the categorized side 154B; and 3) the common representation side 160 that is part of both the inventory hub CSS 152A and the inventory purpose CSS 152B.

In addition, FIG. 1D shows a categorized side schema 153 that includes: 1) the item ID 176; 2) a category 188; 3) a quantity debit 190, and 4) a quantity credit 192. The categorized side schema 153 is used in the categorized side 154A and 154B.

FIG. 1D also shows data that may be in the categorized side 154A using 156A.x, where x has the value 1 through 5. Data 156A.1 and data 156A.4 are below category 188 and represent category IDs. Data 156.2 is below quantity debit 190 and represents a value, while data 156A.3 and 156A.5 are below quantity credit 192 and represent values.

Similarly, FIG. 1D shows data that may be in the categorized side 154B using data 156B.x, where x is an integer. Data 156B.1 and data 156B.4 are below category 188 and represent category IDs. Data 15B.2 is below quantity debit 190 and represents a value, while data 156B.3 and 156B.5 are below quantity credit 192 and represent values.

Also, FIG. 1D shows a common representation side schema 161 that is inside the common representation side 160 and that includes: 1) the item ID 176; 2) the quantity debit 190, and 4) the quantity credit 192. FIG. 1D also shows data that may be in the common representation side 160 of: 1) the inventory hub CSS 152A using 160A.x; and 2) the inventory purpose CSS 152B using 160B.x. Data 160A.1 and data 160B.1 are below quantity debit 190 and represent values, while data 160A.2 and data 160B.2 are below quantity credit 192 and represent values.

Later herein different ones of the data 156A.x, data 160A.x, data 156B.x, and data 160B.x will be used to represent balance updates responsive to different types of event/impact types, as well as exemplary automatic alignment entry generation.

Finally, FIG. 1D includes: 1) a double arrowed line 165A between data 160A.2 and data 160B.1; and 2) a double arrowed line 165B between data 160A.1 and data 160B.2. The double arrowed lines 165A and 165B represent a relationship (sometimes referred to as the "common representation side equal and opposite relationship") between the running balances on the common representation sides of the inventory hub CSS 152A and the inventory purpose CSS 152B. More specifically, the double arrowed lines 165A and 165B represent that the running balance on the common representation side of the inventory hub CSS 152A for a given item ID is equal and opposite to the running balance on the common representation side of the inventory purpose CSS 152B for that item ID. Since FIG. 1D illustrates the balances implemented using debit and credit: 1) the running total debit and the running total credit for each item type on the common representation side of the inventory hub CSS 152A will be respectively equal to the running total credit and the running total debit for each item type on the common representation side of the inventory purpose CSS 152B. While FIG. 1D illustrates the balances being implemented using debit and credit, other embodiments may use other formats as previously described. For instance, if the balances were implemented using a quantity and a sign for that quantity, then the running balances on the common representation side of the inventory hub CSS 152A and the inventory purpose CSS 152B for a given item ID would be equal and opposite (that is, the quantities would be the same, but the signs would be opposite).

This common representation side equal and opposite relationship applies to the running balances for the different item ID on the common representation side of the inventory hub CSS 152A and the common representation side of each of the inventory purpose CSS 152B to CSS 152N to the inventory purpose CSS 152N (except where subset(s) are used as described later herein to exclude certain events/impacts from impacting one or more of the inventory purpose CSSs).

For a given entry for a given CSS, the inventory management system 100 determines which of the running balances to update. As indicated above, each entry will identify the categorized side or the categorized side and the common representation side. Assuming a CSS has a debit and a credit running balances on both the categorized side and the common representation side (as shown), then: 1) which of the side(s) of the CSS to update is based on the category IDs of the entry; 2) which of debit and credit running balances of those side(s) to update for each category ID is based on whether that category ID is the one stored in FFFE 184 or the SFSE 186; 3) for the one or more updates to the categorized side, the specific one of the debit or credit running balances to update is based on the item ID and the category ID; and 4) for any update to the common representation side, the specific one of the debit or credit running balances to update is based on the item ID (irrespective of the category ID).

FIG. 1E

FIG. 1E is a block diagram illustrating some detail regarding configuration 130 according to some embodiments of the invention. The categorization scheme (CS) IDs 132 include CS1 and CS2 respectively for the inventory hub CS ID 132A and inventory purpose CS ID 132B.

In some embodiments, the categories in the categories definition 133 include a category ID and/or a meaningful category name. However, for clarity of this description and not by way of limitation, these categories are labeled such that the labels can be used to identify which category scheme to which they apply. Specifically, the categories are labeled using the format CGx.y, where x is the CS ID to which the category belongs, and where y is used to distinguish between categories within that category scheme. FIG. 1E shows CG1.1 to CG1.M, CG2.1 to CG2.N, and so on.

The mappings definition 134 illustrates that CS1.1-CS1.M are part of CS1, while CG2.1-CG2.N are part of CS2. While FIG. 1E illustrates the categories definition 133 using labels that themselves identify to which CS they are a part, the mappings definition 134 may be used in embodiments in which that is not the case. Also, while embodiments illustrate a particular structure (e.g., a table) and a particular way to indicate which categories are part of which CS, alternative embodiments may use alternative ways.

FIG. 1F

FIG. 1F is a block diagram describing relationships between CSSs according to some embodiments of the invention. FIG. 1F is included for descriptive purposes, and thus does not need to be stored within inventory management system 100. FIG. 1F shows that CS1 and CS2 are orthogonal categorization schemes that respectively include the CG1 categories and the CG2 categories in the categories definition 133. These two CSs can be viewed as each providing different dimensions, referred to here as dimension1 and dimension2. Additional dimensions will be added in later examples, and thus the inventory management system 100 supports multi-dimensional data analysis and can also be referred to as a multi-dimensional inventory management system.

FIG. 1F additionally shows that there is a purpose for each CS. The purpose for CS1 is to track and manage according to a first aspect by a first dimension (dimension1). Since CS1 is the inventory hub CS, the first aspect to inventory. The purpose of CS2 is to track and manage according to a second aspect by a second dimension (dimension2).

Also, FIG. 1F shows a first example application (exemplary application 1) of what the dimensions may be, the categories may represent, and what the resulting purpose may be for CS1 and CS2. In exemplary application 1, dimension1 is the location of an item, the CG1 categories represent different locations, and the purpose is to track and manage the inventory by the locations; while dimension2 is the division within the organization responsible for the item, the CG2 categories represent the different divisions (also referred to as departments, business units, etc.) of the organization, and the purpose is to track and manage the inflow/outflow performance of items by the divisions.

By way of example, where different systems are used to manage different, but potentially overlapping, groups of CSSs, what one system manages may vary by item type, CSSs, and/or categories (L item IDs to M dimensions to N categories, where each of L, M, and N can be 1 or more and where at least one is more than 1). For example: 1) more than one item ID in one dimension (location) in one category (Paris); 2) more than one item ID in more than one dimension (location, source) in one category (Paris); 3) one item ID in one dimension (location) in more than on category (Paris, New York); etc.

FIG. 1G

Figure 1G:
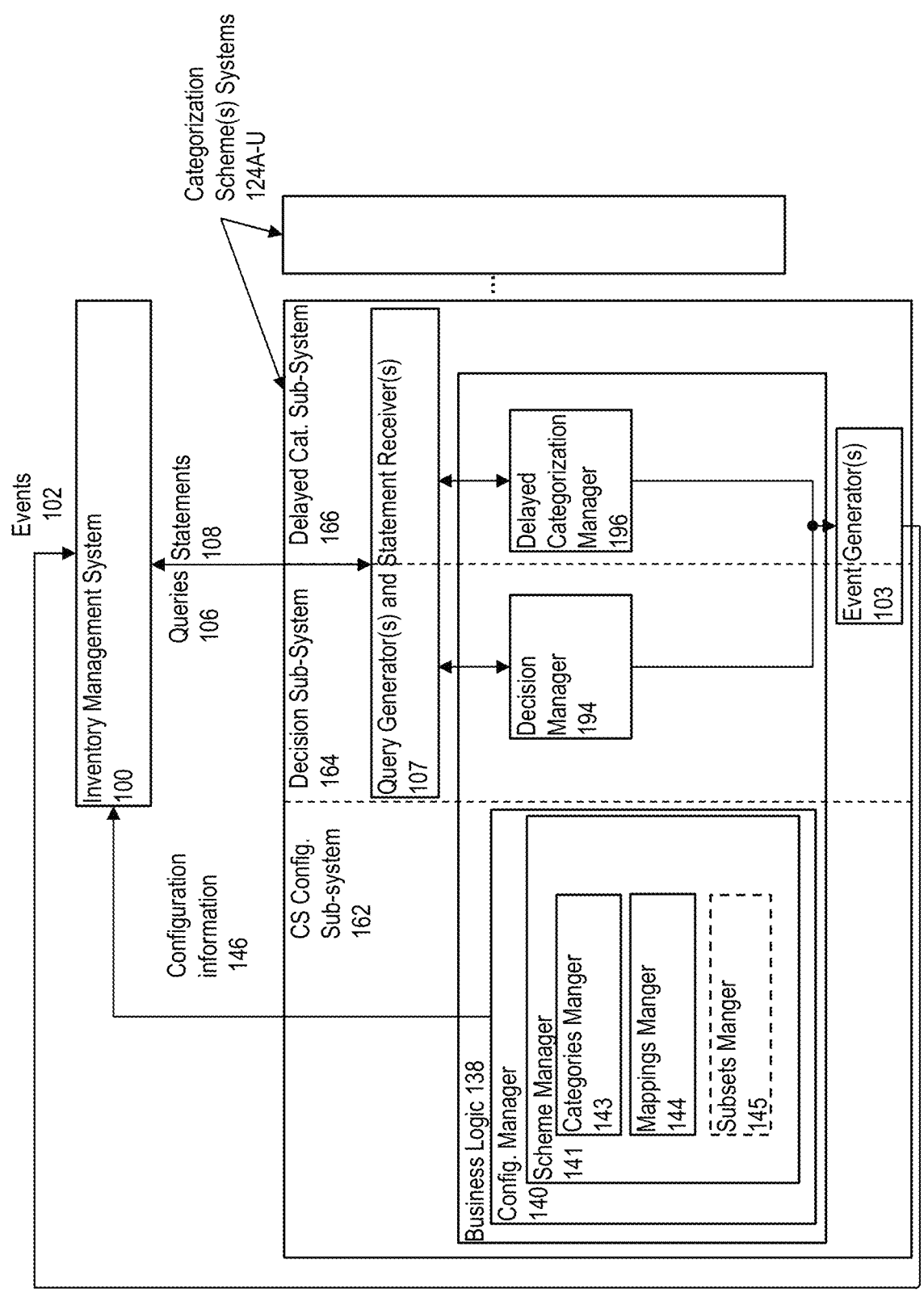
FIG. 1G is a block diagram describing subsystems external to the inventory management system according to some embodiments of the invention.

FIG. 1G is a block diagram describing subsystems external to the inventory management system according to some embodiments of the invention. FIG. 1G shows a set of one or more categorization scheme(s) systems 124A-U, where the term categorization scheme(s) system refers to a system that is external to the inventory management system 100 and that interacts with the inventory management system 100 relative to at least (and typically less than all) of the categorization schemes. Typically, at least some of the different ones of the categorization scheme(s) systems 124A-U interact with the inventory management system 100 relative to different ones of the categorization schemes.

The interactions may include configuration management, querying, query result processing, and event submission. In some embodiments, categorization scheme(s) system 124A includes: 1) a query generator(s) and statement receiver(s) 107 to submit queries 106 and receive in response query results (which may be in the form of statements 108, or may be the data needed for the system to perform query result processing to generate statements), 2) an event generator(s) 103 to submits events 102; and 3) business logic 138 to interact with the inventory management system 100, the query generator(s) and statement receiver(s) 107, and the event generator(s) 103 to manage at least some of the configuration 130, cause the generation of queries 106, process received query results (e.g., statements 108), and cause the generation of events via the event generator(s) 103. Thus, while in some embodiments the inventory management system 100 generated and transmits statements 108 to external systems, some embodiments additionally or alternatively generated and transmit the query results in another form and the external systems display and/or process those query results.

Business logic 138 includes a configuration manager 140 to submit configuration information 146 to update the configuration 130 for one of more of the categorization schemes. In some embodiments, the configuration manager 140 includes a scheme manager 141 to interact with the orthogonal categorization schemes definition 131, the segmentation scheme(s) definition 136 (if implemented), and the inventory purpose CS subset(s) 135 (if implemented). For example, the scheme manager 141 may: 1) interact with the categorization scheme IDs 132 to add or remove CS ID(s); 2) interact via a categories manager 143 with the categories definition 133 to add, change, or remove categories; 3) interact via a mappings manager 144 with the mappings definition 134 to add, change, or remove which categories are part of which CSs; and 4) interact via a subset manager 145 with inventory purpose CS subset(s) 135 to add, change, or remove data identifying a subset for a given CS.

In addition, the business logic includes a decision manager 194 to: 1) cause the generation of queries and/or process received statements; and 2) make and/or receive decisions regarding the inventory relative to a CS that are to be reflected through the generation of some of the events 102 via the event generator(s) 103. The submission of these events can be viewed as a manner for the decisions to be recorded in the inventory management system 100, including the above-described propagation of impacts of the decisions relative to others of the categorization schemes.

Also, the business logic 138 includes a delayed categorization manager 196 to: 1) cause the generation of queries and/or process received statements; and 2) make and/or receive an instruction to move items currently categorized in a default category to one of the non-default categories of a CS, and cause these movements to be recorded in the inventory management system 100 through the generation of some of the events 102 via the event generator(s) 103. Thus, if an earlier event caused the automatic generation of an automatic alignment entry (and thus an entry that uses a default category), the delayed categorization manager 196 can be viewed as a manner for the movement from the delayed category to be recorded by the inventory management system 100.

In FIG. 1G, separate sub-systems are shown for performing different ones of these interactions. Specifically, categorization scheme(s) system 124A is shown including: 1) a CS configuration sub-system 162 including the configuration manager 140; 2) a decision sub-system 164 including the decision manager 194; and 3) a delayed categorization sub-system 166 including the delayed categorization manager 196. While in some embodiments the decision sub-system 164 and the delayed categorization sub-system 166 may share one or more query generators, one or more statement receivers, and/or one or more event generators, some embodiments additionally or alternatively are implemented to have separate query generator(s), statement receiver(s), and/or an event generator(s) for the decision sub-system 164 and the delayed categorization sub-system 166.

While FIG. 1G illustrates that a single categorization scheme(s) system 124A may include all the above, embodiments may additionally or alternatively have separate systems implementing a subset of the sub-systems. For example, for a given CS, there may be a separate system for implementing each of the CS configuration sub-system 162, decision sub-system 164, and delayed categorization sub-system 168. This may be useful, for example, if different users are responsible for these different interactions; such as: 1) a first user responsible for setting up and maintaining the configuration for a CS; 2) a second user responsible for making decisions relative to the CS, where the events reflecting these decisions will at least sometimes result in the inventory management system 100 automatically generating alignment entries that make use of a default category; and 3) a third user responsible for reacting (e.g., responsive to a notification, periodically, or both) to items being categorized under the default category of the CS by causing the submission of events that move the items from the default category to a non-default category of the CS.

Advantages

As previously described, inventory management at certain organizations involves different users (optionally in different time zones) using different categorization schemes and periodic reconciliation. While in some embodiments the categorized sides of the CSSs provide for this, the common representation side is maintained to ease reconciliation (automate mismatch detection, optionally automate alignment, and ease the explanation part). Advantageously, what is included on the common representation side is based on what is already being generated for the categorized side, so it does not require additional information be included in events, in the configuration information, etc.

While implementing both the categorized sides and the common representation sides requires additional storage and processing, the benefits of doing so may include an overall reduction in storage and/or processing relative to the previously described periodic reconciliation process. In addition, where multiple different systems make use of different ones of the categorization schemes and report events to the inventory management system, these multiple different systems may require less storage and processing since they need only submit queries to the inventory management system, display results of those queries, receive user decisions, and submit those decisions as events to the inventory management system (and thus avoid the storage and processing required by each such system to attempt to manage the inventory relative to their categorization scheme and participate in periodic reconciliation).

In addition, some embodiments of the invention may accommodate both streaming and non-streaming events. Additional or alternatively, some embodiments of this inventory management can be for tangible items and/or intangible items, and can include the tracking items responsive to actual transfers of the items as well as agreements to transfer items in the future (that is, agreements that are to transfer items and that are entered into before the items are actually transferred).

FIG. 2A

Figure 2A:
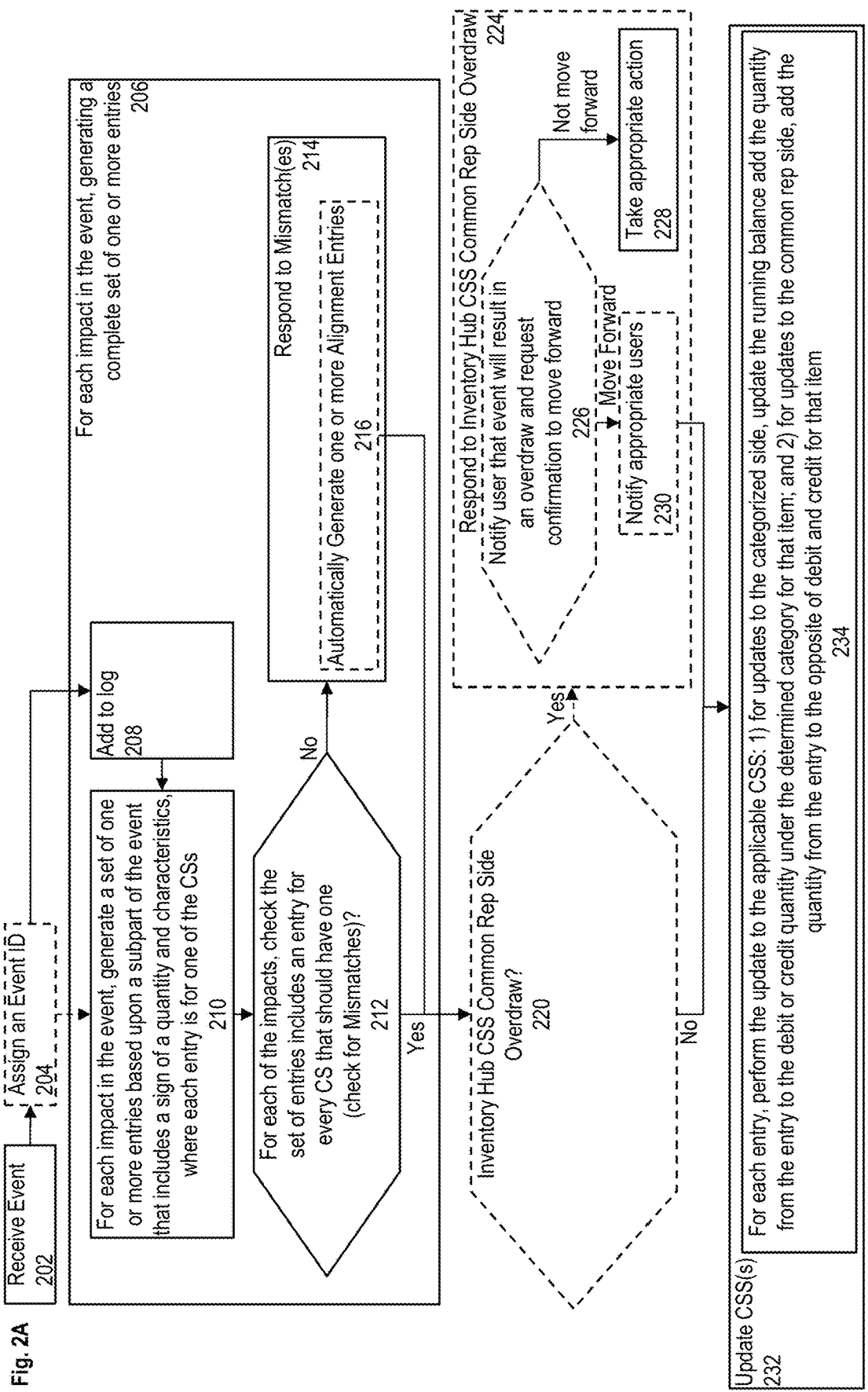
FIG. 2A is a flow diagram illustrating the operation of an inventory management according to some embodiments of the invention.

FIG. 2A is a flow diagram illustrating the operation of an inventory management according to some embodiments of the invention. At block 202, an event is received, and control passes to block 204. In optional block 204, the event is assigned an event ID, and control passes to block 206.

In block 206, for each impact in the event, a complete set of one or more entries is generated based on the event. From block 206, control passes to block 220.

Block 206 includes block 208 and block 210. While in some embodiments the event is sent to both block 208 and block 210, in other embodiments the event is sent through block 208 to block 210. If an event is being replayed from the log later, then the event goes from block 208 to block 210.

In block 210, for each impact in the event, an initial set of one or more entries is generated based upon a subpart of the event that includes a sign of a quantity and characteristics, where each entry is for one of the CSs. With reference to the embodiment shown in FIG. 1A, block 210 may be performed by event-based entries generator 112. From block 210, control passes to block 212. Additional explanation regarding how some embodiments perform block 210 are described below.

As shown in block 212, for each of the impacts, the set of entries is checked to ensure that there is an entry for every CS that should have one. If not control passes to block 214; otherwise, to block 220. With reference to the embodiment shown in FIG. 1A, block 212 may be performed by mismatch checker 116.

In some embodiments, the inventory management system is designed such that each event will impact all CSS(s) that it should. As a first example, assume an embodiment in which there is an inventory hub CSS and an inventory purpose CSS that are fully inclusive (no subset is used). In such an embodiment, each exchange type event (per above, an event with one exchange type impact) will cause the generation of an entry for each of these CSSs; while a transfer type event (per above, an event with one transfer type impact) will cause the generation of an entry for one of the CSSs. Thus, in such an embodiment, checking that the set of one or more entries generated for an event includes an entry for every CSS that should have one is based at least in part on the type of event (exchange or transfer). As a second example, assume an embodiment in which the inventory hub CSS is fully inclusive, but at least one inventory purpose CSS is defined to be partially exclusive (e.g., by including only events/impacts that meet one or more criteria or by excluding events/impacts that meet one or more criteria; where the criteria can be based on various factors, such as item IDs, characteristics in the event, etc.). In such an embodiment, while a transfer type event will still involve only one CSS, an exchange type event will only result in an entry being generated for the inventory purpose CSS if the event/impact qualifies as one being managed by that inventory purpose CSS (in other words, if the event/impact is excluded from the inventory purpose CSS, the lack of the generation of an entry for that inventory purpose CSS is not a mismatch). Thus, in such an embodiment, checking that the set of one or more entries generated for an event includes an entry for every CSS that should have one is based at least in part on the type of event (exchange or transfer) and whether the event/impact qualifies for inclusion by any partially exclusive inventory purpose CSSs. By way of another example, assume an exchange type event is being processed by an inventory management system with an inventory hub CSS that is fully inclusive, a first inventory purpose CSS that is fully inclusive, and a second inventory purpose CSS that is partially exclusive. In such a scenario, the set of one or more entries generated for the event should include an entry for each of the inventory hub CSS and the first inventory purpose CSS, but should only include one for the second inventory purpose CSS if the event/impact qualifies for inclusion.

In block 214, any mismatch(es) is responded to. With reference to the embodiment shown in FIG. 1A, block 212 may be performed by mismatch responder 118. As previously described, different embodiments may respond differently. In some such embodiments, block 214 includes optional block 216 in which one or more alignment entries are automatically generated. With reference to the embodiment shown in FIG. 1A, block 212 may be performed by automatic alignment entries generator 122. As a result of block 216, one or more temporary substitute entries were generated to supply the missing one or more entries needed to complete the initial set of entries for the impact/event.

In optional block 220, it is determined if the event will cause the common representation side of the inventory hub CSS to overdraw. If so, control passes to block 224; otherwise, to block 232. With reference to the embodiment shown in FIG. 1A, block 220 may be performed by overdraw checker 117. In some embodiments, block 220 is performed by determining, for each impacted item ID on the common representation side of the inventory hub CSS, whether the balance reflects credit>debit. Since the inventory hub CSS is fully inclusive and the balances on the common representation side are by item ID (irrespective of any categories), these balances reflect the total inventory for each item ID. Therefore, these balances can be used to determine if the event results in the quantity of items of the item ID managed by the organization going negative.

In optional block 224, a response to the inventory hub CSS common representation side overdraw is sought. From block 224, control passes to block 232. With reference to the embodiment shown in FIG. 1A, block 220 may be performed by inventory hub CS common representation side overdraw responder 126. In some embodiments, block 224 includes optional block 226 in which the user responsible for the submission of the event is notified that the event will result in an overdraw and is requested to confirm the inventory management system should move forward with processing the event. If the user confirms the event, control passes to block 230; otherwise, to block 228.

In block 228, appropriate action is taken. Different embodiments may support different forms of appropriate action (e.g., allowing the user to withdraw the event; allowing the user to submit a different event that is to be processed ahead of the overdraw causing event and that will prevent the overdraw; etc.).

In block 230, one or more appropriate users are notified that the overdraw is occurring, and control passes to block 232. The one or more appropriate users may include the user responsible for the event being submitted, a supervisor of that user, and/or a user responsible for covering overdraws.

As shown in block 232, the CSS(s) are updated responsive to the set of entries generated for the event. With reference to the embodiment shown in FIG. 1A, block 232 may be performed by balances updater 128. In some embodiments, block 232 includes block 234. In block 234, for each entry, the update to the applicable CSS is performed by: 1) for update(s) to the categorized side, update the running balance by adding the quantity from the entry to the debit or credit quantity under the determined category for that item ID; and 2) for any update(s) to the common representation side, add the quantity from the entry to the opposite of debit and credit for that item ID.

FIG. 2B

Figure 2B:
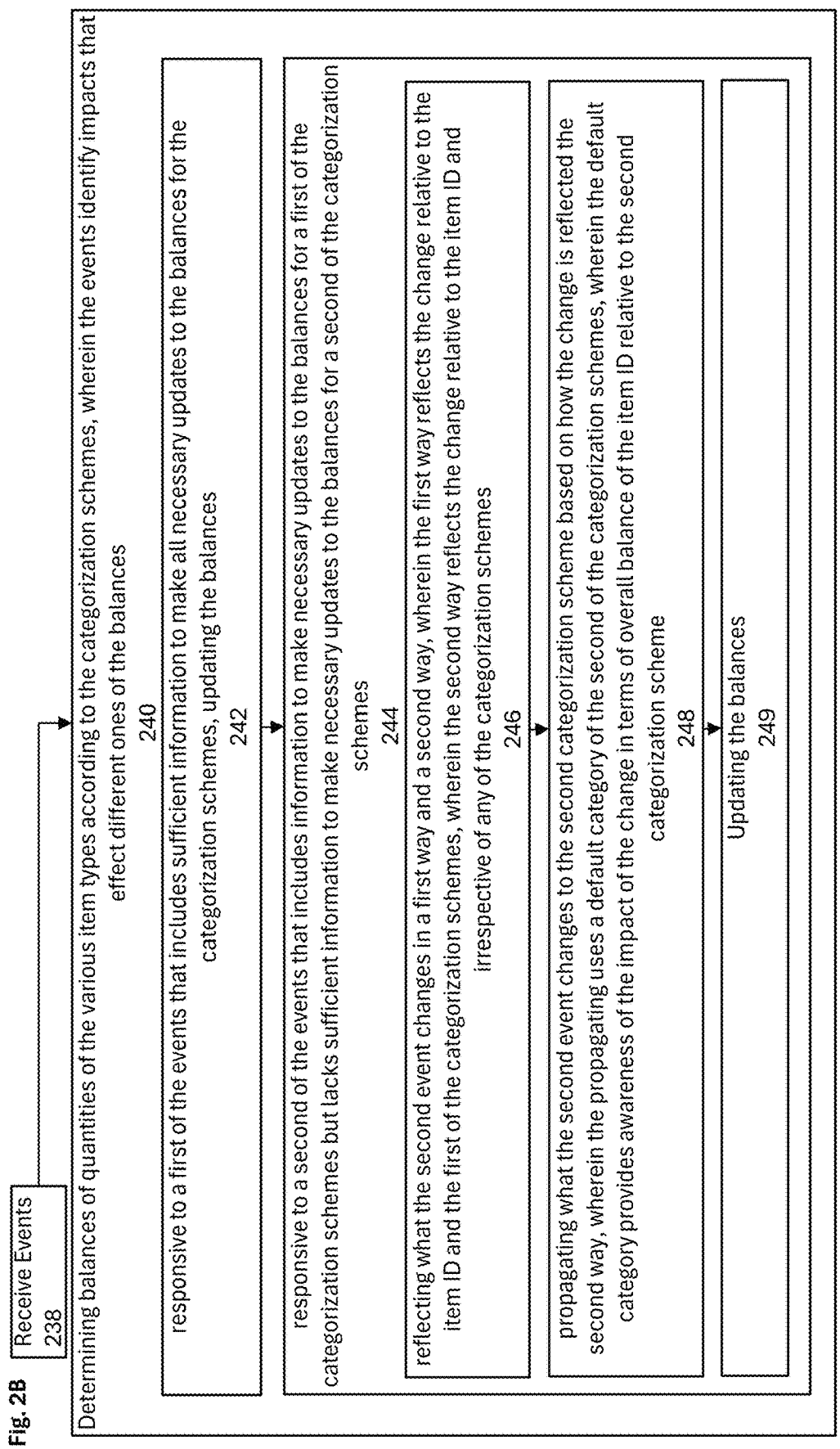
FIG. 2B is a flow diagram illustrating an alternative manner of viewing operation of an inventory management according to some embodiments of the invention.

FIG. 2B is a flow diagram illustrating an alternative manner of viewing operation of an inventory management according to some embodiments of the invention. At block 238, events are received, and control passes to block 240.

In block 240, responsive to a plurality of events, balances of quantities of the various item types are determined according to the categorization schemes, wherein the events identify impacts that affect different ones of the balances. Block 242 includes blocks 242-249.

In block 242, responsive to a first of the events that includes sufficient information to make all necessary updates to balances for the categorization schemes, updating the balances. From block 242, control passes to block 244. With reference to the embodiment shown in FIG. 1A, block 242 represents event-based entries generator 112 generating the complete set of entries for the first event, mismatch checker 116 finding no mismatches, overdraw checker 117 (if implemented) not detecting any overdraw, and balances updater 128 updating the CSSs.

Block 244 represents a situation in which another of the events that includes information to make necessary updates to the balances for a first of the categorization schemes but lacks sufficient information to make necessary updates to the balances for a second of the categorization schemes. Block 244 includes block 246, block 248, and block 249.

In block 246, an entry is generated that reflects what the second event changes in a first way and a second way, wherein the first way reflects the change relative to the item ID and the first of the categorization schemes, wherein the second way reflects the change relative to the item ID and irrespective of any of the categorization schemes. With reference to the embodiment shown in FIG. 1A, block 244 and block 246 represent event-based entries generator 112 generating an initial set of one or more entries, but the mismatch checker 116 determining that there is at least one mismatch.

In block 248, what the second event changes is propagated to the second categorization scheme based on how the change is reflected the second way, wherein the propagating uses a default category of the second of the categorization schemes, and wherein the default category provides awareness of the impact of the change in terms of overall balance of the item ID relative to the second categorization scheme. From block 248, control passes to block 249. With reference to the embodiment shown in FIG. 1A, block 248 represents mismatch responder 118 responding to the mismatch. With reference to the embodiment shown in FIG. 1A, block 249 represents balances updater 128 updates the balances in the CSSs.

FIG. 2C

FIG. 2C is a transaction diagram illustrating the capturing of an opportunity according to some embodiments of the invention. In FIG. 2C, line 250 and line 251 separate a first user 252, an inventory management system 254, and a second user 256. The transactional diagram starts with block 258 in which the inventory management system 254 updates one or more of the CSSs. Following the update, statement 261, which is based on balances of the CSS for the first CS, is caused to be displayed to the first user 252. For instance, statement 261 may reflect that a current quantity (CQ) of item ID 1 is available.

In block 262, the first user 252 using the first CS performs a transaction in which a quantity QADD of item ID 1 will or has been received by the organization. Event 263 is sent to inventory management system 254 to record the transaction.

Block 264 shows that, responsive to event 263, the inventory management system 254 updates the CSSs. Event 263, having been generated by the first user 252 using the first CS, will reflect an impact relative to the first CS. However, as previously described, responsive to event 263 a complete set of entries will be generated. This set of entries will include an entry to make the update relative to the second CS, which entry was either generated because the event had sufficient information or automatically generated because the event lacked sufficient information to cause the entry's generation. Regardless, the set of entries will indicate updates to the balances of the first CS and the second CS. As a result, at least the total balance for item ID 1 for the second CS will reflect CQ+QADD.

Statement 265 is sent by inventory management system 254 to the second user 256, which user is using the second CS. Following the update, statement 265, which is based on balances of the CSS for the second CS, is caused to be displayed to the second user 256. Thus, statement 265 will reflect the current quantity (CQ) of item ID 1. As a result, block 266 shows that the second user 256 will be aware of the increase in the current quantity of item ID 1, and thus the second user 256 is aware that the increased CQ of item ID 1 is available for use. This avoids incurring any opportunity costs that may have resulted from the second user 256 having not been aware of the increase until the next reconciliation in a system that uses periodic reconciliation. In other words, this avoids the opportunity costs associated with lack of awareness of incoming inventory, and thus enables optimized use of the inventory.

Embodiments may support one or more different types of triggers to cause statements (e.g., statement 261 and/or statement 265) to be sent, including receipt of an event, elapsing of a timer, a threshold number of events being received since the last statement, receipt of a query, etc.).

FIG. 2D

Figure 2D:
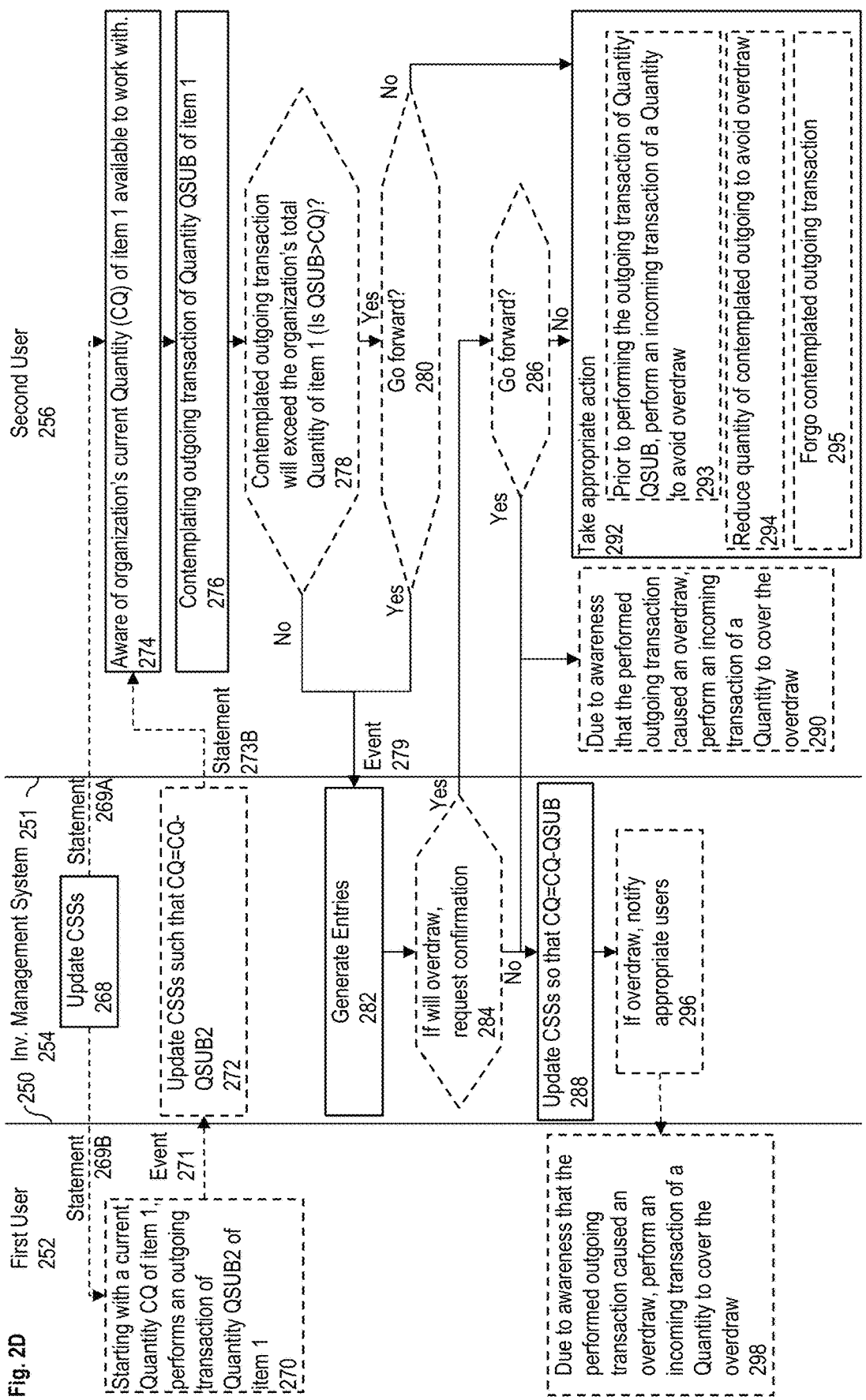
FIG. 2D is a transaction diagram illustrating awareness relative to an overdraw according to some embodiments of the invention.

FIG. 2D is a transaction diagram illustrating awareness relative to an overdraw according to some embodiments of the invention. Like FIG. 2C, FIG. 2D includes line 250 and line 251 that separate a first user 252, an inventory management system 254, and a second user 256. The transactional diagram starts with block 268 in which the inventory management system 254 updates one or more of the CSSs. Following the update, FIG. 2D illustrates two optional flows that each provide a benefit.

In the first flow, a statement 269A, which is based on balances of the CSS for the second CS, is caused to be displayed to the second user 256 in block 274. The second user 256 is using the second CS. Thus, statement 269A will reflect the current quantity (CQ) of item ID 1 relative to the second CS. From block 274, control passes to block 276.

In block 276, the second user 256 inputs a contemplated transaction, relative to the second CS, which will transfer out of the organization a quantity QSUB of item ID 1. From block 276, control passes to block 278.

In optional block 278, the system determines whether the contemplated transaction will exceed the organization's total quantity of item ID 1 (e.g., is the quantity QSUB>than the current quantity (CG)). If so, control passes to block 280; otherwise, an event 279 is submitted to pass control to block 282. In some embodiments, block 278 is performed based on the statement 269A and the input of quantity QSUB for item ID 1 relative to the second CS by the second user. For example, if the statement 269A includes the balance for item ID 1 on the common representation side of the CSS for the second CS, then this can be determined by subtracting the quantity QUSB from the balance for item ID 1 on the common representation side. As another example, if the statement 269A includes all of the balance(s) for item ID 1 under any category on the categorized side of the CSS for the second CS, then this can be determined by subtracting the quantity QUSB from the sum all of the balance(s) for item ID 1 under all categories on the categorized side.

In optional block 280, the second user 256 is requested to confirm the transaction should go forward even though it is likely to cause an overdraw. If the second user 256 confirms, then event 279 is submitted to pass control to block 282; otherwise, control passes to block 292.

Event 279, having been submitted responsive to the second user 256 using the second CS, will reflect an impact relative to the second CS. However, as previously described, responsive to event 279 a complete set of entries will be generated in block 282. This set of entries will include an entry to make the update relative to the first CS, which entry was either generated because the event had sufficient information or automatically generated because the event lacked sufficient information to cause the entry's generation. Regardless, the set of entries will indicate updates to the balances of the first CS and the second CS. Control passes from block 282 to block 284.

In optional block 284, inventory management system 254 determines whether the set of entries will cause an overdraw. If so, control passes to block 286 to notify the user and request confirmation; otherwise, control passes to block 288. In some embodiments, block 284 is performed based on the balance on a CSS and the input of quantity QSUB for item ID 1 relative to the second CS by the second user. For example, block 284 may be performed based on the balance for item ID 1 on the common representation side of the inventory hub CSS; specifically, by subtracting the quantity QUSB from the balance for item ID 1 on the common representation side. As another example, block 284 may be performed based on all balance(s) for item ID 1 under any category on the categorized side of the inventory hub CSS; specifically, by subtracting the quantity QUSB from the sum all the balance(s) for item ID 1 under all categories on the categorized side.

Like block 280, optional block 286 shows the second user 256 being requested to confirm the transaction should go forward even though it is likely to cause an overdraw. If the second user 256 confirms, then control passes to block 288 and optional block 290; otherwise, control passes to block 292.

In block 288, the CSSs are updated, and control passes to block 296. In optional block 290, due to awareness that the performed outgoing transaction is causing an overdraw, the second user can perform an incoming transaction of a quantity to cover the overdraw.

Similar to block 284, optional block 296 shows the inventory management system 254 determining if an overdraw has occurred. If so, control passes to block 298; otherwise, the flow ends.

Optional block 298 shows a situation in which the appropriate users to be notified include the first user 252. As shown in block 298, due to awareness that the performed outgoing transaction caused an overdraw, the first user 252 may perform an incoming transaction of a Quantity to cover the overdraw.

In block 292, appropriate action is taken. Different embodiments may support different ways to take appropriate action. For example, block 292 is shown including: 1) block 293 in which, prior to performing the outgoing transaction of Quantity QSUB, the second user performs an incoming transaction of a quantity to avoid overdraw; 2) block 294 in which the second user reduces the QSUB to avoid the overdraw; and/or 3) block 295 in which the second user does not perform the transaction.

Different embodiments may perform one or both requests for confirmation by the second user (e.g., block 278 and block 280; block 284 and block 286). For example, an embodiment may perform blocks 278 and 280 because: 1) performance of block 282 may be avoided where the second user 256 decides not to go forward with the transaction; and/or 2) the second user 256 is using a system separate from the inventory management system 254 and is aware of other transactions soon to be processed that will prevent the overdraw and/or cover the overdraw. As another example, an embodiment may perform blocks 284 and 286 because: 1) they occur latter in time; 2) the overdraw check can be based on the inventory hub CSS; and/or 3) block 278 may not be able to be performed based on the statement 269A (e.g., the second CS is not fully inclusive and the statement 269A lacks the necessary information.

The benefit of the above is that the second user 256 will be aware that the transaction will cause an overdraw, as opposed to a system in which the second user 256 does not have current information due to periodic reconciliation. Another benefit is that there is no need to impose the previously described buffer limit and/or use a centralized transfer system.

As previously described, FIG. 2D shows flow A and flow B. Flow B replaces statement 269A with statement 269B, block 270, event 271, block 272, and statement 273B. Turning to flow B, a statement 269B is sent by the inventory management system 254 for display to the first user 252. Statement 269B is like statement 261 in FIG. 2C. Thus, statement 269B will reflect the current quantity (CQ) of item ID 1. As a result, the second user 256 will be aware of the increase in the current quantity of item ID 1. In contrast to block 262 in FIG. 2C, in optional block 270 of FIG. 2D the user performed a transaction that will or has transferred the quantity QSUB2 of item ID 1 out of the organization.

Event 271 is sent to inventory management system 254 to record the transaction. Block 272 shows that, responsive to event 271, the inventory management system 254 updates the CSSs. Event 271, having been generated by the first user 252 using the first CS, will reflect an impact relative to the first CS. However, as previously described, responsive to event 271 a complete set of entries will be generated. This set of entries will include an entry to make the update relative to the second CS, which entry was either generated because the event had sufficient information or automatically generated because the event lacked sufficient information to cause the entry's generation. Regardless, the set of entries will be used to update balances of the first CS and the second CS. As a result, at least the total balance for item ID 1 for the second CS will reflect CQ-QSUB2.

Statement 273B is sent by inventory management system 254 to the second user 256, which user is using the second CS. Following the update, statement 273B, which is based on balances of the CSS for the second CS, is caused to be displayed to the second user 256. Thus, statement 265 will reflect the current quantity (CQ) of item ID 1. As a result, the second user 256 at block 274 will be aware of the decrease in the current quantity of item ID 1, and thus the second user 256 is aware that less of item ID 1 is available for use. This avoids the second user 256 being unaware of a different user operating relative to a different categorization scheme having performed a transaction that reduces the quantity of item 1 available to work with. Thus, this is a benefit over a system that performs periodic reconciliation because it avoids a user being unaware of a quantity reducing transaction performed by another user, even though that other user is performing that transaction relative to a different categorization scheme.

As such, the two flows of FIG. 2D illustrate how a user can avoid unknowingly engaging in a transaction for which there is not sufficient inventory, including to do so without requiring the imposition of a "buffer limit" or a "centralized transfer system." Thus, the organization can avoid the opportunity costs associated with "buffer limit," provides awareness relative to all impacted categorization schemes (as opposed to just the previously described centralized transfer system) and avoids the splitting of a transfer into two events (as is done when using the previously described centralized transfer system). At the same time, the user/system can move forward with a transaction for which there is insufficient inventory. In cases where the decision is to still transfer out more inventory than an organization owns (that is overuse resources), the user/system making the transfer is making an informed decision and other users/systems are notified earlier (meaning they can try to back fill the overuse earlier, which often means on better terms than doing so later).

Other Terms

Some embodiments can be viewed as combining logistics and accounting principles in a unique way that provides an unexpected result. The categorized side and the common representation side of a given CSS forces use of the accounting principle of double entry. Thus, the categorized side will be equal and opposite to the common representation side of a CSS in terms of total balance and balance per item ID. Thus, where debit and credit are used: 1) the quantity for an item ID under debit on the common representation side will be equal to the total quantity for that item ID (the sum of the quantities for that item ID under each category) under credit on the categorized side; 2) the quantity for an item ID under credit on the common representation side will be equal to the total quantity for that item ID (the sum of the quantities for that item ID under each category) under debit on the categorized side; 3) the sum of the quantities for all item IDs under debit on the common representation side will be equal to the sum of the quantities for all item IDs under credit on the categorized side; and 4) the sum of the quantities for all item IDs under credit on the common representation side will be equal to the sum of the quantities for all item IDs under debit on the categorized side. In some embodiments, to perform automatic match mismatch detection, the system decides whether an update happening relative to a set of one or more of the categorization schemes needs to impact any others of the categorization schemes. This is done with double leg entries, one of which manages the common representation side (contract ID, quantity), and checks (subsets) that propagate (declare) to other categorization schemes those of the changes that are applicable to them. Thus, for an update to a given categorization scheme state, a double legged entry manages both the categorized side and the common representation side for that categorization scheme state.

Additional Detail Regarding Event Types in Some Embodiments

In some embodiments, for a given impact involving a given item ID in a given event, at least one destination category (dest. cat.) and at least one source category (src. cat.) are determined. As described above, a set of one or more entries are generated, each one for a different one of the CSSs. Each entry in the set of entries includes FFFE 184 and SFSE 186. The at least one dest. cat. and at least one src. cat. are assigned to different ones of FFFE 184 and SFSE 186 of the set of one or more entries generated based on the event. This assignment is based, at least in part, on the type of transaction and a sign for the quantity in the event for the item ID.

For an impact involving the inventory hub CSSs, a positive or negative sign determines whether the dest. cat. is assigned to the FFFE 184 or SFSE 186 in the entry generated for the inventory hub CSS. The type of impact (exchange type or a transfer type) determines whether the common representation side ID or the src. cat is assigned to the other of FFFE 184 or SFSE 186 of that entry. In contrast, for a transaction involving an inventory purpose CSS, a positive or negative sign determines whether the dest. cat. is assigned to the FFFE 184 or SFSE 186 of the entry generated for that inventory purpose CSS. The type of impact (exchange type or a transfer type) determines whether the common representation side ID or the src. cat is assigned to the other of FFFE 184 or SFSE 186 of that entry.

FIG. 3A

Figure 3A:
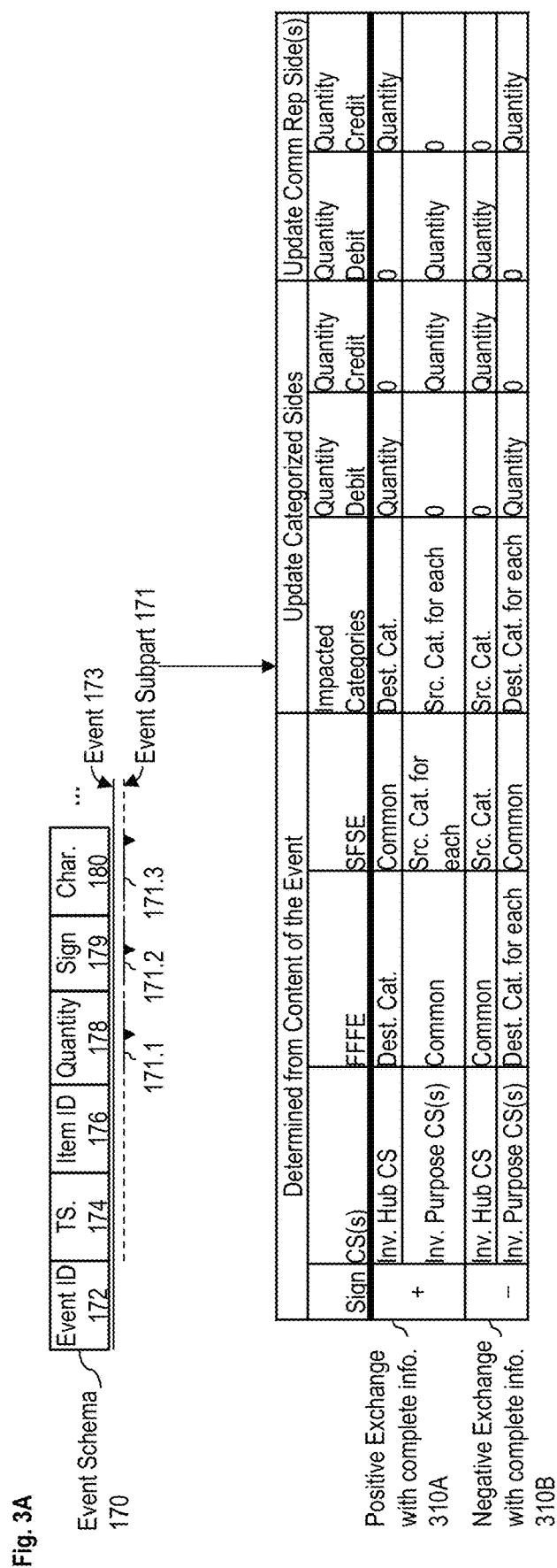
FIG. 3A is a block diagram illustrating exchange events with complete information according to some embodiments of the invention.

FIG. 3A is a block diagram illustrating exchange events with complete information according to some embodiments of the invention. In addition to the previously described event schema 170, event 173, and event subpart 171, FIG. 3A shows a table reflecting relationships between aspects of the entries and updates to the CSSs relative to two different types of exchange events: a positive exchange event with complete information and a negative exchange event with complete information. The phrase "with complete information" refers to the event including sufficient information to generate the complete set of entries for the event from the event itself (no automatic generation of any alignment entries needed).

The table includes two main rows for the two event types: the positive exchange with complete information 310A and the negative exchange with complete information 310B. In addition, the table includes three main columns: 1) what is determined from the content of the event; 2) the update to the categorized sides; and 3) the update to the common representation side(s).

The first main column (what is determined from the content of the event) includes: 1) a sign sub column for the data under sign 179 (for event 173, this would be the data 171.1); 2) a CS(s) sub column to store an identifier of the CS/CSS (e.g., CS ID) to which the entry will apply; and 3) a FFFE sub column and a SFSE sub column respectively for the FFFE 184 and SFSE 186 of the entries. The second main column (the update to the categorized sides) includes: 1) an impacted categories sub column for the categories (category 188) of the categorized side to be impacted; and 2) a quantity debit sub column and a quantity credit sub column respectively for the quantity debit 190 and quantity credit 192 of the appropriate CSS.

The two main rows are split into sub rows following the sign sub column, and these sub rows are distinguished by the CS(s) sub column. For these event types: 1) one sub row has inventory hub CS in the CS(s) sub column; and 2) the other sub row has inventory purpose CSs in the CS(s) sub column. This reflects that the exchange type event involves the inventory hub CS and one or more of the inventory purpose CSs.

The rest of the sub columns reflect that the data in the sub rows is essentially mirrored as between the positive exchange type and the negative exchange type per the above described opposite effects within and between entries. For example, for the positive exchange with complete information 310A, the SFSE for the inventory hub CS and the FFFE for the inventory purpose CS(s) are the common representation side ID; for the negative exchange with complete information 310B, the FFFE for the inventory hub CS and the SFSE for the inventory purpose CS(s) are the common representation side ID. Correspondingly, for a positive exchange with complete information 310A, the FFFE for the inventory hub CS is the destination category and the SFSE for the inventory purpose CS(s) is a source category for each of the inventory purpose CS(s); for the negative exchange with complete information 310B, the SFSE for the inventory hub CS is the source category and the FFFE for the inventory purpose CS(s) is a destination category for each of the inventory purpose CS(s).

As another example, for the positive exchange with complete information 310A, the quantity debit for the categorized side of the inventory hub CS is the quantity for the event, while the quantity credit for the categorized side of the inventory purpose CS(s) is the quantity from the event; this is reversed on the common representation side(s). For the negative exchange type impact with complete information 310B, the update to the categorized side(s) and the common representation side(s) of the inventory hub CSS and inventory purpose CSS(s) is a mirror image of the positive exchange type impact.

FIG. 3B

Figure 3B:
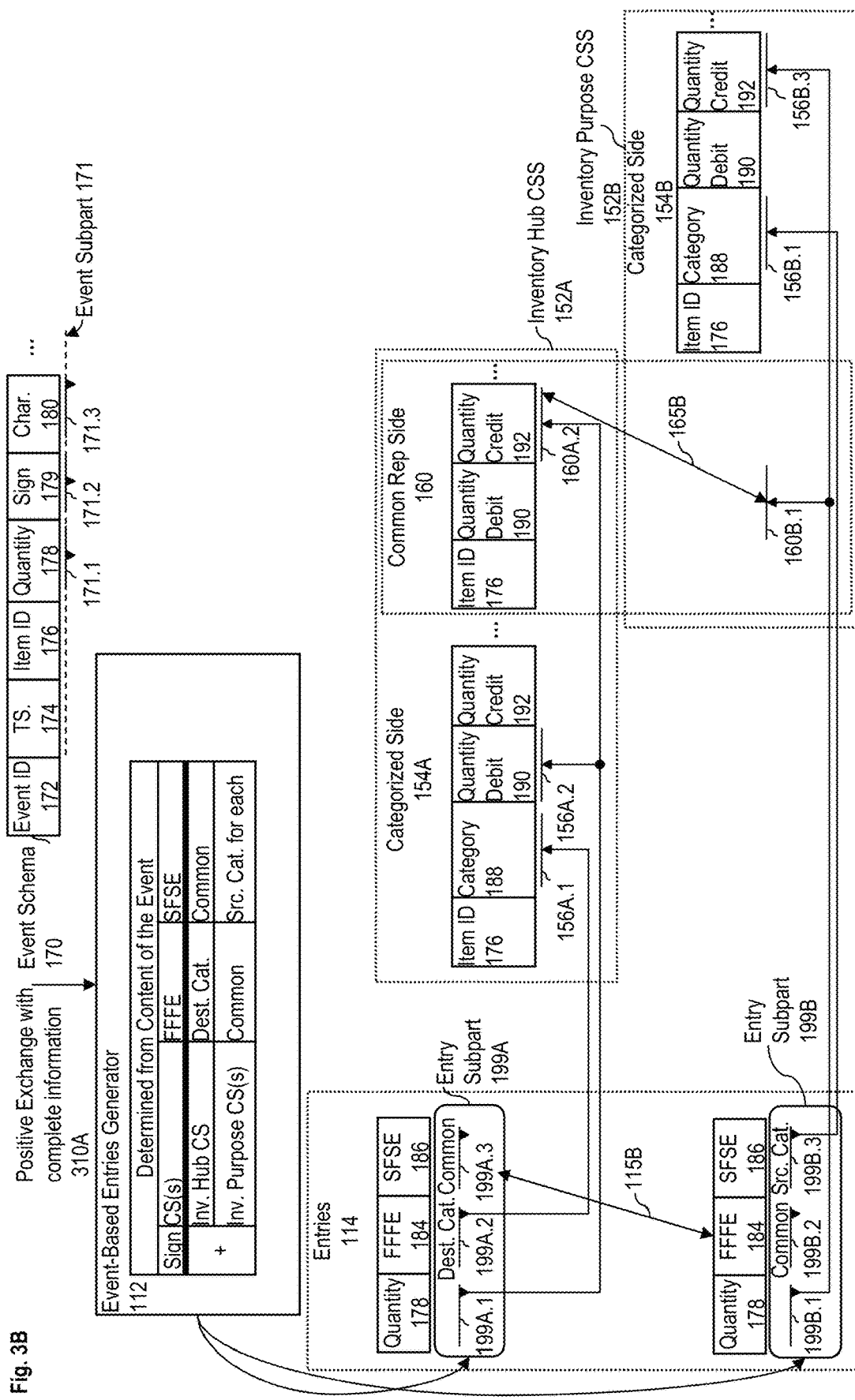
FIG. 3B is a block diagram illustrating the processing of a positive exchange event with complete information according to some embodiments of the invention.

FIG. 3B is a block diagram illustrating the processing of a positive exchange event with complete information according to some embodiments of the invention. FIG. 3B shows the event schema 170 and the data 171.1, 171.2, and 171.3 of event subpart 171. In addition, FIG. 3B shows event-based entries generator 112, entries 114, and most of FIG. 1D. What is not included in FIG. 3B are those of 156A.x, 156B.x, 160A.x, and 160B.x that are not updated responsive to the event shown in the figure.

In FIG. 3B, event 173 is of the type positive exchange with complete information 310A, and accordingly the event-based entries generator 112 is shown including the relevant part of the table from FIG. 3A (the part for that type of event under the main column "determined from content of the event"). As a result, the entries 114 are shown including: 1) an entry subpart 199A that is for the inventory hub CSS 152A and that has: a) the quantity 171.1 as 199A.1; b) a destination category as 199A.2; and c) the common representation side ID as 199A.3; and 2) an entry subpart 199B that is for the inventory purpose CSS 152B and that has: a) the quantity 171.1 as 199B.1; b) the common representation side ID as 199B.2; and c) a source category as 199B.3. In addition, the relationship 115B is shown reflecting that the common representation side ID is reflected in SFSE 186 and FFFE 184 respectively of entry subpart 199A and entry subpart 199B (that is, the opposite effect for the common representation side(s) of the two entries).

FIG. 3B also shows that the entry subpart 199A is used to update the inventory hub CSS 152A as follows: 1) the item ID 176 and the destination category 199A.2 (under FFFE 184) is used to locate 156A.1 (under category 188) and 156A.2 (under quantity debit 190) on the categorized side 154A; and 2) the item ID 176 and the common representation side ID 199A.3 (under SFSE 186) is used to locate 160A.2 (under quantity credit 192) on the common representation side 160. These located running balances would then be updated (156A.2 and 160A.2 are respectively updated using the quantities 199A.1 and 199B.1).

Similarly, the entry subpart 199B is used to update the inventory purpose CSS 152B as follows: 1) the item ID 176 and the common representation side ID 199B.2 (under FFFE 184) is used to locate 160B.1 (under quantity debit 190) on the common representation side 160; and 2) the item ID 176 and the source category 199A.3 (under SFSE 186) is used to locate 156B.1 (under category 188) and 156B.3 (under quantity credit 192) on the categorized side 154B. These located running balances would then be updated (160B.1 and 156B.3 are respectively updated using the quantities 199A.1 and 199B.1).

In addition, the relationship 165B is shown reflecting that the common representation side is updated under quantity credit 192 and quantity debit 190 respectively for inventory hub CSS 152A and inventory purpose CSS 152B (that is, the opposite effect for the common representation side(s) for the two CSSs).

If additional inventory purpose CSs/CSSs were present and should have been impacted, then the entry and updates would look like those for entry subpart 199B.

FIG. 3C

Figure 3C:
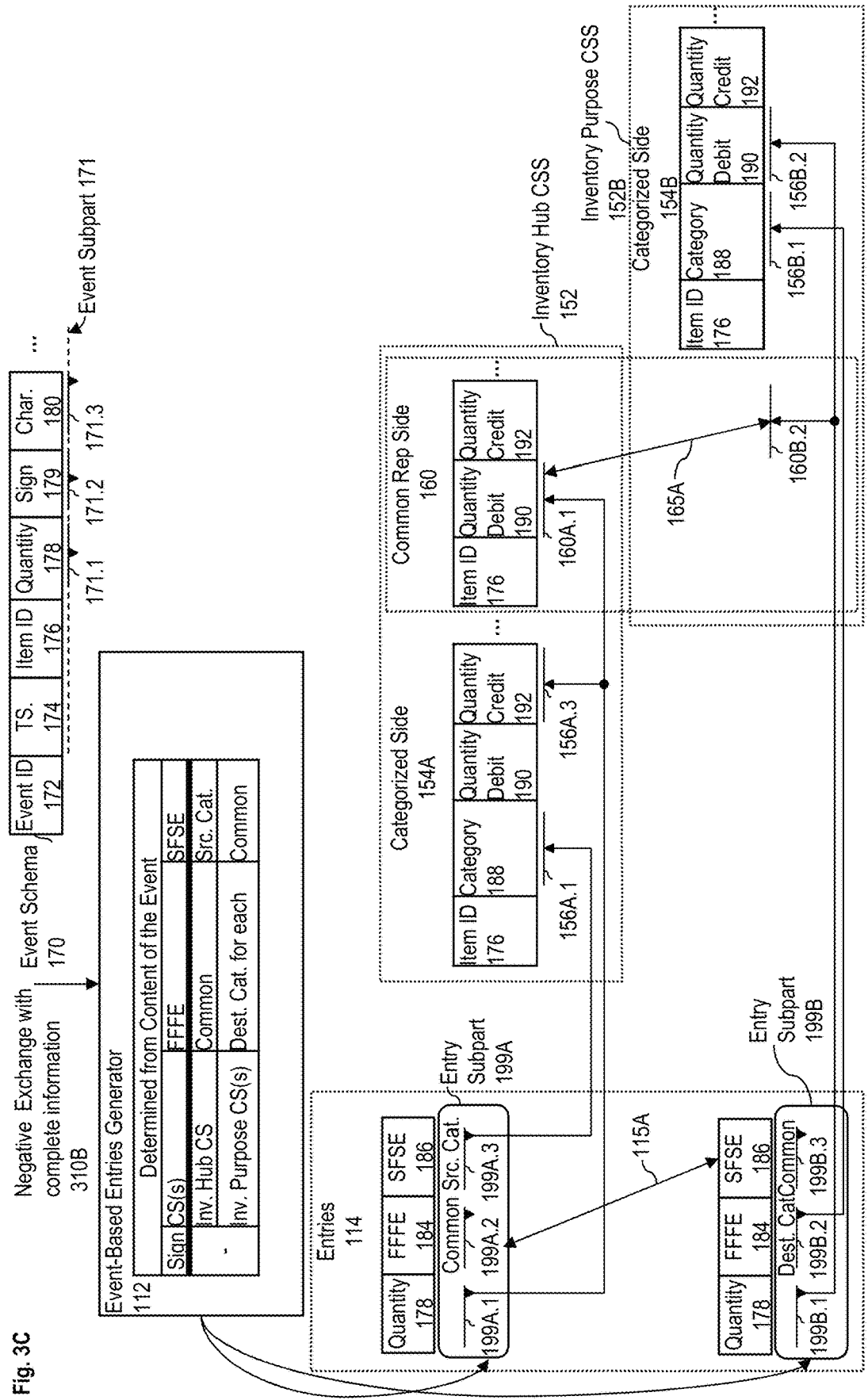
FIG. 3C is a block diagram illustrating the processing of a negative exchange event with complete information according to some embodiments of the invention.

FIG. 3C is a block diagram illustrating the processing of a negative exchange event with complete information according to some embodiments of the invention. FIG. 3C is the same as FIG. 3B with the following exceptions: 1) event 173 is of the type negative exchange event with complete information 310B, and accordingly the event-based entries generator 112 is shown including the relevant part of the table from FIG. 3A (the part for that type of event under the main column "determined from content of the event"); 2) 199A.2 is the common representation side ID; and 3) 199A.3 is a source category; 4) 199B.2 is a destination category; 5) 199B.3 is the common representation side ID; 6) the item ID 176 and the source category 199A.3 (under SFSE 186) are used to locate 156A.1 (under category 188) and 156A.3 (under quantity credit 192) on the categorized side 154A, and this located running balance would then be updated (156A.3 is updated using the quantity 199A.1); 7) the item ID 176 and the common representation side ID 199A.2 (under FFFE 184) is used to locate 160A.1 (under quantity debit 190) on the common representation side 160, and this located running balance would then be updated (160A.1 is updated using the quantity 199A.1); 8) the item ID 176 and the destination category 199B.2 (under FFFE 184) is used to locate 156B.1 (under category 188) and 156B.2 (under quantity debit 190) on the categorized side 154B, and this located running balance would then be updated (156B.2 is updated using the quantity 199B.1); 9) the item ID 176 and the common representation side ID 199A.3 (under SFSE 186) is used to locate 160B.2 (under quantity credit 192) on the common representation side, and this located running balance would then be updated (169B.2 is updated using the quantity 199B.1; and 10) the relationship 165A is shown reflecting that the common representation side is updated under quantity debit 190 and quantity credit 192 respectively for inventory hub CSS 152A and inventory purpose CSS 152B (that is, the opposite effect for the common representation side(s) for the two CSSs).

If additional inventory purpose CSs/CSSs were present and should have been impacted, then the entry and updates would look like those for entry subpart 199B.

FIG. 4A

Figure 4A:
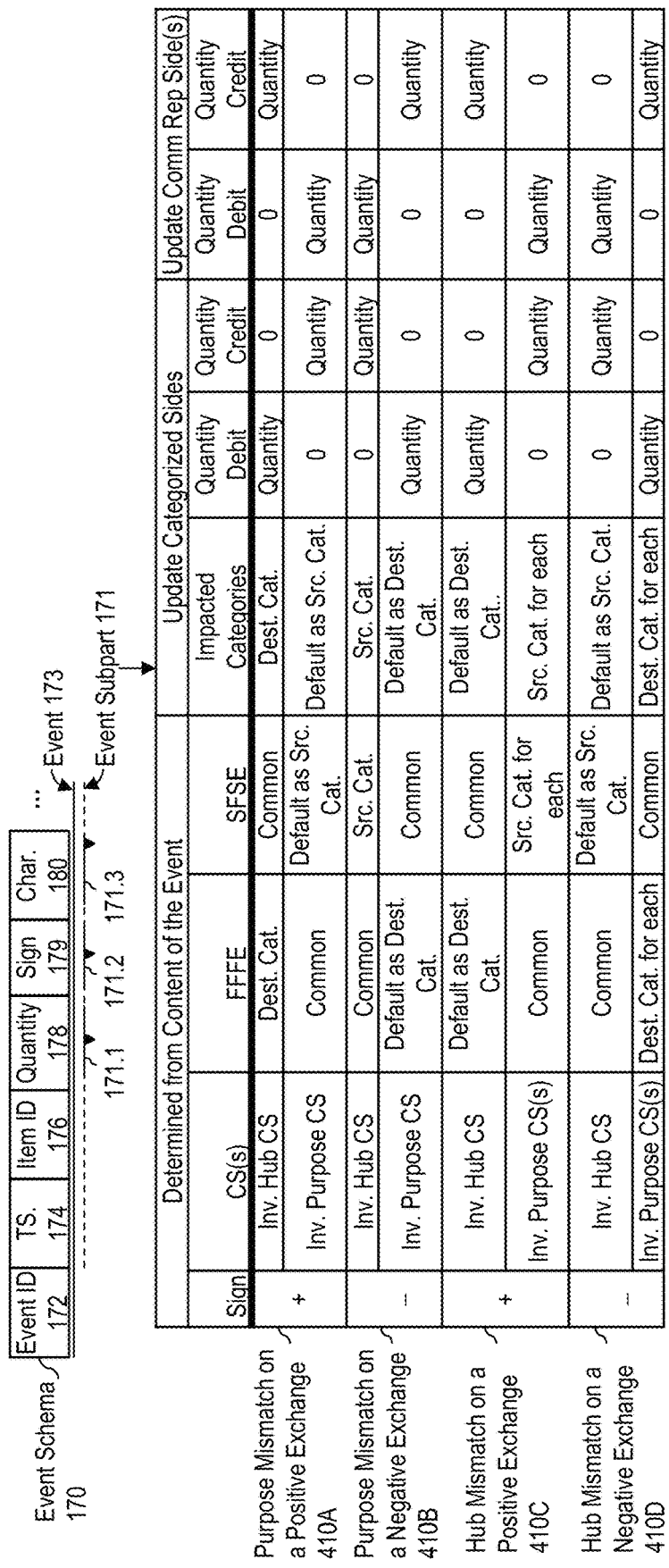
FIG. 4A is a block diagram illustrating exchange events with incomplete information according to some embodiments of the invention.

FIG. 4A is a block diagram illustrating exchange events with incomplete information according to some embodiments of the invention. FIG. 4A is like FIG. 3A, except the content of the table differs. While the table in FIG. 3A shows data for exchange events with complete information, the table in FIG. 4A shows data for exchange events with incomplete information. The phrase "with incomplete information" refers to the event including sufficient information to generate at least one entry, but insufficient information to generate at least one of the entries; thus, the generation of the complete set of entries for the event requires the automatic generation of at least one alignment entry.

To ease this explanation, assume that there is a single inventory purpose CS. Like FIG. 3A, FIG. 4A contemplates both positive and negative exchange events. However, the incomplete information could be insufficient to generate the entry for the inventory purpose CS (a purpose mismatch) or the inventory hub CS (a hub mismatch). Thus, while the table in FIG. 3A shows 2 main rows (one for each of a positive exchange event type and a negative exchange event type), FIG. 4A shows 4 main rows (one for each of a purpose mismatch on a positive exchange 410A, a purpose mismatch on a negative exchange 410B, a hub mismatch on a positive exchange 410C, and a hub mismatch on a negative exchange 410D).

The row for the purpose mismatch on a positive exchange 410A is the same as the row for the positive exchange with complete information 310A in FIG. 3A, except the inventory purpose sub row has: 1) a singular form of inventory purpose CS (rather than CS(s)) in the CS(s) sub column; and 2) the default category as a source category in the SFSE sub column and the impacted categories sub column.

The row for the purpose mismatch on a negative exchange 410B is the same as the row for the negative exchange with complete information 310B in FIG. 3A, except the inventory purpose sub row has: 1) a singular form of inventory purpose CS (rather than CS(s)) in the CS(s) sub column; and 2) the default category as a destination category in the FFFE sub column and the impacted categories sub column. Thus, in each of these two purpose mismatch rows, the event had insufficient information to generate an entry for the inventory purpose CS, so a temporary substitute entry that uses the default category of the inventory purpose CS was automatically generated. The difference between these two rows in FIG. 4A being whether the default category is the source category or the destination category.

The row for the hub mismatch on a positive exchange 410C is the same as the row for the positive exchange with complete information 310A in FIG. 3A, except the inventory hub sub row has the default category as a destination category in the FFFE sub column and the impacted categories sub column have.

The row for the hub mismatch on a negative exchange 410D is the same as the row for the negative exchange with complete information 310B in FIG. 3A, except the inventory hub sub row has the default category as a source category in the SFSE sub column and the impacted categories sub column. Thus, in each of these two hub mismatch rows, the event had insufficient information to generate an entry for the inventory hub CS, so a temporary substitute entry that uses the default category of the inventory hub CS was automatically generated. The difference between these two rows in FIG. 4A being whether the default category is the destination category or the source category.

FIG. 4B

Figure 4B:
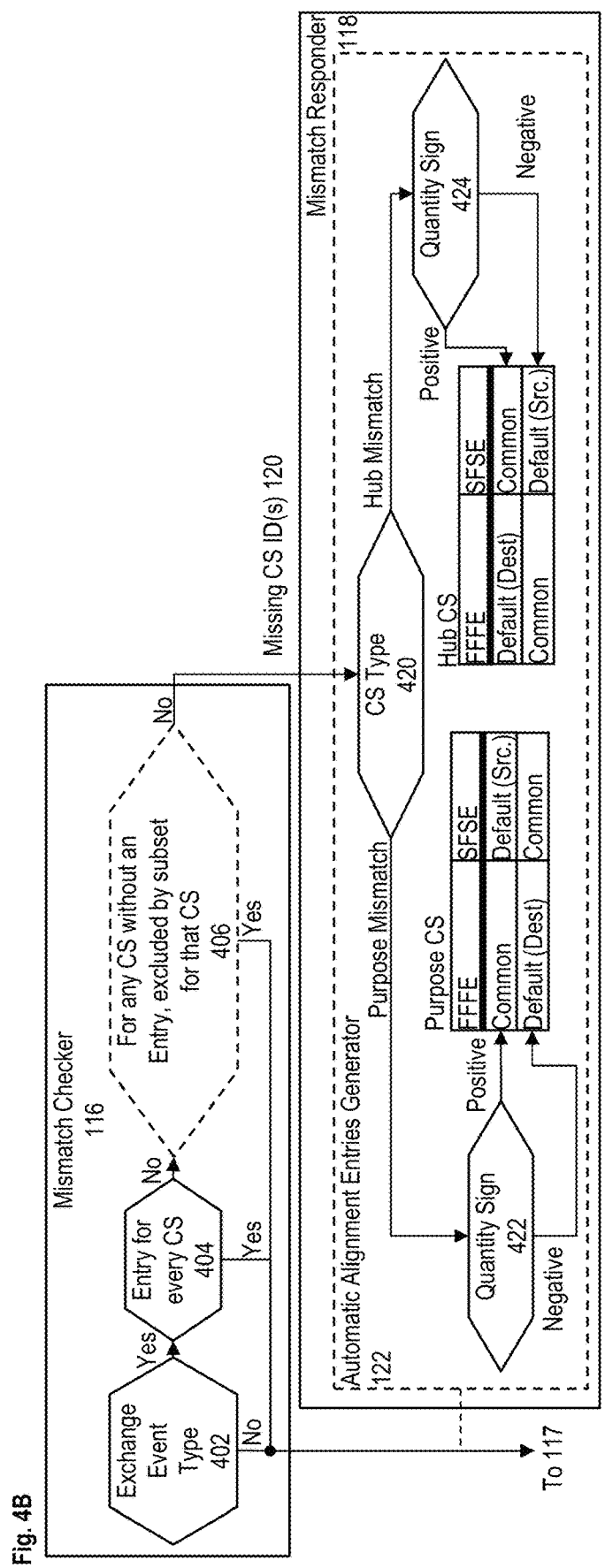
FIG. 4B is a flow diagram illustrating the processing of exchange events with incomplete information according to some embodiments of the invention.

FIG. 4B is a flow diagram illustrating the processing of exchange events with incomplete information according to some embodiments of the invention. The flow diagram of FIG. 4B is shown relative to mismatch checker 116 and automatic alignment entries generators 122 inside mismatch responder 118. As illustrated, the flow starts with block 402 in which it is determined if the current event is an exchange type event. If not, control passes to overdraw checker 117 (if implemented); otherwise, to block 404. Different embodiments may perform block 402 differently, including those described later herein.

In block 404, it is determined if there is an entry for every CS. If so, control passes to overdraw checker 117; otherwise, to block 406. Different embodiments may perform block 402 differently (e.g., based on whether there is an entry for each of the CS IDs in the categorization scheme (CS) IDs 132, based on whether there is an entry for each of the CSSs 152A-152N, etc.).

As shown in optional block 406, it is determined, for any CS without an entry, whether the event is excluded from that CS based on a subset. If not, control passes to block 420; otherwise, to overdraw checker 117. Different embodiments may perform block 420 differently (e.g., based on the event and the inventory purpose CS subset(s) 135).

As shown, blocks 402, 404, and 406 are inside mismatch checker 116, and thus represent how some embodiments may implement mismatch checker 116. Any mismatches are provided to the automatic alignment entries generator 122 in the form of missing CS ID(s) 120.

In block 420, for each of the CS ID(s) 120, the type of CS is determined. If the CS ID is for an inventory purpose CS (referred to as a purpose mismatch), then control passes to block 422; otherwise, the CS ID is for the inventory hub CS (referred to as a hub mismatch) and control passes to block 424.

Both block 422 and block 424 show a decision based on the sign for the event. Depending on the sign, the data for FFFE and SFSE for the entry is determined. In the case of a purpose mismatch, a positive sign means FFFE and SFSE are respectively the common representation ID and the default category as a source category (a purpose mismatch on a positive exchange 410A); while a negative sign means FFFE and SFSE are respectively the default category as a destination category and the common representation ID (a purpose mismatch on a negative exchange 410B). In contrast, in the case of a hub mismatch, a positive sign means FFFE and SFSE are respectively the default category as a destination category and the common representation ID (a hub mismatch on a positive exchange 410C); while a negative sign means FFFE and SFSE are respectively the common representation ID and the default category as a source category (a hub mismatch on a negative exchange 410D).

FIG. 4C

Figure 4C:
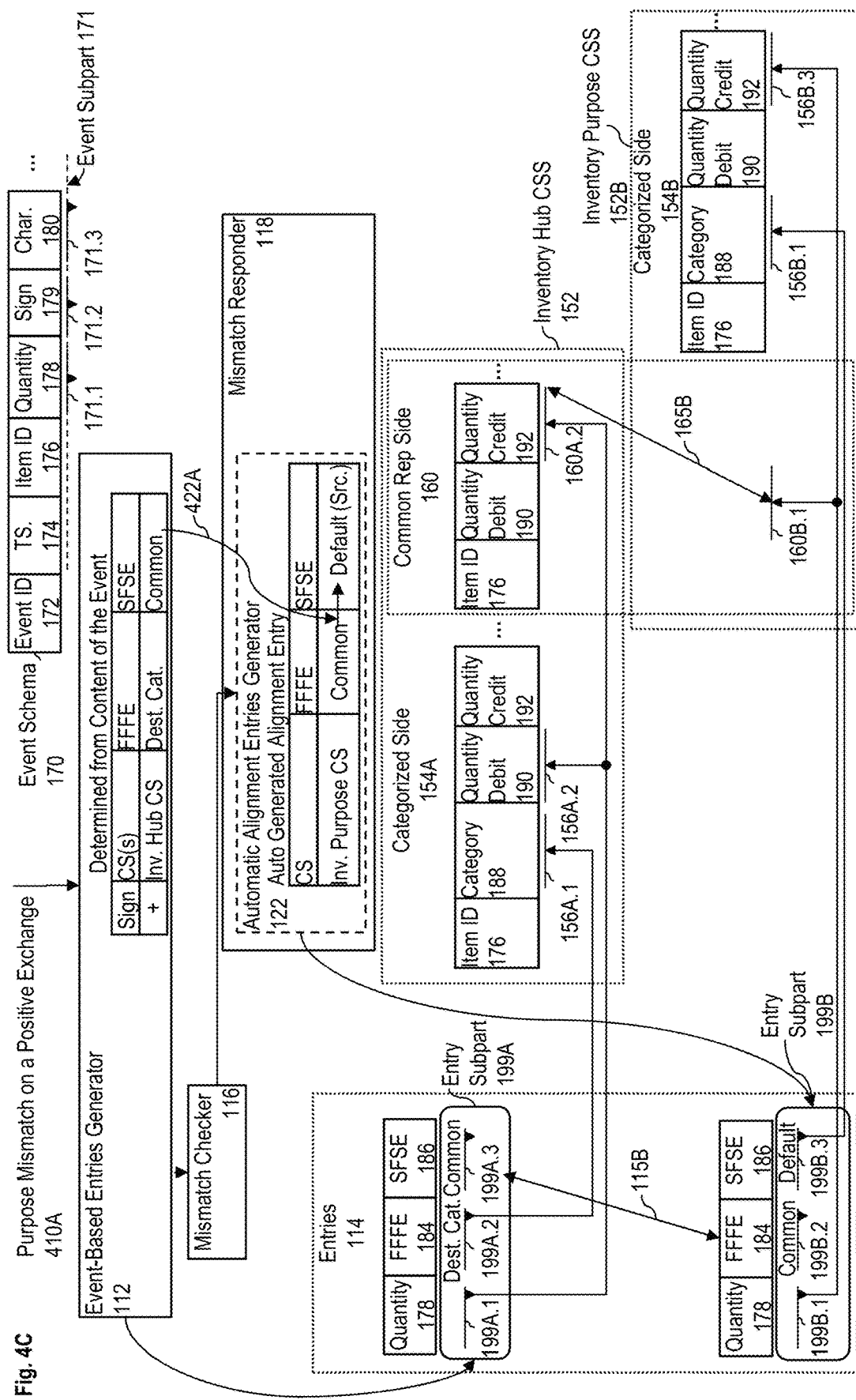
FIG. 4C is a block diagram illustrating the processing of a purpose mismatch on a positive exchange according to some embodiments of the invention.

FIG. 4C is a block diagram illustrating the processing of a purpose mismatch on a positive exchange according to some embodiments of the invention. FIG. 4C is like FIG. 3B, but FIG. 4C differs in the following ways: 1) event 173 is of the type purpose mismatch on a positive exchange 410A; 2) mismatch checker 116, which will detect a mismatch and trigger automatic alignment entries generator 122, which will automatically generate an alignment entry responsive to the mismatch; 3) rather than part of the table in FIG. 3A, event-based entries generator 112 and automatic alignment entries generator 122 respectively include the parts of the sub rows for the inventory hub CS and the inventory purpose CS of the purpose mismatch on a positive exchange 410A row under the main column "determined from content of the event" of the table in FIG. 4A; 4) line 422A showing that since the SFSE sub column for the inventory hub CS has the common representation ID, the automatically generated alignment entry has the common representation ID in the FFFE sub column for the inventory purpose CS (thus, line 422A represents the opposite effect between entries); 5) since the FFFE sub column for the inventory purpose CS has the common representation ID, the SFSE sub column for the inventory purpose CS will have the default category as a source category; and 6) 199B.3 is the default category as a source category, and thus the combination of the item ID 176 and the default category will be used to identify 156B.1 (under category 188) and 156B.3 (under quantity credit 192) on the categorized side 154B.

FIG. 4D

Figure 4D:
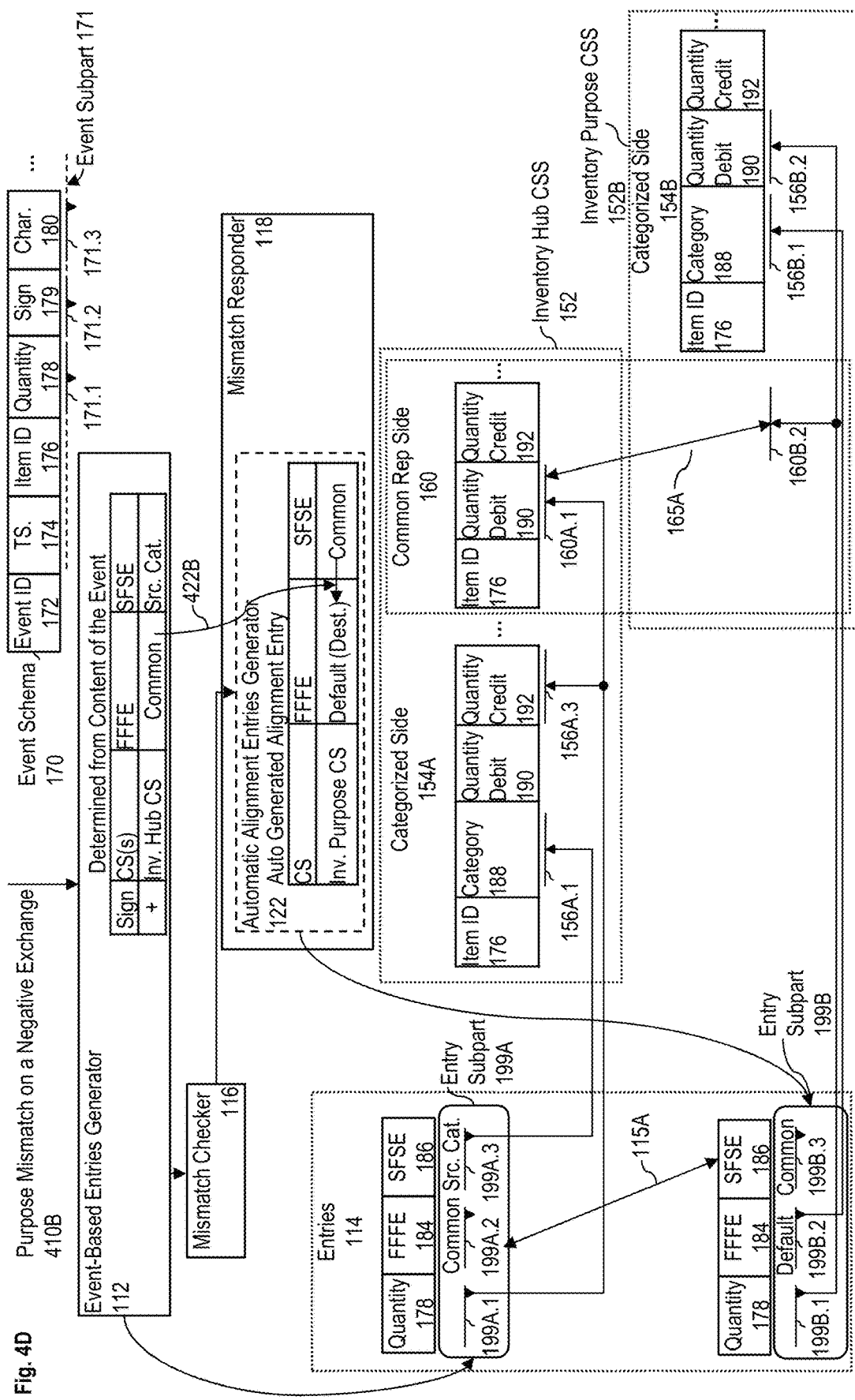
FIG. 4D is a block diagram illustrating the processing of a purpose mismatch on a negative exchange according to some embodiments of the invention.

FIG. 4D is a block diagram illustrating the processing of a purpose mismatch on a negative exchange according to some embodiments of the invention. FIG. 4D is like FIG. 3C, but FIG. 4D differs in the following ways: 1) event 173 is of the type purpose mismatch on a negative exchange 410B; 2) mismatch checker 116, which will detect a mismatch and trigger automatic alignment entries generator 122, which will automatically generate an alignment entry responsive to the mismatch; 3) rather than part of the table in FIG. 3A, event-based entries generator 112 and automatic alignment entries generator 122 respectively include the parts of the sub rows for the inventory hub CS and the inventory purpose CS of the purpose mismatch on a negative exchange 410B row under the main column "determined from content of the event" of the table in FIG. 4A; 4) line 422B showing that since the FFFE sub column for the inventory hub CS has the common representation ID, the automatically generated alignment entry has the common representation ID in the SFSE sub column for the inventory purpose CS (thus, line 422B represents the opposite effect between entries); 5) since the SFSE sub column for the inventory purpose CS has the common representation ID, the FFFE sub column for the inventory purpose CS will have the default category as a destination category; and 6) 199B.2 is the default category as a destination category, and thus the combination of the item ID 176 and the default category will be used to identify 156B.1 (under category 188) and 156B.2 (under quantity debit 190) on the categorized side 154B.

FIG. 4E

Figure 4E:
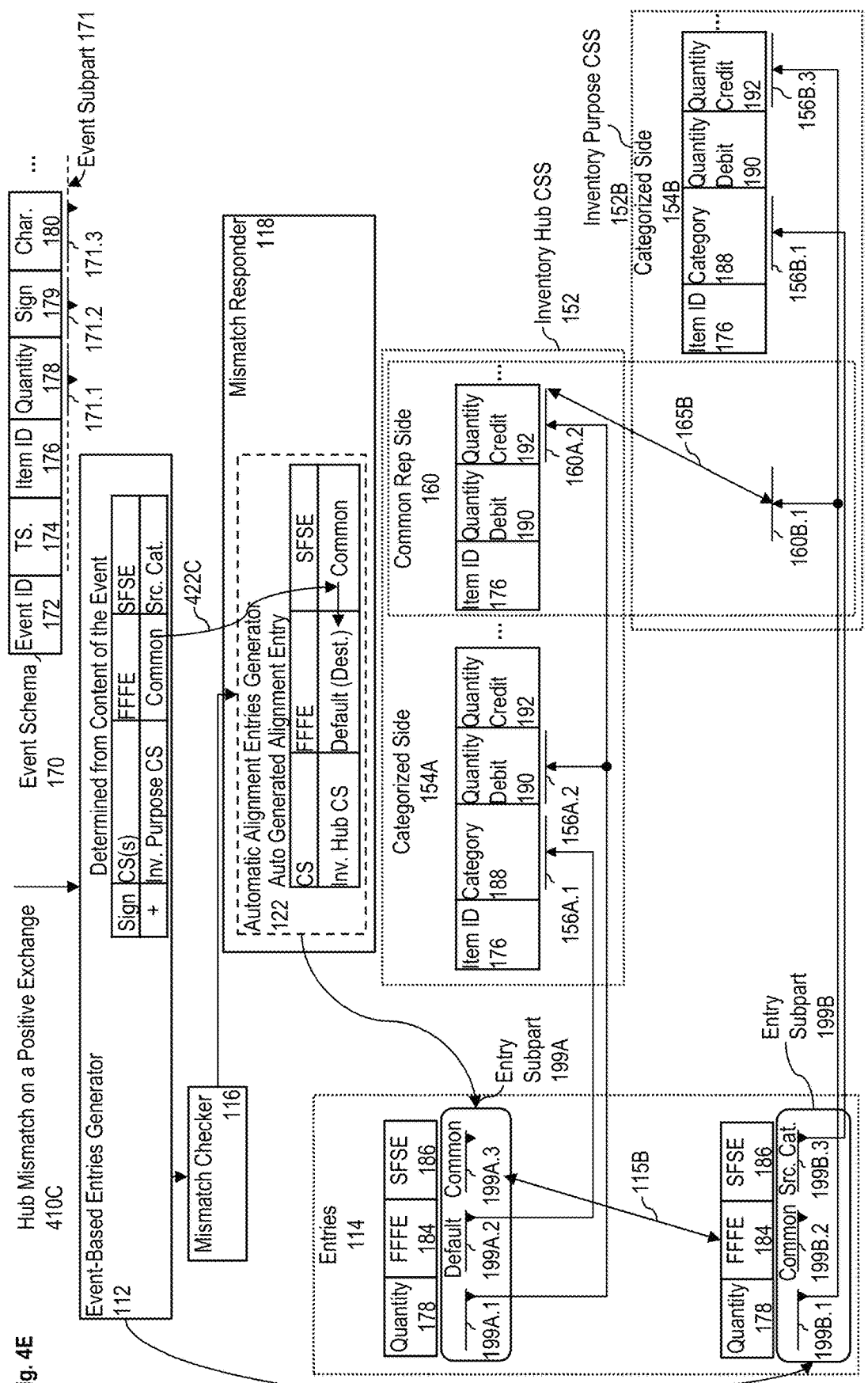
FIG. 4E is a block diagram illustrating the processing of a hub mismatch on a positive exchange according to some embodiments of the invention.

FIG. 4E is a block diagram illustrating the processing of a hub mismatch on a positive exchange according to some embodiments of the invention. FIG. 4E is like FIG. 3B, but FIG. 4E differs in the following ways: 1) event 173 is of the type hub mismatch on a positive exchange 410C; 2) mismatch checker 116, which will detect a mismatch and trigger automatic alignment entries generator 122, which will automatically generate an alignment entry responsive to the mismatch; 3) rather than part of the table in FIG. 3A, event-based entries generator 112 and automatic alignment entries generator 122 respectively include the parts of the sub rows for the inventory purpose CS and the inventory hub CS of the hub mismatch on a positive exchange 410C row under the main column "determined from content of the event" of the table in FIG. 4A; 4) line 422C showing that since the FFFE sub column for the inventory purpose CS has the common representation ID, the automatically generated alignment entry has the common representation ID in the SFSE sub column for the inventory hub CS (thus, line 422C represents the opposite effect between entries); 5) since the SFSE sub column for the inventory hub CS has the common representation ID, the FFFE sub column for the inventory hub CS will have the default category as a destination category; and 6) 199A.2 is the default category as a destination category, and thus the combination of the item ID 176 and the default category will be used to identify 156A.1 (under category 188) and 156A.2 (under quantity debit 190) on the categorized side 154A.

FIG. 4F

Figure 4F:
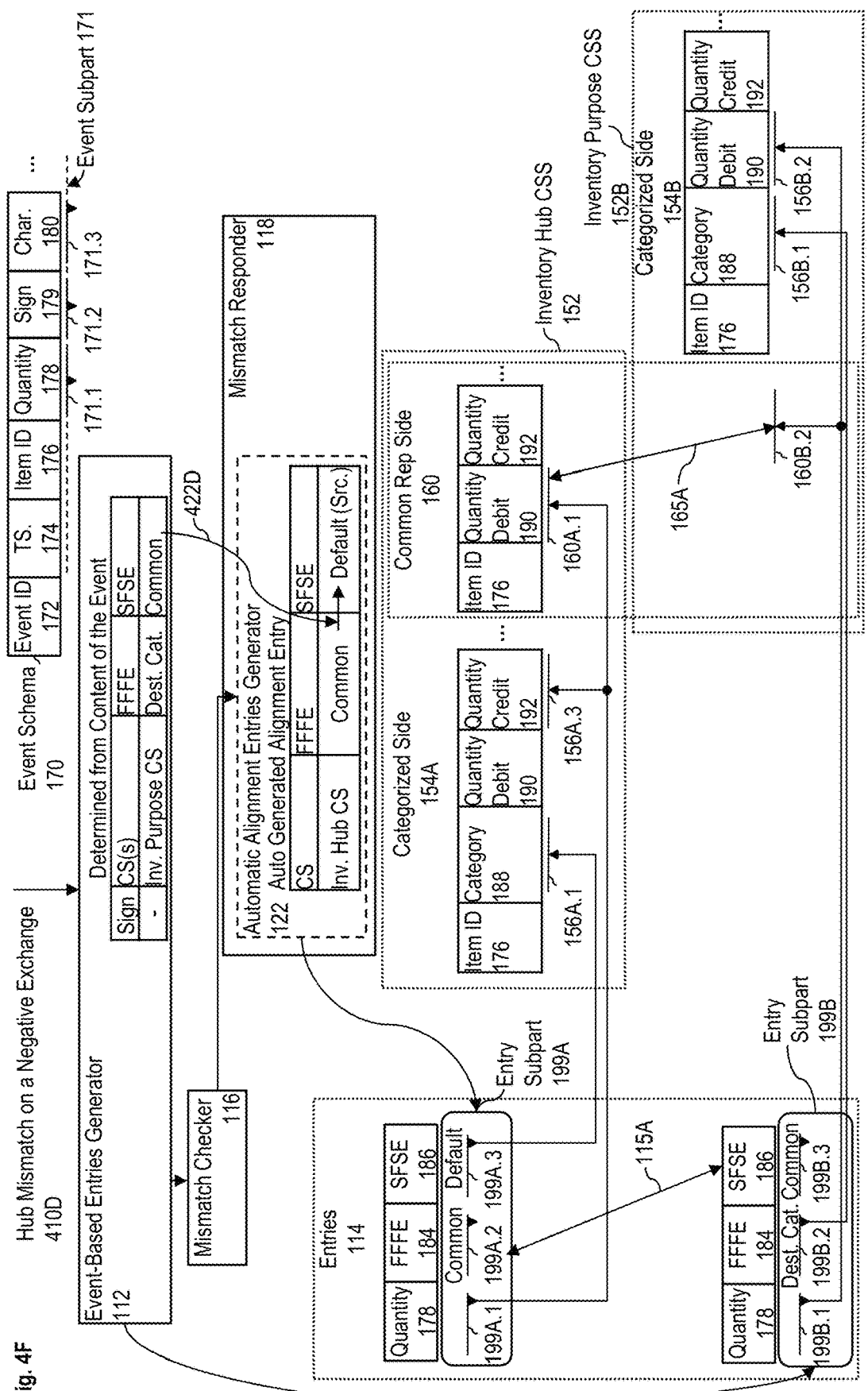
FIG. 4F is a block diagram illustrating the processing of a hub mismatch on a negative exchange according to some embodiments of the invention.

FIG. 4F is a block diagram illustrating the processing of a hub mismatch on a negative exchange according to some embodiments of the invention. FIG. 4F is like FIG. 3C, but FIG. 4F differs in the following ways: 1) event 173 is of the type hub mismatch on a negative exchange 410D; 2) mismatch checker 116, which will detect a mismatch and trigger automatic alignment entries generator 122, which will automatically generate an alignment entry responsive to the mismatch; 3) rather than part of the table in FIG. 3A, event-based entries generator 112 and automatic alignment entries generator 122 respectively include the parts of the sub rows for the inventory purpose CS and the inventory hub CS of the hub mismatch on a negative exchange 410D row under the main column "determined from content of the event" of the table in FIG. 4A; 4) line 422D showing that since the SFSE sub column for the inventory purpose CS has the common representation ID, the automatically generated alignment entry has the common representation ID in the FFFE sub column for the inventory hub CS (thus, line 422D represents the opposite effect between entries); 5) since the FFFE sub column for the inventory hub CS has the common representation ID, the SFSE sub column for the inventory hub CS will have the default category as a source category; and 6) 199A.3 is the default category as a source category, and thus the combination of the item ID 176 and the default category will be used to identify 156A.1 (under category 188) and 156A.3 (under quantity credit 192) on the categorized side 154B.

FIG. 5A

FIG. 5A is a block diagram illustrating transfer events according to some embodiments of the invention. FIG. 5A is like FIG. 3A, except the content of the table differs. While the table in FIG. 3A shows data for exchange events with complete information, the table in FIG. 5A shows data for transfer events with both complete information and incomplete information. When there is complete information, the event-based entries generator 112 will be able to generate an entry with a destination category and a source category. When there is incomplete information, the event-based entries generator 112 will be unable to determine one of the destination category and the source category, and will thus insert the Default category.

While the table in FIG. 3A shows 2 main rows (one for each of a positive exchange event type and a negative exchange event type), FIG. 5A shows 4 main rows (one for each of a hub positive transfer 510A, a hub negative transfer 510B, a purpose positive transfer 510C, and a purpose negative transfer 510D). Also, since each of these main rows involves a single CS, these four main rows are split into sub rows until the impacted categories sub column.

In the sign, CS, FFFE, and SFSE sub columns, the row for the hub positive transfer 510A respectively has a positive sign, inventory hub CS, a destination category, and a source category (which may be the default category). The first sub row for the hub positive transfer 510A has the destination category and the quantity respectively in the impacted categories and quantity debit sub columns, while the second sub row has the source category (which may be the default category) and the quantity respectively in the impacted categories and quantity credit sub columns. The main column update common representation side does not apply. This reflects that a positive transfer for the inventory hub CSS is a transfer from credit to debit.

The hub negative transfer 510B row is the same as the hub positive transfer 510A row, except: 1) the sign sub column has a negative sign; 2) the contents of the FFFE and SFSE sub columns are swapped; and 3) the contents of the sub rows in the impacted categories sub column are swapped. This reflects that a negative transfer for the inventory hub CSS is a transfer from debit to credit.

The purpose positive transfer 510C row is the same as the hub negative transfer 510B row, except: 1) the sign sub column has a positive sign; and 2) the CS sub column has the inventory purpose CS. This reflects that a positive transfer for an inventory purpose CSS is a transfer from debit to credit.

The purpose negative transfer 510D row is the same as the hub positive transfer 510A row, except: 1) the sign sub column has a negative sign; and 2) the CS sub column has the inventory purpose CS. This reflects that a negative transfer for an inventory purpose CSS is a transfer from debit to credit.

FIG. 5B

FIG. 5B is a block diagram illustrating the processing of a hub positive transfer event according to some embodiments of the invention. FIG. 5B shows event-based entries generator 112, entries 114, and the categorized side 154A for the inventory hub CSS 152A.

In FIG. 5B, the event is of the type hub positive transfer 510A, and accordingly the event-based entries generator 112 is shown including the relevant part of the table from FIG. 5A (the part for that type of event under the main column "determined from content of the event"). As a result, the entries 114 are shown including: 1) an entry subpart 199A that is for the inventory hub CSS 152A and that has: a) the quantity as 199A.1; b) a destination category as 199A.2; and c) a source category (which may be the default category) as 199A.3.

FIG. 5B also shows that the entry subpart 199A is used to update the inventory hub CSS 152A as follows: 1) the item ID 176 and the destination category 199A.2 (under FFFE 184) is used to locate 156A.1 (under category 188) and 156A.2 (under quantity debit 190) on the categorized side 154A; and 2) the item ID 176 and the source category 199A.3 (under SFSE 186) is used to locate 156A.4 (under category 188) and 156A.5 (under quantity credit 192) on the categorized side 154A. These located running balances would then be updated (156A.2 and 156A.5 are respectively updated using the quantity 199A.1). For explanation purposes and not by way of limitation, if the categorized side 154A was implemented as a two-dimensional table, then 156A.1 and 156A.2 would be on one row for the item ID, while 156A.4 and 156A.5 would be on another row for that item ID.

FIG. 5C

FIG. 5C is a block diagram illustrating the processing of a hub negative transfer event according to some embodiments of the invention. FIG. 5C is like FIG. 5B, except: 1) the event is of the type hub negative transfer 510B, and accordingly the event-based entries generator 112 is shown including the relevant part of the table from FIG. 5A (the part for that type of event under the main column "determined from content of the event"); 2) a source category (which may be the default category) as 199A.2; 3) a destination category as 199A.3; 4) the item ID 176 and the source category 199A.2 (under FFFE 184) is used to locate 156A.1 (under category 188) and 156A.2 (under quantity debit 190) on the categorized side 154A; and 5) the item ID 176 and the destination category 199A.3 (under SFSE 186) is used to locate 156A.4 (under category 188) and 156A.5 (under quantity credit 192) on the categorized side 154A.

FIG. 5D

FIG. 5D is a block diagram illustrating the processing of a purpose positive transfer event according to some embodiments of the invention. FIG. 5D shows event-based entries generator 112, entries 114, and the categorized side 154B for the inventory purpose CSS 152B.

In FIG. 5D, the event is of the type purpose positive transfer 510C, and accordingly the event-based entries generator 112 is shown including the relevant part of the table from FIG. 5A (the part for that type of event under the main column "determined from content of the event"). As a result, the entries 114 are shown including: 1) an entry subpart 199B that is for the inventory purpose CSS 152B and that has: a) the quantity as 199B.1; b) a source category (which may be the default category) as 199B.2; and c) a destination category as 199B.3.

FIG. 5D also shows that the entry subpart 199B is used to update the inventory purpose CSS 152B as follows: 1) the item ID 176 and the source category 199B.2 (under FFFE 184) is used to locate 156B.1 (under category 188) and 156B.2 (under quantity debit 190) on the categorized side 154B; and 2) the item ID 176 and the destination category 199B.3 (under SFSE 186) is used to locate 156B.4 (under category 188) and 156B.5 (under quantity credit 192) on the categorized side 154B. These located running balances would then be updated (156B.2 and 156B.5 are respectively updated using the quantity 199B.1). For explanation purposes and not by way of limitation, if the categorized side 154B was implemented as a two-dimensional table, then 156B.1 and 156B.2 would be on one row for the item ID, while 156B.4 and 156B.5 would be on another row for that item ID.

FIG. 5E

FIG. 5E is a block diagram illustrating the processing of a purpose negative transfer event according to some embodiments of the invention. FIG. 5E is like FIG. 5D, except: 1) the event is of the type purpose negative transfer 510D, and accordingly the event-based entries generator 112 is shown including the relevant part of the table from FIG. 5A (the part for that type of event under the main column "determined from content of the event"); 2) a destination category as 199B.2; 3) a source category as 199B.3; 4) the item ID 176 and the destination category 199B.2 (under FFFE 184) is used to locate 156B.1 (under category 188) and 156B.2 (under quantity debit 190) on the categorized side 154B; and 5) the item ID 176 and the source category 199B.3 (under SFSE 186) is used to locate 156B.4 (under category 188) and 156B.5 (under quantity credit 192) on the categorized side 154B.

Additional Detail regarding Queries, Statements, and Transfer Events

Figure 6A:
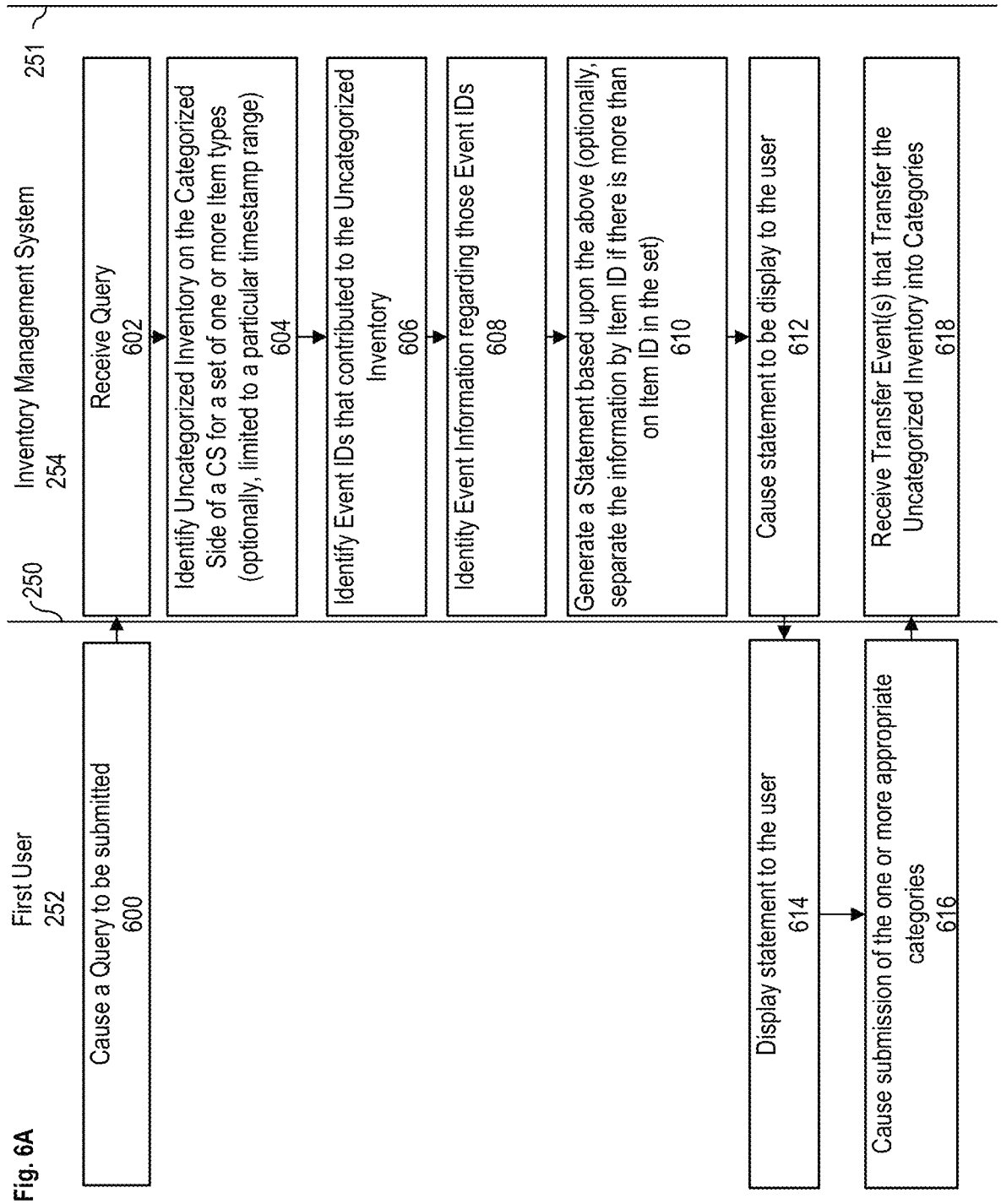
FIG. 6A is a transactional flow diagram illustrating delayed categorization according to some embodiments of the invention.
Figure 6B:
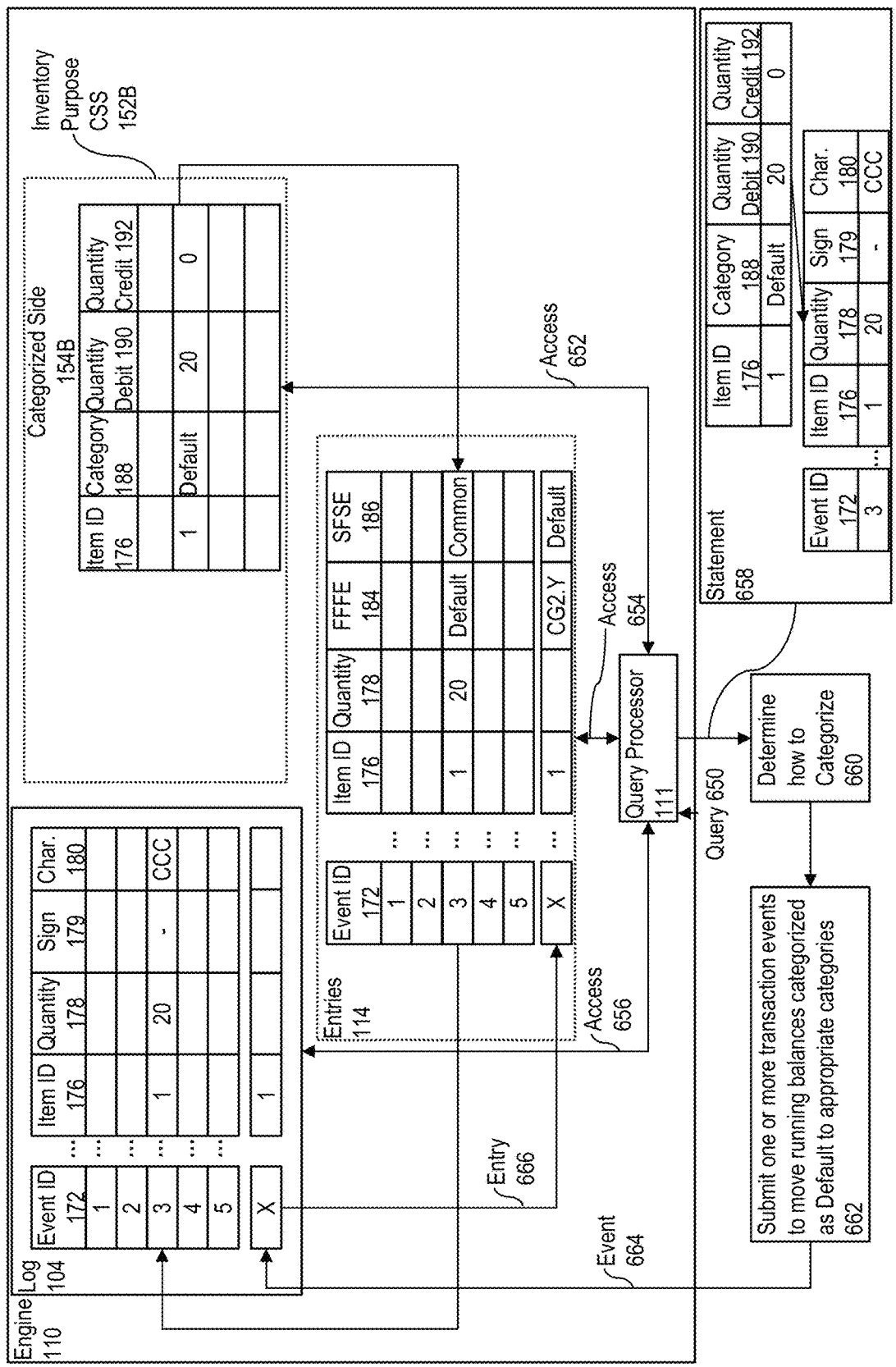
FIG. 6B is a block diagram illustrating an example of delayed categorization according to some embodiments of the invention.

FIGS. 6A and 6B

FIG. 6A is a transactional flow diagram illustrating delayed categorization according to some embodiments of the invention. FIG. 6A will be described in conjunction with FIG. 6B. FIG. 6B is a block diagram illustrating an example of delayed categorization according to some embodiments of the invention.

FIG. 6A includes line 250, line 251, first user 252, and inventory management system 254 from FIGS. 2C and 2D. In block 600, the first user 252 causes a query to be submitted to the inventory management system 254. Control passes to block 602. In FIG. 6B, this is illustrated by query 650 being submitted to query processor 111 within engine 110.

In block 602, the query is received by the inventory management system 254, and control passes to block 604. In FIG. 6B, this is illustrated by query 650 being received by query processor 111.

As shown in block 604, uncategorized inventory on the categorized side of a CSS is identified for a set of one or more item types (e.g., item IDs); control passes to block 606. In some embodiments, this determination may be optionally restricted to a particular timestamp range as described in greater detail elsewhere herein. With reference to FIG. 6B, access 652 represents query processor 111 accessing the categorized side 154B of inventory purpose CSS 152B. Categorized side 154B is shown including "1," "Default," "20," and "0" respectively under item ID 176, category 188, quantity debit 190, and quantity credit 192, indicating that there is a default category for item ID 1 with a running balance (which indicates that there is uncategorized inventory for the item type assigned item ID 1).

In block 606, the event ID(s) of the event(s) that contributed to the uncategorized inventory are identified; control passes to block 608. In FIG. 6B, access 654 represents query processor 111 accessing entries 114 that were previously generated and used to update inventory purpose CSS 152B. Based on the located running balance for the combination of item ID of 1 and category of default on the categorized side 154B, the combination of item ID of 1 and category of default are used to locate a set of one or more of entries 114 that contributed to the located running balance. In FIG. 6B, the entries are shown including an entry with "3," "1," "Default," and "Common" respectively under event ID 172, item ID 176, quantity 178, FFFE 184, and SFSE 186. While this entry is located as part of access 654, entry 666 is not as it has not been generated yet.

As shown in block 608, the event information is identified for the identified event ID(s), and control passes to block 610. With reference to FIG. 6B, access 656 represents query processor 111 accessing log 104 for one or more previously received events that resulted in the generation of the set of identified entries. Based on the located entry having event ID 1, the event information for event ID 1 is accessed from log 104. Log 104 has "3," "1", "20," "-," and "CCC" respectively under event ID 172, item ID 176, quantity 178, sign 179, and set of one or more characteristics 180.

In block 610, a statement is generated based upon the above, and control passes to block 612. This statement can take a variety of forms, and different embodiments may use different forms in different circumstances (e.g., based on the requesting user, based on information in the query, etc.). For example, if there is more than one Item ID in the set and/or more than one event ID in the set, the statement may optionally separate the information by Item ID and/or event ID. Additionally or alternatively, the statement may summarize one or more parts of the collected information. By way of example, FIG. 6B shows a statement 658 which may be used to help determine how the located running balance should be categorized (in terms of the step of periodic reconciliation, to ease the explanation step of reconciliation). Exemplary statement 658 includes the above-described information located within the categorized side 154B and the log 104.

As shown in block 612, the inventory management system 254 causes the statement to be displayed to the first user 252, and control passes to block 616. How block 612 is performed can vary based on the environment and how the inventory management system 254 is deployed. For example, if the first user 252 is using a first system on a first electronic device, and the inventory management system 254 is on a second electronic device, block 612 involves transmission of data from the second electronic device to the first electronic device which causes the first electronic device to display the statement. As another example, if the first user 252 is using the inventory management system 254 on a first electronic device, block 612 involves the inventory management system 254 causing the first electronic device to display the statement.

In block 616, the one or more appropriate categories into which the running balance(s) of uncategorized inventory should be transferred are submitted, and control passes to block 618. For example, block 616 may be performed by the first user 252 reviewing the displayed statement, determining that the running balance(s) for the uncategorized inventory should be transferred to a set of one or more categories, and cause the submission of this decision. Typically, the goal is to zero out the running balance of the uncategorized inventory by transferring the uncategorized inventory to one or more non-default categories. With reference to FIG. 6B, block 660 shows a determination of how to categorize the running balance of 20 shown on statement 658, followed by block 662 which represents the submission of one or more transaction events to move quantities categorized as default to the one or more determined categories. More specifically, FIG. 6B shows the submission of a transfer event/impact as event 664.

In block 618, the inventory management system 254 receives transfer event(s) that transfer the uncategorized inventory into categories. In the example of FIG. 6B, event 664 is entered into log 104. This is illustrated with an "X" and "1" respectively under event ID 172 and item ID 176, where the "X" represents some later assigned event ID. Additional data would be provided for quantity 178, sign 179, and the set of one or more characteristics 180 (e.g., a "20" and a "+" could be used to zero out the located running balance in this example). Based on this event, entry 666 is generated for inventory purpose CSS 152B and has an "X," "1," "CG2.Y," and "Default" under the event ID 172, item ID 176, FFFE 184, and SFSE 186. This indicates that the submitted event 664 cause the generation of an entry 666 that will transfer a quantity of item ID 1 from the default category to the category ID CG2.Y, where Y represents a number according to the previously described labeling convention described earlier. If the quantity 178 and sign 179 of the event 664 was "20" and a "+," then entry 666 would have a 20 under quantity 178 and the update based on the entry 666 would zero out the located running balance. In some such embodiments, after a running balance is zeroed out, the record on the categorized side 154B for that running balance (the combination of an item ID and the default category) is kept for a certain period and then archived.

While the example shown in FIG. 6B shows a single running balance contributed to by a single event, FIG. 6A and embodiments support multiple events contributing to a single running balance (for the combination of one item ID and the default category). Thus, in some embodiments, where multiple events have contributed to a single running balance for uncategorized inventory, the later categorization can be handled in bulk (e.g., if 5 events each contributed 20 to make the total running balance be 100, a single transfer event may transfer the entire running balance of 100 to a non-default category). The contrary is also supported in some embodiments (e.g., if a single event contributes 200 to make the total running balance 200, different transfer events (optionally differ categories) that total 200 may be used to zero the running balance).

In some embodiments multiple events can contribute to a single default category; that is, within a CSS, when more than one event results in a contribution of a quantity to the "default category," it is represented as a separate, single record for the "default category." In some such embodiments, a user can "drill down" to determine the event IDs as described above. In other embodiments, a separate record is created for each event that contributes a quantity to the "default category" and the event ID is tracked (e.g., in some such embodiments, the data recorded in the item ID field of such a record may be based on a combination (e.g., a concatenation) of the item ID and the event ID such that the event ID can be determined from the item ID field of that record.

Figure 7:
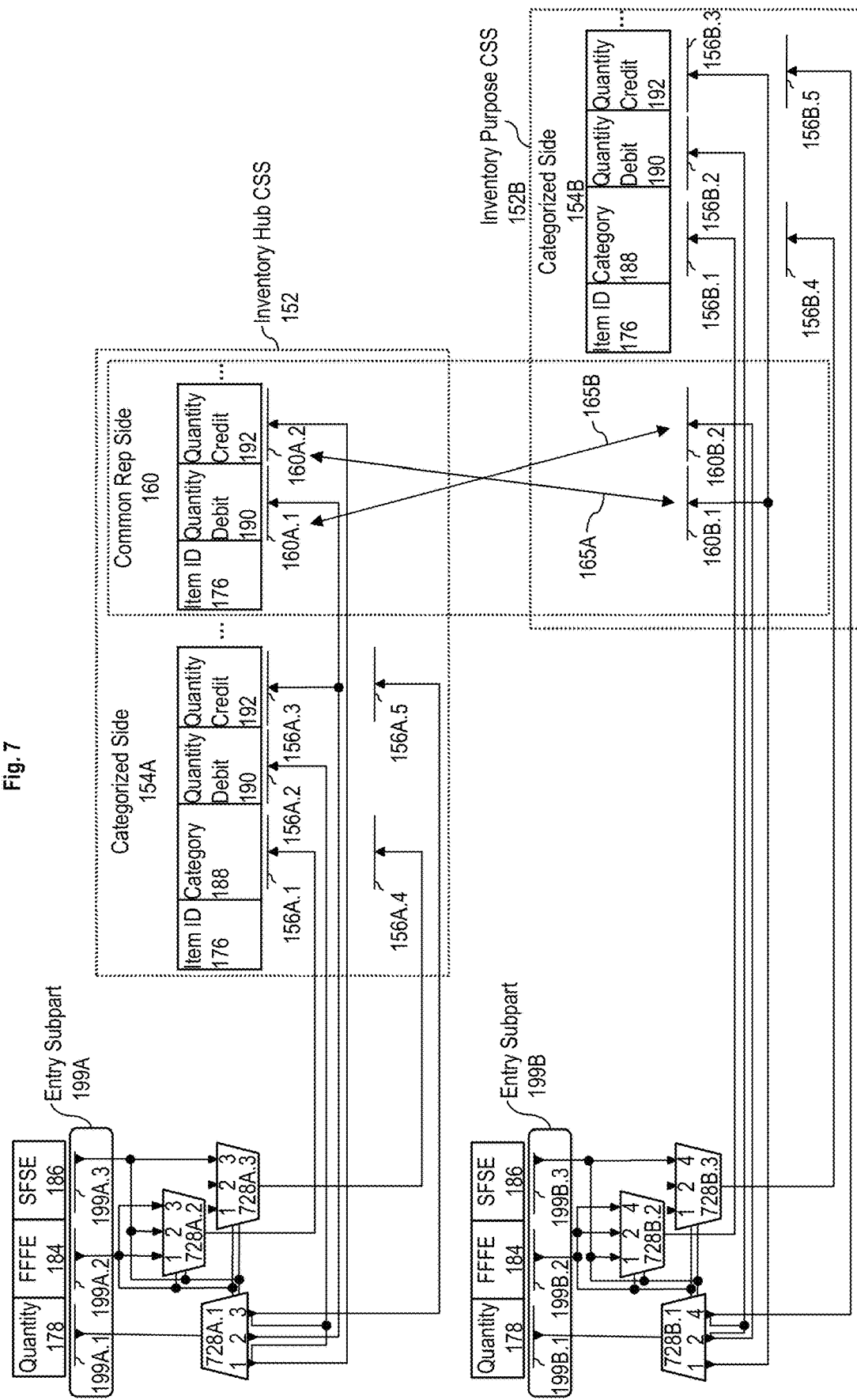
FIG. 7 is a logic diagram illustrating pseudo logic for various combinations of exchange and transfer events according to some embodiments.

Exemplary Logic Diagram
FIG. 7

FIG. 7 is a logic diagram illustrating pseudo logic for various combinations of exchange and transfer events according to some embodiments. FIG. 7 includes entry subpart 199A, entry subpart 199B, and the content of FIG. 1D.

FIG. 7 shows: A) a 1 to 3 demultiplexer 728A.1 with quantity 199A.1 as its input and with outputs labeled 1, 2, and 3; and B) a 1 to 3 demultiplexer 728B.1 with quantity 199B.1 as its input and with outputs labeled 1, 2, and 4.

In addition, FIG. 7 includes a 3 to 1 multiplexor 728A.2 and a 3 to 1 multiplexer 728A.3, each with inputs labeled 1, 2, and 3. While the inputs labeled 1, 2, and 3 of multiplexor 728A.2 are respectively 199A.2, 199A.3, and 199A.2, those for multiplexor 728A.3 are respectively nothing, nothing, and 199A.3. While multiplexor 728A.2 is controlled to choose which of 199A.2 (under FFFE 184) and 199A.3 (under SFSE 186) is used as 156A.1 (under category 188) of the categorized side 154A, multiplexor 728A.3 is controlled to choose which of nothing and 199A.3 (under SFSE 186) is used as 156A.4 (under category 188) of the categorized side 154A.

Also, FIG. 7 includes a 3 to 1 multiplexor 728B.2 and a 3 to 1 multiplexer 728B.3, each with inputs labeled 1, 2, and 4. While the inputs labeled 1, 2, and 4 of multiplexor 728B.2 are respectively 199B.3, 199B.2, and 199B.2, those for multiplexor 728B.3 are respectively nothing, nothing, and 199B.3. While multiplexor 728B.2 is controlled to choose which of 199B.2 (under FFFE 184) and 199B.3 (under SFSE 186) is used as 156B.1 (under category 188) of the categorized side 154B, multiplexor 728A.3 is controlled to choose which of nothing and 199A.3 (under SFSE 186) is used as 156B.4 (under category 188) of the categorized side 154B.

Demultiplexer 728A.1, multiplexor 728A.2, and multiplexor 728A.3 are controlled by control signals based on 199A.2 and 199A.3 to select 1, 2, or 3. Similarly, demultiplexer 728B.1, multiplexor 728B.2 and multiplexor 728B.3 are controlled by control signals are based on 199A.2 and 199A.3 to select 1, 2, or 4. Below is: 1) an exemplary table which shows control signals A and B that are respectively based on whether 199A.2 is a category and whether 199A.3 is a category (as opposed to the common representation ID); and 2) a similar table in which the control signals are respectively based on 199B.2 and 199B.3.

| Control Signal A if 199A.2 = category | Control Signal B if 199A.3 = category | Input selected | Event/Impact Type |
|---|---|---|---|
| 0 | 0 | NA | NA |
| 1 | 0 | 1 | Positive Exchange (Positive Exchange with complete information 310A, Purpose Mismatch on a Positive Exchange 410A, and Hub Mismatch on a Positive Exchange 410C) |
| 0 | 1 | 2 | Negative Exchange (Negative Exchange with complete information 310B, Purpose Mismatch on a Negative Exchange 410B, and Hub Mismatch on a Negative Exchange 410D) |
| 1 | 1 | 3 | Hub Transfer (Hub Positive Transfer 510A, Hub Negative Transfer 510B) |

| Control Signal A if 199B.2 = category | Control Signal B if 199B.3 = category | Input selected | Event/Impact Type |
|---|---|---|---|
| 0 | 0 | NA | NA |
| 1 | 0 | 2 | Negative Exchange (Negative Exchange with complete information 310B, Purpose Mismatch on a Negative Exchange 410B, and Hub Mismatch on a Negative Exchange 410D) |
| 0 | 1 | 1 | Positive Exchange (Positive Exchange with complete information 310A, Purpose Mismatch on a Positive Exchange 410A, and Hub Mismatch on a Positive Exchange 410C) |
| 1 | 1 | 4 | Purpose Transfer (Purpose Positive Transfer 510C, Purpose Negative Transfer 510D) |

Thus, the item ID and outputs of multiplexor 728A.2 and multiplexor 728A.3 are used to locate the running balances in the inventory hub CSS 152A to update. Similarly, the item ID and outputs of multiplexor 728B.2 and multiplexor 728B.3 are used to locate the running balances in the inventory purpose CSS 152B to update.

Based upon the located running balances in the inventory hub CSS 152A, the output of demultiplexer 728A.1 is used to select which of quantity debit 190 and quantity credit 192. Similarly, based upon the located running balances in the inventory purpose CSS 152B, the output of demultiplexer 728B.1 is used to select which of quantity debit 190 and quantity credit 192 of the located running balances to update. The located running balances are then updated with the quantity.

Example 1

FIG. 8A

FIG. 8A is a block diagram illustrating more detailed configuration information according to some embodiments of the invention. Using the prior defined labeling scheme for groups, FIG. 8A identifies a specific number of categories for CS1 and CS2 for use in describing a first example (referred to as example 1). The categories for CS1 are CG1.1 through CG1.6, while those for CS2 are CG2.1 through CG2.3. FIG. 8A illustrates this using a format like FIG. 1E, but differs in the following ways: 1) the categories definition 133 include a main column labeled category groups 800; 2) the main column category groups 800 has sub columns category group names 802 and categories 806; 3) the rows under the sub column categories 806 lists the specific categories CG1.1 through CG 1.6 and CG2.1 through CG2.3; and 4) the sub column category group names 802 includes two main rows labeled CG1 and CG2 that respectively include the rows for CG1.1 through CG 1.6 and CG2.1 through CG2.3 (thus, the category group names provide a way to refer to a group of the categories.

FIG. 8B

Figure 8B:
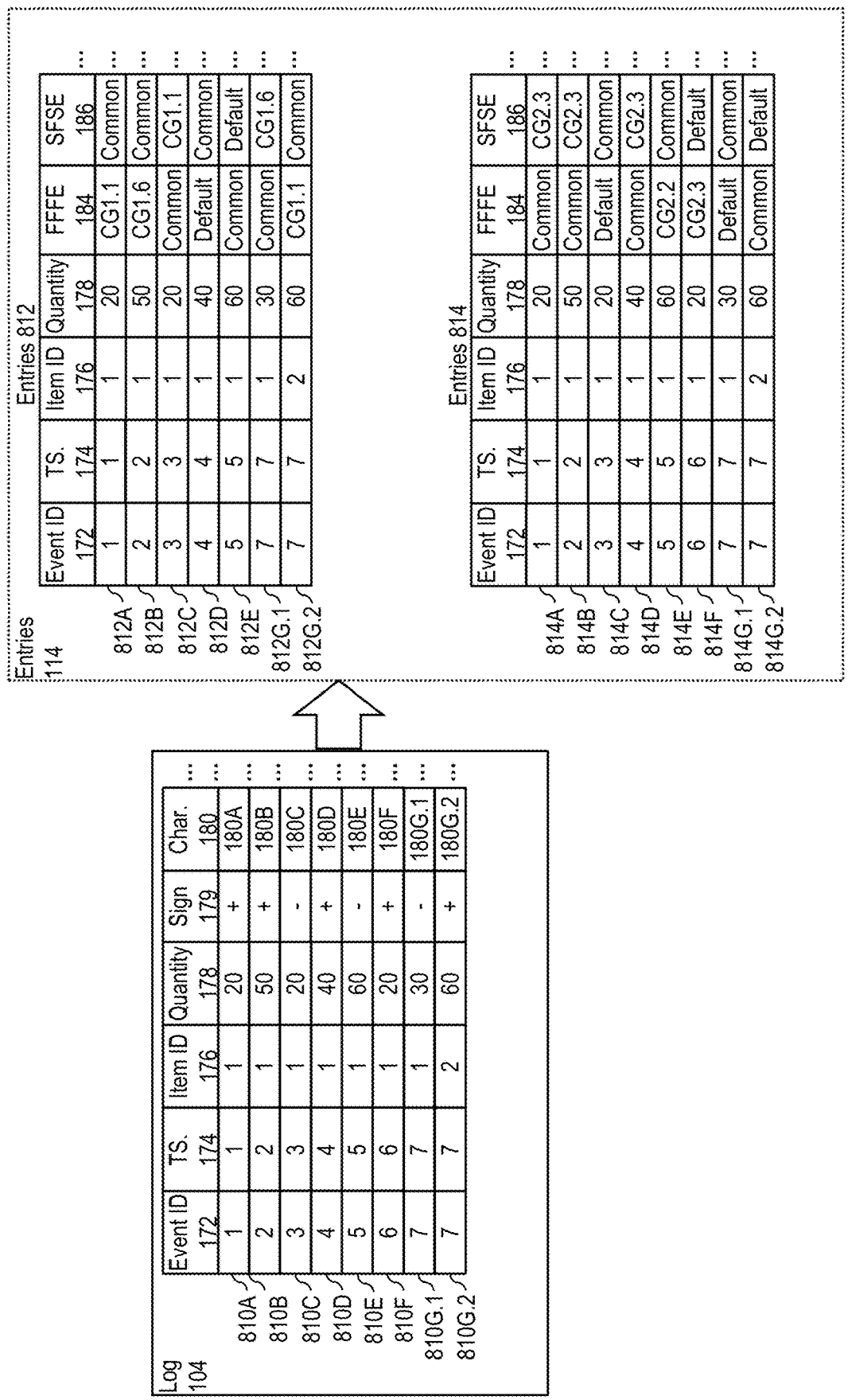
FIG. 8B is a block diagram illustrating example events in a log and entries generated based on these events according to some embodiments of the invention.

FIG. 8B is a block diagram illustrating example events in a log and entries generated based on these events according to some embodiments of the invention. In FIG. 8B, log 104 is populated, according to the previously described exemplary event schema, with event 810A through event 810G. In this example, the events are assigned event IDs 1-7 and timestamps 1-7. All the events include one impact except event 810G, which includes two impacts. Thus, event 810A may be referred to as event/impact 810A or impact 810A, while the event 810G is shown in log 104 including impact 810G.1 and impact 810G.2. While each event is shown having a different timestamp, embodiments of the invention can have more than one event with the same timestamp. All the events/impacts identify item ID 1 except impact 810G.2 which identifies item ID 2. The set of characteristics for events 810A-810F are labeled 180A through 180F. In contrast, event 810G having two impacts is shown having two set of characteristics: 180G.1 and 180G.2 respectively for impact 810G.1 and 810G.2. The quantities and signs of these events/impacts are also shown but will be described later with reference to FIG. 9A through FIG. 9F.

FIG. 8B also shows entries 114, including: 1) a set of entries 812 for CS1; and 2) a set of entries 814 for CS2. Entries 114 are populated according to the previously described exemplary entry schema. The entries in these sets are labeled 812.*x* and 814.*y*, where x and y match the letter for the event/impact in log 104 from which the entry was generated. Thus, entries 812 and entries 814 respectively include an entry 812A and an entry 814A, both generated based on the event 810A. While entries 814 include an entry for each impact in the log, entries 814 lacks an entry for event 810F. This is because event 810F is a purpose positive transfer event for CS2. The event IDs, timestamps, item IDs, and quantities of the entries match those of the event/impact for which the entries were generated. However, the IDs in entries under FFFE 184 and SFSE 186 are also shown but will be described later with reference to FIG. 9A through FIG. 9F.

FIG. 9A

FIG. 9A is a block diagram illustrating a first positive exchange event with complete information according to some embodiments of the invention. FIG. 9A includes event-based entries generator 112, entries 114, balances updater 128, inventory hub CSS 152A, inventory purpose CSS 152B, categorized side 154A, categorized side 154B, and common representation side 160.

In addition, FIG. 9A also shows part of event 810A, including "20" and "+" under quantity 178 and sign 179. Based on event 810A, event-based entries generator 112 generates: 1) entry 812A having "20," "CG1.1," and the common representation ID respectively under quantity 178, FFFE 184, and SFSE 186; and 2) entry 814A having "20," the common representation ID, and "CG2.3" respectively under quantity 178, FFFE 184, and SFSE 186. Thus, event 810A is a positive exchange event with complete information and has the relationship 115B.

Based on these entries, balances updater 128: 1) locates the running balance in categorized side 154A based on the combination of item ID 1 and CG1.1 under FFFE 184 of entry 812A (see line 932A), and updates the quantity debit 190 in categorized side 154A with 20 from the entry 812A (see the first part of line 930A; and since the initial value was 0, the update makes it 20); 2) locates the running balance in common representation side 160 based on item ID 1 and the common representation side ID under SFSE 186 of entry 812A and, and updates the quantity credit 192 with the 20 from the entry 812A (see the second part of line 930A; and since the initial value was 0, the update makes it 20); 3) locates the running balance in common representation side 160 based on item ID 1 and the common representation side ID under FFFE 184 of entry 814A, and updates the quantity debit 190 with 20 from the entry 814A (see the first part of line 940A; and since the initial value was 0, the update makes it 20); 4) locates the running balance in categorized side 154B based on the combination of item ID 1 and CG2.3 under SFSE 186 of entry 814A (see line 942A), and updates the quantity credit 192 in categorized side 154B with the 20 from the entry 814A (see the second part of line 940A; and since the initial value was 0, the update makes it 20).

FIG. 9A additionally includes double arrowed lines 165A and 165B. As previously described, the double arrowed lines 165A and 165B represent a relationship (sometimes referred to as the "common representation side equal and opposite relationship") between the running balances on the common representation sides of the inventory hub CSS 152A and the inventory purpose CSS 152B.

FIG. 9B

FIG. 9B is a block diagram illustrating a second positive exchange event with complete information according to some embodiments of the invention. FIG. 9B is like FIG. 9A, but some of the differences include: 1) event 810B, which has "50" under quantity 178; 2) entry 812B and 814B are generated, both with "50" under quantity 178; 3) entry 812B has "CG1.6" under FFFE 184, while entry 814B has CG2.3 under SFSE 186.

Also, based on these entries, balances updater 128: 1) locates the running balance in categorized side 154A based on the combination of item ID 1 and CG1.6 under FFFE 184 of entry 812B (see line 932B), and updates the quantity debit 190 in categorized side 154A with 50 from the entry 812B (see the first part of line 930B; and since the initial value was 0, the update makes it 50); 2) locates the running balance in common representation side 160 based on item ID 1 and the common representation side ID under SFSE 186 of entry 812B and, and updates the quantity credit 192 with the 50 from the entry 812B (see the second part of line 930B; and since the initial value was 20, the update makes it 70); 3) locates the running balance in common representation side 160 based on item ID 1 and the common representation side ID under FFFE 184 of entry 814B, and updates the quantity debit 190 with 50 from the entry 814B (see the first part of line 940B; and since the initial value was 20, the update makes it 70); 4) locates the running balance in categorized side 154B based on the combination of item ID 1 and CG2.3 under SFSE 186 of entry 814B (see line 942B), and updates the quantity credit 192 in categorized side 154B with the 50 from the entry 814B (see the second part of line 940B; and since the initial value was 20, the update makes it 70).

Again, the double arrowed lines 165A and 165B represent that the running balance on the common representation side of the inventory hub CSS 152A for a given item ID is equal and opposite the running balance on the common representation side of the inventory purpose CSS 152B for that item ID. Since FIG. 9B illustrates the balances implemented using debit and credit: 1) the running total debit of 0 and the running total credit of 70 for item ID 1 on the common representation side of the inventory hub CSS 152A will be respectively equal to the running total credit of 70 and the running total debit of 0 for item ID1 on the common representation side of the inventory purpose CSS 152B. This is true even though this total on the categorized side 154A is split between the two categories CG1.1 and CG1.6.

While FIG. 9B illustrates the balances being implemented using debit and credit, other embodiments may use other formats as previously described. For instance, if the balances were implemented using a quantity and a sign for that quantity, then the running balances on the common representation side of the inventory hub CSS 152A and the inventory purpose CSS 152B for a given item ID would be equal and opposite (that is, the quantities would be the same, but the signs would be opposite).

FIG. 9C

Figure 9C:
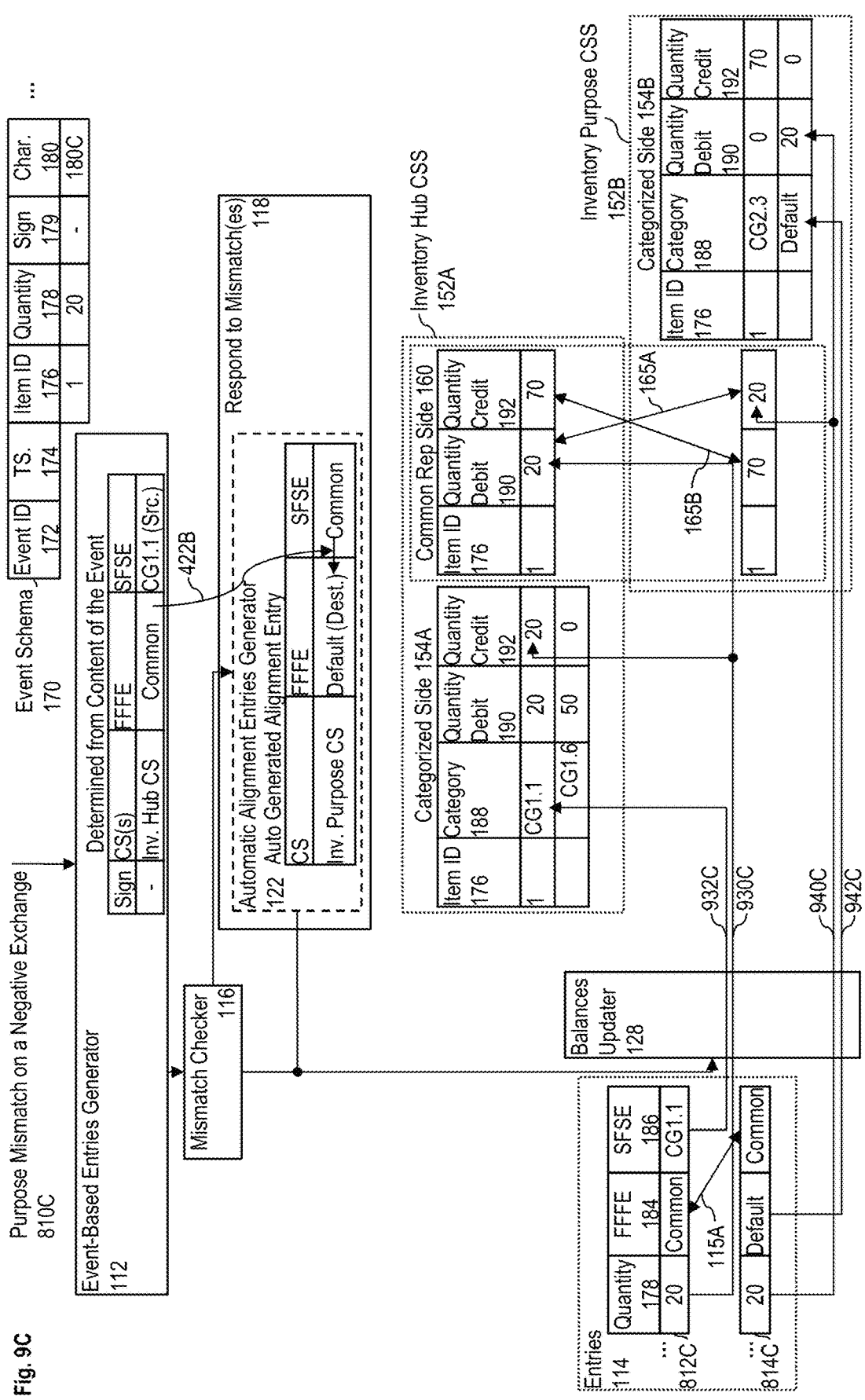
FIG. 9C is a block diagram illustrating a first purpose mismatch on a positive exchange event according to some embodiments of the invention.

FIG. 9C is a block diagram illustrating a first purpose mismatch on a positive exchange event according to some embodiments of the invention. FIG. 9C is like FIG. 4D in that it includes the event schema 170, event-based entries generator 112, mismatch checker 116, automatic alignment entries generator 122, and entries 114, but some of the differences include: 1) event 810C, which has "1," "20," "−," and "180C" under item ID 176, quantity 178, sign 179, and set of one or more characteristics 180; 2) entry 812C and 814C are generated, both with "20" under quantity 178; 3) entry 812C has the common representation side ID under FFFE 184, while entry 814C has the common representation side ID under SFSE 186; and 4) entry 812C has the "CG1.1" under SFSE 186, while entry 814C has the default category under FFFE 184.

Figure 9D:
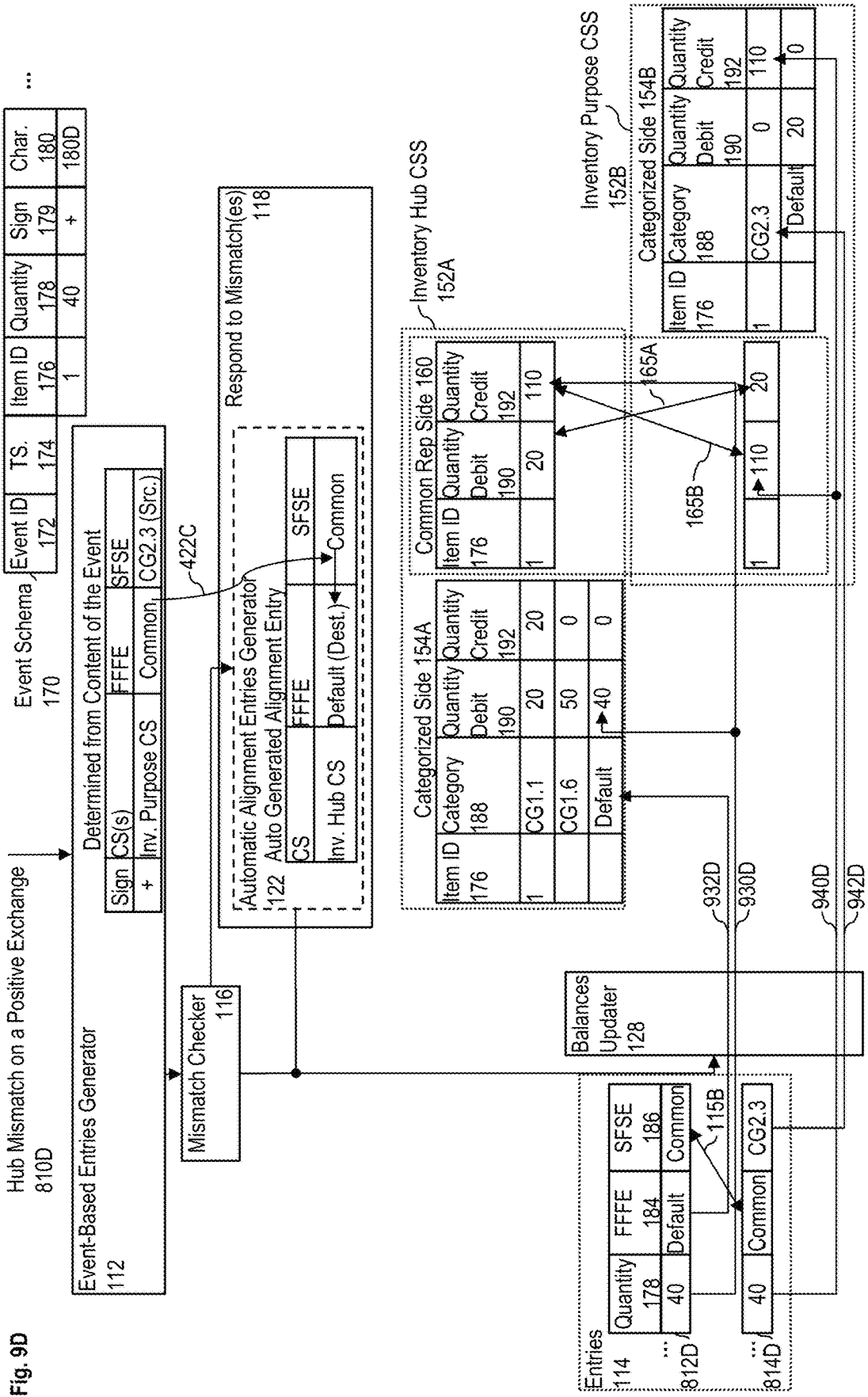
FIG. 9D is a block diagram illustrating a first hub mismatch on a positive exchange event according to some embodiments of the invention.

FIG. 9C is like FIG. 9D with regard to the balances updater 128, inventory hub CSS 152A, and inventory purpose CSS 152B, with the difference being that balances updater 128: 1) locates the running balance in common representation side 160 based on item ID 1 and the common representation side ID under FFFE 184 of entry 812C and, and updates the quantity debit 190 with the 20 from the entry 812C (see the second part of line 930C; and since the initial value was 0, the update makes it 20); 2) locates the running balance in categorized side 154A based on the combination of item ID 1 and CG1.1 under SFSE 186 of entry 812C (see line 932C), and updates the quantity credit 192 in categorized side 154A with 20 from the entry 812C (see the first part of line 930C; and since the initial value was 0, the update makes it 20); 3) locates the running balance in common representation side 160 based on item ID 1 and the common representation side ID under SFSE 186 of entry 814C, and updates the quantity credit 192 with 20 from the entry 814C (see the first part of line 940C; and since the initial value was 0, the update makes it 20); 4) locates the running balance in categorized side 154B based on the combination of item ID 1 and the default category under FFFE 184 of entry 814C (see line 942C), and updates the quantity debit 190 in categorized side 154B with the 20 from the entry 814C (see the second part of line 940C; and since the initial value was 0, the update makes it 20).

Again, the double arrowed lines 165A and 165B represent that the running balance on the common representation side of the inventory hub CSS 152A for a given item ID is equal and opposite the running balance on the common representation side of the inventory purpose CSS 152B for that item ID.

FIG. 9D

FIG. 9D is a block diagram illustrating a first hub mismatch on a positive exchange event according to some embodiments of the invention. FIG. 9D is like FIG. 4E in that it includes the event schema 170, event-based entries generator 112, mismatch checker 116, automatic alignment entries generator 122, and entries 114, but some of the differences include: 1) event 810D, which has "1," "40," "+," and "180D" under item ID 176, quantity 178, sign 179, and set of one or more characteristics 180; 2) entry 812D and 814D are generated, both with "40" under quantity 178; 3) entry 812D has the default category under FFFE 184, while entry 814D has "CG2.3" under SFSE 186; and 4) entry 812D has the common representation side ID under SFSE 186, while entry 814D has the common representation side ID under FFFE 184.

FIG. 9D is like FIG. 9C with regard to the balances updater 128, inventory hub CSS 152A, and inventory purpose CSS 152B, with the difference being that balances updater 128: 1) locates the running balance in categorized side 154A based on item ID 1 and the default category under FFFE 184 of entry 812D, and updates the quantity debit 190 with the 40 from the entry 812D (see the first part of line 930D; and since the initial value was 0, the update makes it 40); 2) locates the running balance in common representation side 160 based on the combination of item ID 1 and the common representation side ID under SFSE 186 of entry 812D (see line 932D), and updates the quantity credit 192 in common representation side 160 with 40 from the entry 812D (see the second part of line 930D; and since the initial value was 70, the update makes it 110); 3) locates the running balance in common representation side 160 based on item ID 1 and the common representation side ID under FFFE 184 of entry 814D, and updates the quantity debit 190 with 40 from the entry 814D (see the first part of line 940D; and since the initial value was 70, the update makes it 110); 4) locates the running balance in categorized side 154B based on the combination of item ID 1 and "CG2.3" under SFSE 186 of entry 814D (see line 942D), and updates the quantity credit 192 in categorized side 154B with the 40 from the entry 814D (see the second part of line 940D; and since the initial value was 70, the update makes it 110).

Again, the double arrowed lines 165A and 165B represent that the running balance on the common representation side of the inventory hub CSS 152A for a given item ID is equal and opposite the running balance on the common representation side of the inventory purpose CSS 152B for that item ID.

FIG. 9E

Figure 9E:
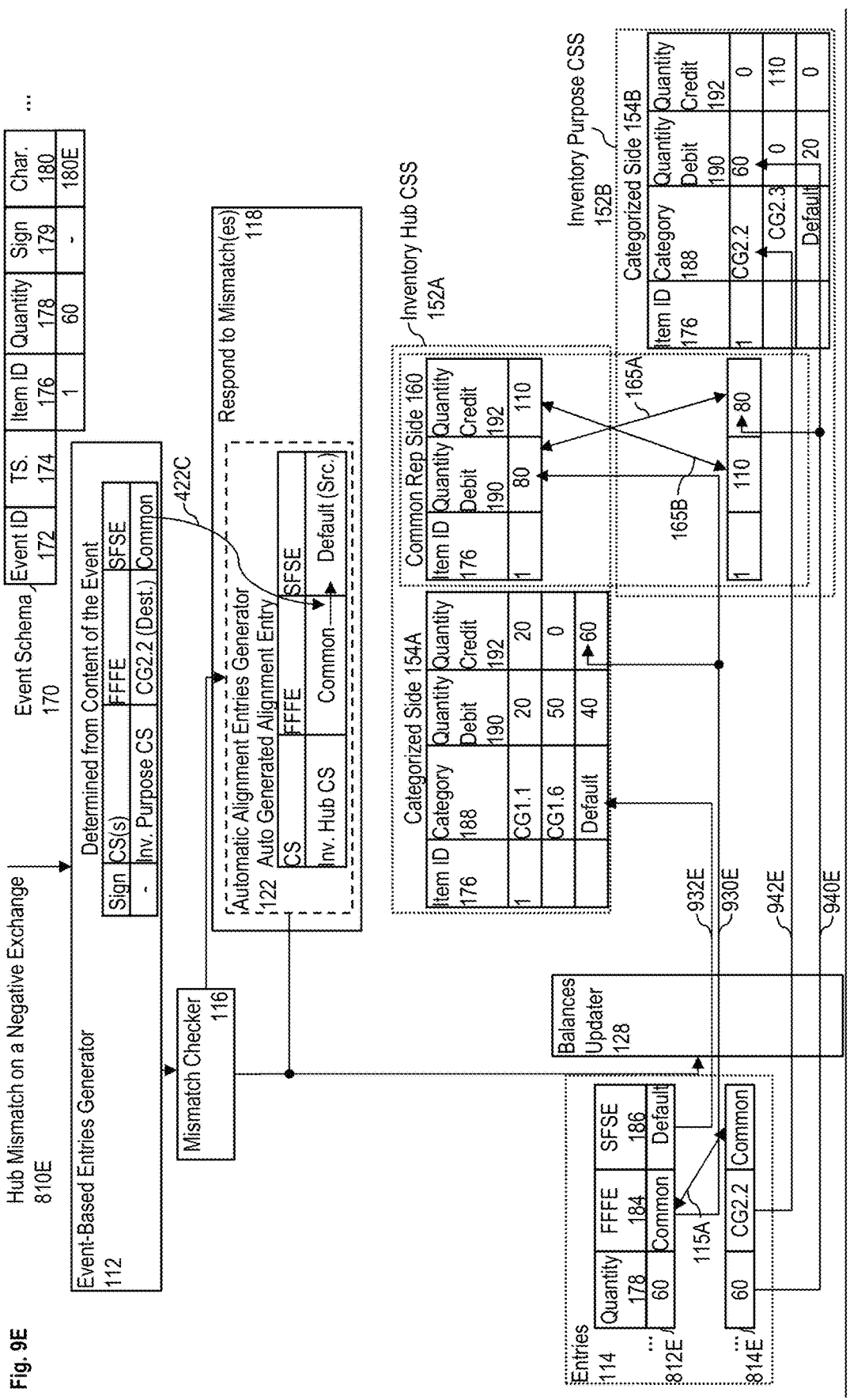
FIG. 9E is a block diagram illustrating a first hub mismatch on a negative exchange event according to some embodiments of the invention.

FIG. 9E is a block diagram illustrating a first hub mismatch on a negative exchange event according to some embodiments of the invention. FIG. 9C is like FIG. 4F in that it includes the event schema 170, event-based entries generator 112, mismatch checker 116, automatic alignment entries generator 122, and entries 114, but some of the differences include: 1) event 810E, which has "1," "60," "−," and "180E" under item ID 176, quantity 178, sign 179, and set of one or more characteristics 180; 2) entry 812E and entry 814E are generated, both with "60" under quantity 178; 3) entry 812E has the common representation side ID under FFFE 184, while entry 814E has the common representation side ID under SFSE 186; and 4) entry 812E has the default category under SFSE 186, while entry 814E has "CG2.2" under FFFE 184.

FIG. 9E is like FIG. 9D with regard to the balances updater 128, inventory hub CSS 152A, and inventory purpose CSS 152B, with the difference being that balances updater 128: 1) locates the running balance in common representation side 160 based on item ID 1 and the common representation side ID under FFFE 184 of entry 812E, and updates the quantity debit 190 with the 60 from the entry 812E (see the second part of line 930E; and since the initial value was 20, the update makes it 80); 2) locates the running balance in categorized side 154A based on the combination of item ID 1 and the default category under SFSE 186 of entry 812E (see line 932E), and updates the quantity credit 192 in categorized side 154A with 60 from the entry 812E (see the first part of line 930E; and since the initial value was 0, the update makes it 60); 3) locates the running balance in common representation side 160 based on item ID 1 and the common representation side ID under SFSE 186 of entry 814E, and updates the quantity credit 192 with 60 from the entry 814E (see the first part of line 940E; and since the initial value was 20, the update makes it 80); 4) locates the running balance in categorized side 154B based on the combination of item ID 1 and "CG2.2" under FFFE 184 of entry 814E (see line 942E), and updates the quantity debit 190 in categorized side 154B with the 60 from the entry 814E (see the second part of line 940E; and since the initial value was 0, the update makes it 60).

Again, the double arrowed lines 165A and 165B represent that the running balance on the common representation side of the inventory hub CSS 152A for a given item ID is equal and opposite the running balance on the common representation side of the inventory purpose CSS 152B for that item ID.

FIG. 9F

Figure 9F:
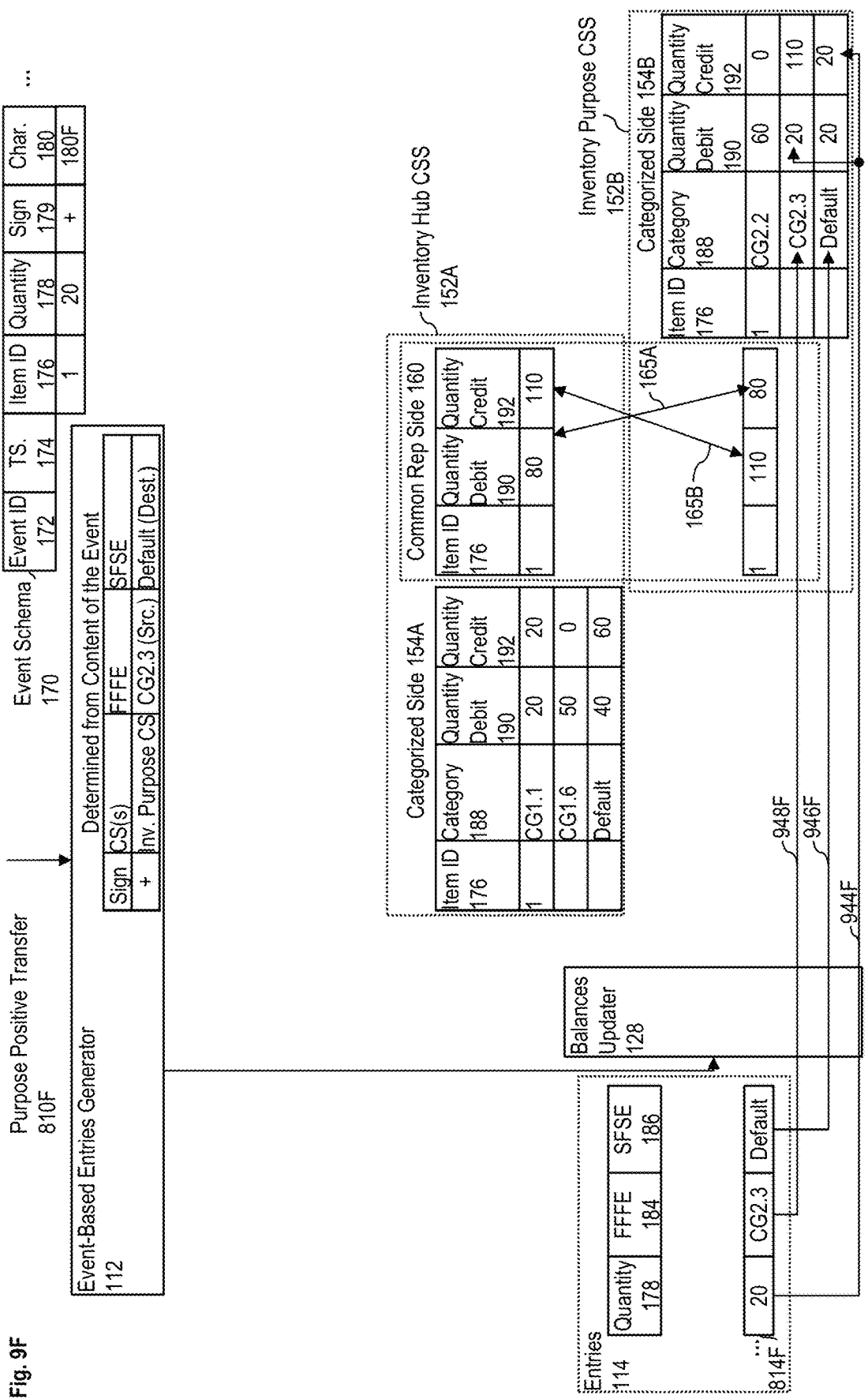
FIG. 9F is a block diagram illustrating a first purpose positive transfer event according to some embodiments of the invention.

FIG. 9F is a block diagram illustrating a first purpose positive transfer event according to some embodiments of the invention. FIG. 9F is like FIG. 5D in that it includes event-based entries generator 112 and entries 114, but some of the differences include: 1) the event schema 170; 2) event 810F, which has "1," "20," "+," and "180F" under item ID 176, quantity 178, sign 179, and set of one or more characteristics 180; 2) entry 814F is generated with "20," "CG2.3," and the default category respectively under quantity 178, FFFE 184, and SFSE 186.

FIG. 9F is like FIG. 9E with regard to the balances updater 128, inventory hub CSS 152A, and inventory purpose CSS 152B, with the difference being that balances updater 128: 1) locates the running balance in categorized side 154B based on the combination of item ID 1 and "CG2.3" under FFFE 184 of entry 814F (see line 948F), and updates the quantity debit 190 in categorized side 154B with the 20 from the entry 814F (see the first part of line 944F; and since the initial value was 0, the update makes it 20); and 2) locates the running balance in categorized side 154B based on the combination of item ID 1 and the default category under SFSE 186 of entry 814F (see line 946F), and updates the quantity credit 192 in categorized side 154B with the 20 from the entry 814F (see the second part of line 944F; and since the initial value was 0, the update makes it 20).

Again, the double arrowed lines 165A and 165B represent that the running balance on the common representation side of the inventory hub CSS 152A for a given item ID is equal and opposite the running balance on the common representation side of the inventory purpose CSS 152B for that item ID.

Delayed Categorization

Thus, the event 810C for FIG. 9C, being a purpose mismatch on a negative exchange, had insufficient information for the event-based entries generator 112 to generate an entry for categorized side 154B, and the automatic alignment entries generator 122 generated entry 814C as a temporary substitute entry using the default category. Thus, event 810C reflects a transaction relative to the inventory hub CS, but lacks sufficient information to update the purpose inventory CS. This entry 814C caused the running balance for the combination of item ID 1 and the default category quantity to be updated from 0 to 20. As a result, alignment with regard to the total running balance for item ID 1 is maintained as between inventory hub CSS 152A and inventory purpose CSS 152B (this is indirectly reflected in categorized side 154A and categorized side 154B because the quantities for item ID 1 can be summed across all categories, but this is directly reflected in the common representation side 160 because the running balances are kept by item ID (irrespective of any categories). Sometime later, the event 810F in FIG. 9F is submitted to provide the missing categorization. Entry 814F causes the quantity 20 to be transferred from the default category to the category CG2.3, and the running balance under the combination of the item ID 1 and the default category is zeroed out (credit=debit). This may be referred to as delayed categorization.

Event 810G

As previously described, event 810G includes impact 810G.1 and 810G.2. As shown in FIG. 8B, impact 810G.1 has a "30" and a "–" for quantity 178 and sign 179, while impact 810G.2 has a "60" and a "+." Entry 812G.1 and entry 814G.1 show that impact 810G.1 is a purpose mismatch on a negative exchange (thus, like FIGS. 4D and 9C), while the entry 812G.2 and entry 814G.2 show that impact 810G.2 is a purpose mismatch on a positive exchange (thus, like FIG. 4C).

Example 1 without Automatic Alignment

FIG. 10

Figure 10:
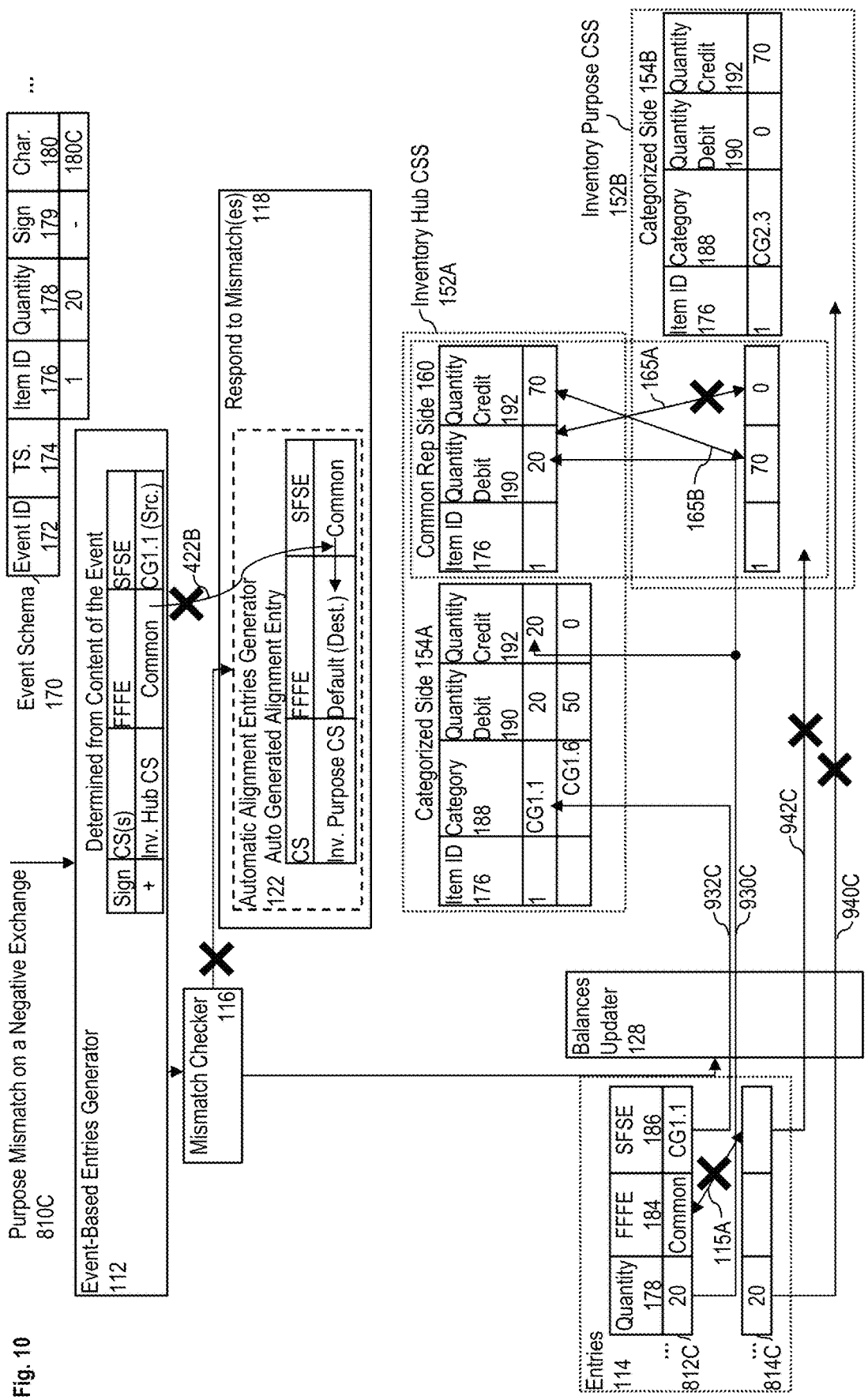
FIG. 10 is a block diagram illustrating issues resulting from lack of automatic alignment according to some embodiments of the invention.

FIG. 10 is a block diagram illustrating issues resulting from lack of automatic alignment according to some embodiments of the invention. FIG. 10 assumes that event 810A and event 810B from FIG. 8B has been processed as respectively shown in FIGS. 9A and 9B. However, FIG. 10 assumes that rather than the processing shown in FIG. 9C, event 810C does not result in automatic alignment (it assumes that the temporary substitute entry 814C is not generated responsive to the event 810C). Thus, FIG. 10 is like FIG. 9C, with the differences being that: 1) mismatch checker 116 does not trigger automatic alignment entries generator 122 to generate entry 814C; 2) relationship 115A is not maintained; 3) the updates represented by 940C and 942C are not performs; and 3) relationship 165A and relationship 165B are not maintained (that is, the common representation side 160 for inventory purpose CSS 152B is not equal and opposite to the common representation side 160 for inventory hub CSS 152A). As such, a user of inventory purpose CSS 152B would not be aware of the impact from event 810C. In other words, a user of inventory purpose CSS 152B would lack real time or near real time awareness of the total running balance of item ID 1 available in the organization.

It should be noted that in some embodiments a situation like FIG. 10 can occur due to an error, and thus such embodiments may still perform periodic reconciliation to address the lack of alignment. Even so, in such embodiments the period can be longer and/or the number of inconsistencies to address should be fewer. Further, since events are implemented to impact all CSSs that should be impacted, log 104 and event IDs will greatly reduce the effort required to perform the periodic reconciliation.

Example 1 with an Alternative Order of Events

Figure 11A:
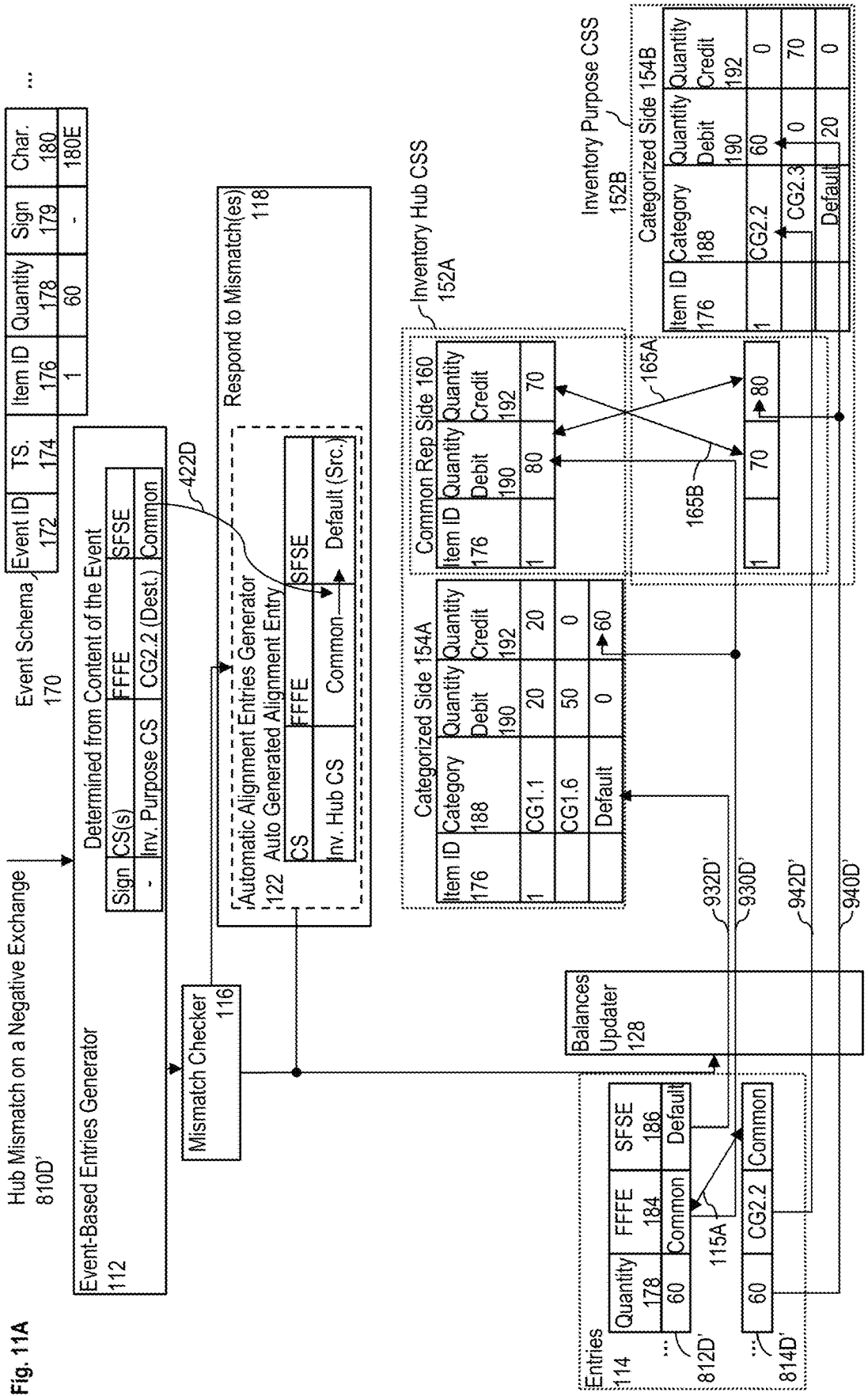
FIG. 11A is a block diagram illustrating an alternative ordering of the first hub mismatch on a negative exchange event from FIG. 9E according to some embodiments of the invention.

In this example, assume that the state of the system at the end of processing events 810A, 810B, and 810C, but not event 810D. Thus, in contrast to FIG. 10, FIG. 11A assumes that the auto mismatch and auto alignment of FIG. 9C occurred such that event 810C preformed relative to inventory hub CSS 152A, which event reduced the inventory of item 1 by 20, was reflected in relative to inventory purpose CSS 152B. As a refresher, event 810A and event 810B are both positive exchange events respectively for quantities of 20 and 30, making the running total of item ID 1 be 70. In contrast, event 810C is a purpose mismatch on a negative exchange for quantity 20, making the running total of item ID 1 be 50. Thus, as shown in FIG. 9C, that state for item ID 1 in inventory purpose CSS 152B are: 1) 70 and 20 respectively under quantity debit 190 and quantity credit 192 on the common representation side; 2) CG2.3, 0, and 70 respectively under category 188, quantity debit 190, quantity credit 192; and 3) default, 20, and 0 respectively under category 188, quantity debit 190, quantity credit 192.
FIG. 11A FIG. 11A is a block diagram illustrating an alternative ordering of the first hub mismatch on a negative exchange event from FIG. 9E according to some embodiments of the invention. That is, event 810D' in FIG. 11A is the same as event 810E in FIG. 9E but processed directly after event 810C (event 810D is not processed). This is done to illustrate how: 1) a user operating relative to inventory purpose CSS 152B can choose to go forward with an outgoing transaction even though it will exceed the organization's item ID 1 inventory (FIG. 11A); 2) how auto mismatch and auto alignment provides awareness of this overdraw relative to inventory hub CSS 152A (FIG. 11A). Referring to FIG. 2D, an example of event 271 caused to be submitted by first user 252 could be event 810C, and event 279 caused to be submitted by second user 256 could be event 810D'.

As described with reference to FIG. 2D, in some embodiments, the user causing the submission of event 810D' may be made aware of and requested to confirm the event should go forward (e.g., see block 280 and/or block 286). Even though aware that the overdraw will occur, the user of inventory purpose CSS 152B may go forward with the transaction (e.g., because that user plans themselves or expects another user to cover the shortfall later).

Thus, FIG. 11A is the same as FIG. 9D, except the entries are labeled 812D' and 814D' and the balances updater 128: 1) locates the running balance in common representation side 160 based on item ID 1 and the common representation side ID under FFFE 184 of entry 812D', and updates the quantity debit 190 with the 60 from the entry 812D' (see the second part of line 930D'; and since the initial value was 20, the update makes it 80); 2) locates the running balance in categorized side 154A based on the combination of item ID 1 and the default category under SFSE 186 of entry 812D' (see line 932D'), and updates the quantity credit 192 in categorized side 154A with 60 from the entry 812D' (see the first part of line 930D'; and since the initial value was 0, the update makes it 60); 3) locates the running balance in common representation side 160 based on item ID 1 and the common representation side ID under SFSE 186 of entry 814D', and updates the quantity credit 192 with 60 from the entry 814D' (see the first part of line 940D'; and since the initial value was 20, the update makes it 80); 4) locates the running balance in categorized side 154B based on the combination of item ID 1 and "CG2.2" under FFFE 184 of entry 814D' (see line 942D'), and updates the quantity debit 190 in categorized side 154B with the 60 from the entry 814E (see the second part of line 940D'; and since the initial value was 0, the update makes it 60).

As a result, inventory purpose CSS 152B will reflect that event 810D' causes an overdraw of item ID1 for the organization (e.g., on the common representation side 160 of inventory purpose CSS 152B, the quantity credit 192 credit for item ID 1 exceeds the quantity debit 190 by 10—that is, the 80 exceeds 70). Also, without auto mismatch and auto alignment, a user of inventory hub CSS 152A would not be aware that event 810D' exceeded the inventory of item ID 1 of the organization. But with auto mismatch and auto alignment, FIG. 11A shows that the impact of event 810D' is reflected in inventory hub CSS 152A in that: 1) the categorized side 154A has the total credit of Item ID 1 exceeding the total debit (that is, 80 exceeds 70) by 10.

Figure 11B:
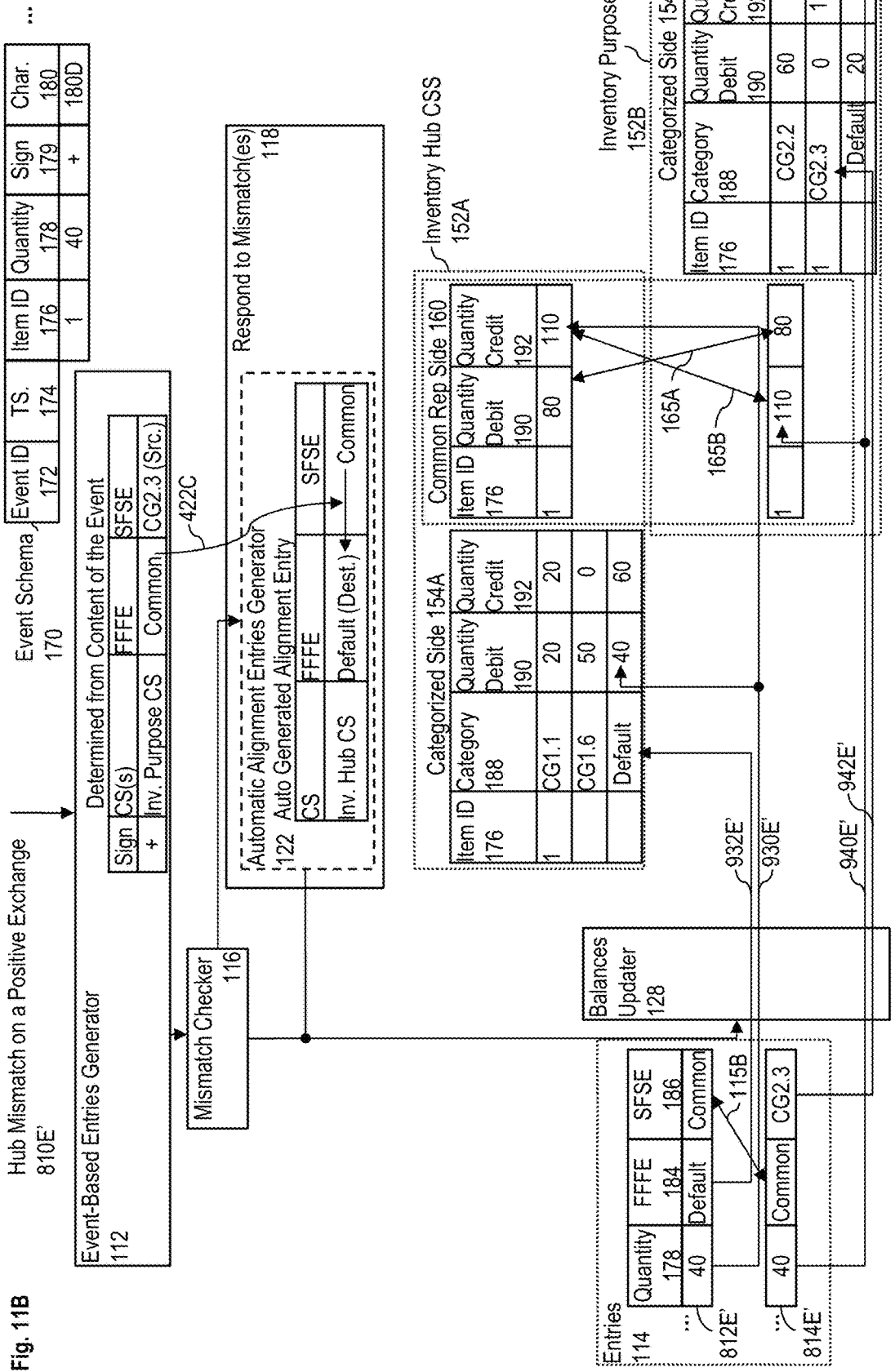
FIG. 11B is a block diagram illustrating a continuation of the alternative ordering started in FIG. 11A according to some embodiments of the invention.

Referring to FIG. 2D and again assuming that event 279 is event 810D', since this overdraw is reflected in both inventory hub CSS 152A and inventory purpose CSS 152B, then: 1) the first user 252 could (a) check with the second user 256 to confirm awareness and that the second user 256 has a plan to cover the shortfall and/or (b) in block 298 relative to the inventory hub CSS 152A enter into an transaction of a quantity to cover the overdraw; 2) the second user 256 in block 290 relative to the inventory purpose CSS 152B could enter into an transaction of a quantity to cover the overdraw (show in FIG. 11B which is described later herein; 3) another user relative to the inventory hub CSS 152A, the inventory purpose CSS 152B, or a different inventory purpose CSS could enter into an transaction of a quantity to cover the overdraw.
FIG. 11B FIG. 11B is a block diagram illustrating a continuation of the alternative ordering started in FIG. 11A according to some embodiments of the invention. That is, event 810E' in FIG. 11B is the same as event 810D in FIG. 9D but processed directly after event 810D' (event 810D is not processed). This is done to illustrate a user operating relative to inventory purpose CSS 152B covering the overdraw. Referring to FIG. 2D, an event submitted by second user 256.

Thus, FIG. 11B is the same as FIG. 9D, except the entries are labeled 812E' and 814E' and the balances updater 128: 1) locates the running balance in categorized side 154A based on item ID 1 and the default category under FFFE 184 of entry 812E', and updates the quantity debit 190 with the 40 from the entry 812E' (see the first part of line 930E'; and since the initial value was 0, the update makes it 40); 2) locates the running balance in common representation side 160 based on the combination of item ID 1 and the common representation side ID under SFSE 186 of entry 812E' (see line 932E'), and updates the quantity credit 192 in common representation side 160 with 40 from the entry 812E' (see the second part of line 930E'; and since the initial value was 70, the update makes it 110); 3) locates the running balance in common representation side 160 based on item ID 1 and the common representation side ID under FFFE 184 of entry 814E', and updates the quantity debit 190 with 40 from the entry 814E' (see the first part of line 940E'; and since the initial value was 70, the update makes it 110); 4) locates the running balance in categorized side 154B based on the combination of item ID 1 and "CG2.3" under SFSE 186 of entry 814E' (see line 942E'), and updates the quantity credit 192 in categorized side 154B with the 40 from the entry 814E' (see the second part of line 940E'; and since the initial value was 70, the update makes it 110).

Thus, the states of the inventory hub CSS 152A and inventory purpose CSS 152B are the same as those reflected in FIG. 9E. The difference between FIGS. 9D and 9E as compared to FIGS. 11A and 11B, in FIGS. 11A and 11B the total running balance of the inventory of item ID 1 went negative in FIG. 11A and was made positive again in FIG. 11B. The benefit of some embodiments is that this overdraw and cover are reflected in the various CSSs, meaning that users were aware of the overdraw and the cover in real time or near real time due to automatic alignment; as opposed to this awareness coming after the next periodic reconciliation in systems that rely on periodic reconciliation.

Example 1 Queries and Statements

FIG. 12A

Figure 12A:
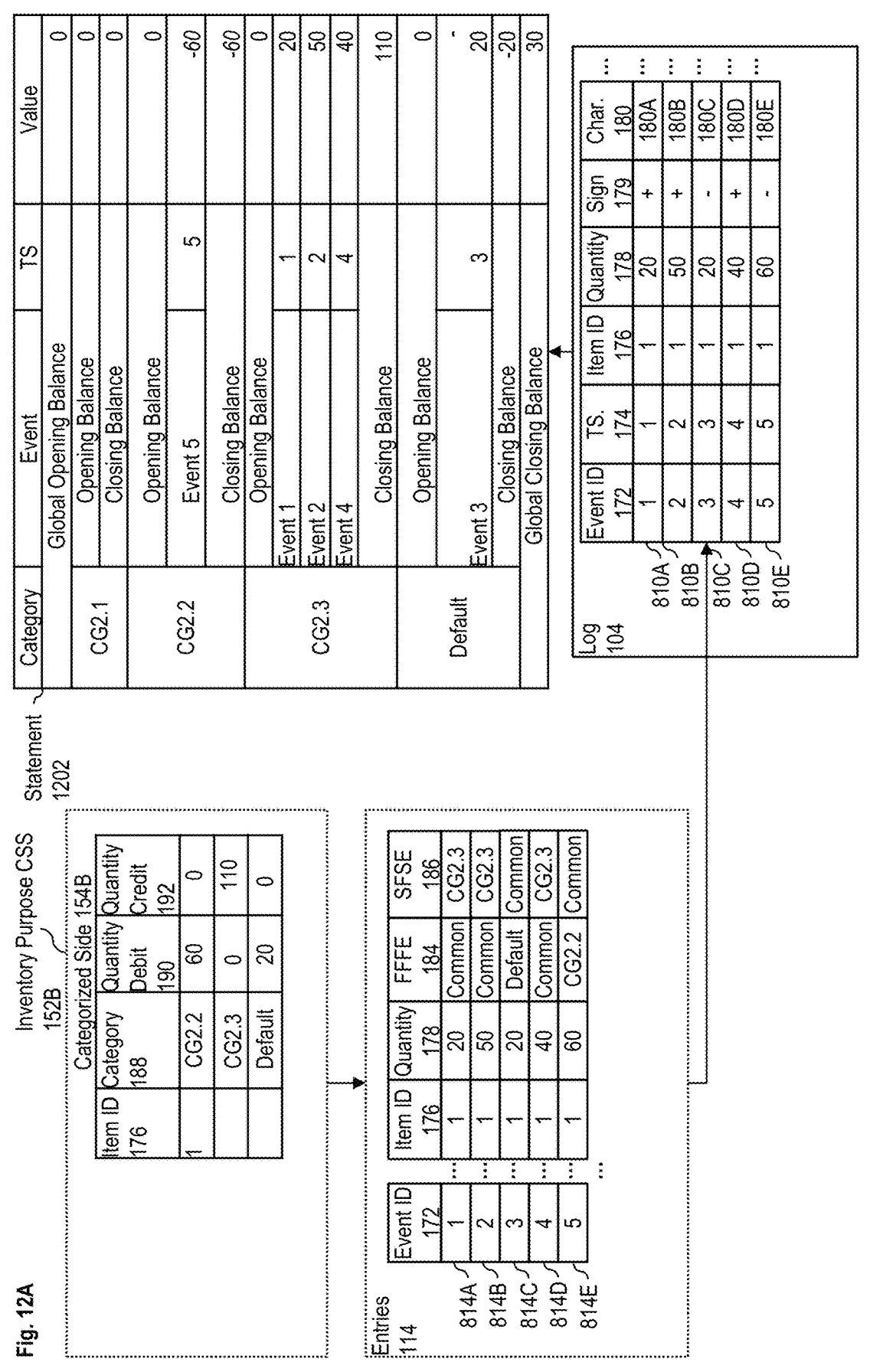

FIG. 12A is a block diagram illustrating a manner of easing explanation after example event 810E according to some embodiments. FIG. 12A assumes that a query is submitted relative to inventory purpose CSS 152B for the opening balances, closing balances, and contributing events by category for item ID 1. FIG. 12A shows the state of the categorized side 154B of inventory purpose CSS 152B following event 810E (and thus, FIG. 9E), entry 814A through entry 814E in entries 114, and event 810A through event 810E in log 104.

In some embodiments, based on the query the categories for item ID 1 in categorized side 154B are accessed and used in combination with item ID 1 to identify contributing entries in entries 114 (which, in this example, are entry 814A through entry 814E). Based on the event IDs in these entries, log 104 is accessed to retrieve information regarding these events.

Based on the accessed information, statement 1202 is generated with the following schema: Category, Event, Timestamp, and Value. The statement is split into two sections: Global Opening Balance and Global Closing Balance. Under Global Opening Balance, the Category column includes main rows for each of the categories in CS2, which are: CG2.1, CG2.2, CG2.3, and Default. Each of these main rows is split into sub rows starting with the Event column. The sub rows of the main rows each start with an Opening Balance sub row and a Closing Balance sub row, which effectively form two subsections. Between these sub rows is a row for each event (if any) that contributed to the closing balance of that item ID, and they include the event ID, the timestamp, and the value (the combination of the quantity and sign from the event).

FIG. 12B

Figure 12B:
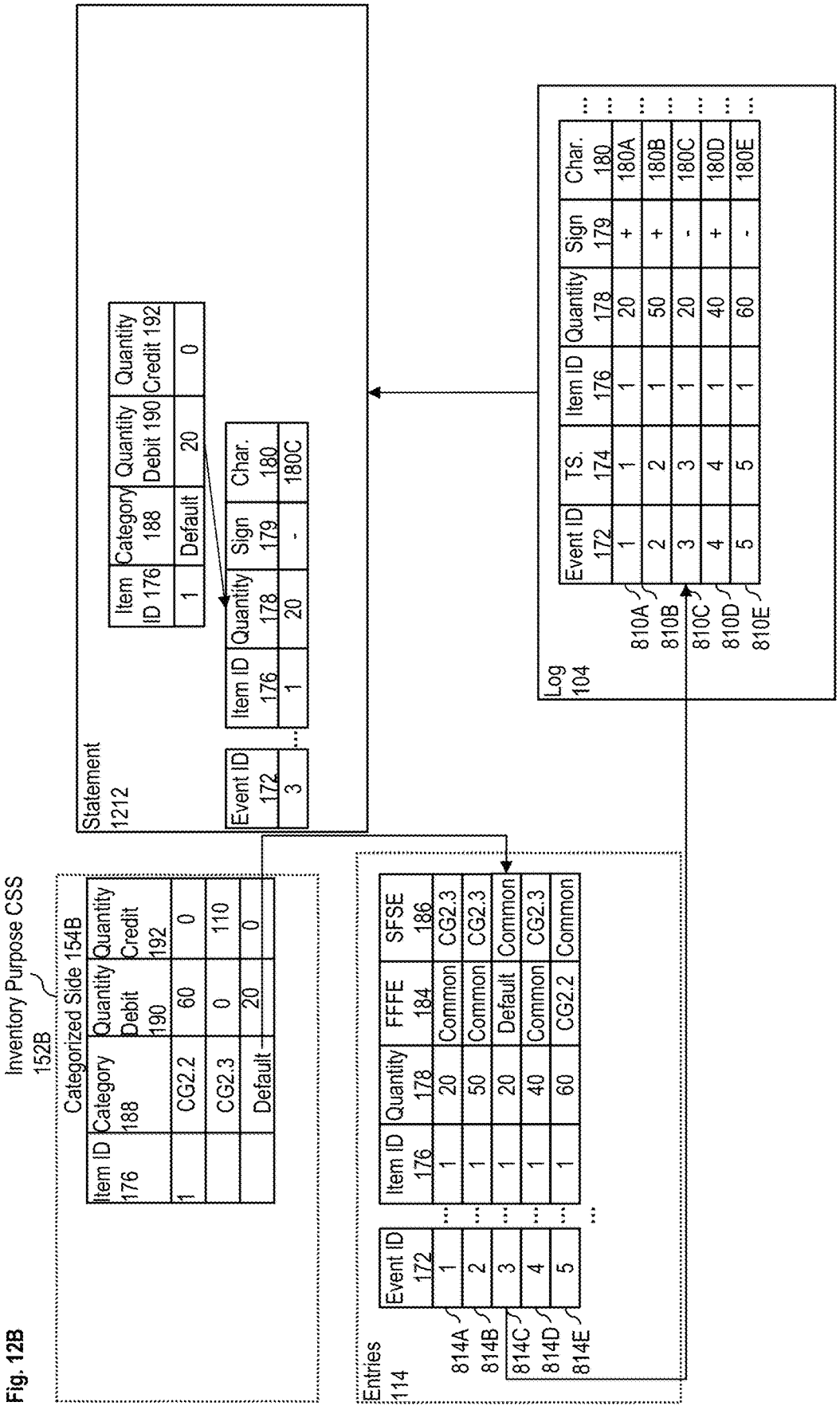
FIG. 12B is a block diagram illustrating a second manner of easing explanation after example event 810E according to some embodiments of the invention.

FIG. 12B is a block diagram illustrating a second manner of easing explanation after example event 810E according to some embodiments of the invention. FIG. 12B assumes that a query is submitted relative to inventory purpose CSS 152B for the contributing events for the combination of the default category and item ID 1. Like FIG. 12A, FIG. 12B shows the state of the categorized side 154B of inventory purpose CSS 152B following event 810E (and thus, FIG. 9E), the entry 814A through entry 814E in entries 114, and event 810A through event 810E in log 104.

In some embodiments, based on the query, the combination of the default category and item ID 1 is used to identify contributing entries in entries 114 (which, in this example, is entry 814C since it has the default category under FFFE 184). Since entry 814C includes a "3" under the event ID 172, this value is used to look up event information in log 104 (that is, event 810C).

Based on this information, statement 1212 is generated. Statement 1212 includes a representation of the data retrieved log 104. Thus, in embodiments that generate from each event the set of one or more entries need to update all relevant CSSs, a query can provide the set of characteristics 180 from the origin event of the entire set of entries.

FIG. 12B is like block 602 through block 612 from FIG. 6A, as well as reference labels 650 to 658 of FIG. 6B. For example, FIG. 12B shows data for the events (namely, event 810A through event 810E), entries, and resulting categorized side 154B, while FIG. 6B only shows the equivalent of some of the data from event 810C. Similarly, the statement 1212 shows 180C, FIG. 6B shows a generic CCC.

However, like block 614 to block 618 of FIG. 6A and reference labels 660 to 666 of FIG. 6B, a user may review the statement 1212 and decide to cause the submission of event 810F to provide the missing categorization as described with reference to FIG. 9F.

By way of example, there may be a second user that causes the submission of event 810E, but the job a third user to categorize those items listed under default categories. Due to automatic mismatch detection and automatic alignment, some embodiments of the invention allow for the third user to perform the categorizations immediately. For example, in some embodiments the third user could receive a notification that identifies event ID 3 created or contributed to a default category. While in some embodiments the third user could receive a notification that identifies event ID 3 created or contributed to a default category, in other embodiments the third user may additionally or alternatively submit a query periodically for running balances in the default category. Regardless, the third user would not need to wait like a user would have to in a system that relies on periodic reconciliation.

The third user could then investigate as to whether: 1) the data for event 3 in log 104 did not have the needed information to cause the generation of an entry for inventory purpose CSS 152B, and so the system automatically generated entry 814C with the default category; 2) the data was present in the event but the system was not properly configured to generate an entry for inventory purpose CSS 152B (e.g., a problem with classification rules described later herein).

Assuming the third user determines the category and submits event 810F, the result of the effort to perform the categorization is evident in real time or near real time. This is a benefit over systems that rely on periodic reconciliation because such systems would need to perform the reconciliation process again after submitting events to fix the issue (e.g., using conventional techniques where different systems rely on periodic reconciliation, there will typically be a need to submit separate, differently formatted events into different ones of the systems to both align and provide the categorization to those systems; other events may be processing in the interim).

FIG. 12C

Figure 12C:
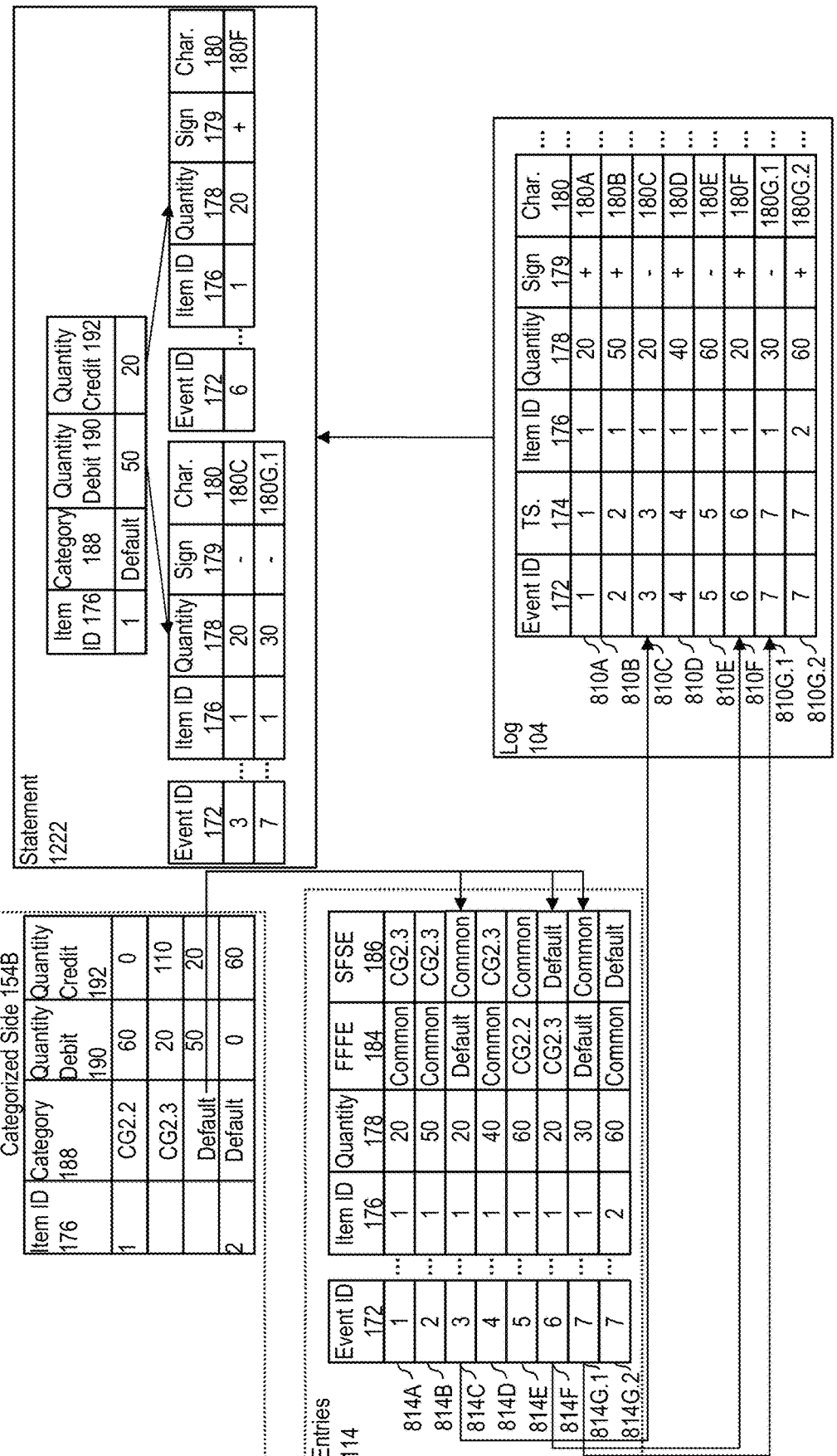
FIG. 12C is a block diagram illustrating a manner of easing explanation after example event 810G according to some embodiments of the invention.

FIG. 12C is a block diagram illustrating a manner of easing explanation after example event 810G according to some embodiments of the invention. As previously described, some embodiments support multiple events contributing to a single default category; that is, within a CSS, when more than one event results in a contribution of a quantity to the "default category," it is represented as a separate, single record for the "default category." In some such embodiments, a user can "drill down" to determine the event IDs. An example of this is shown in FIG. 12C.

FIG. 12C assumes the same query as in FIG. 12B, but the query is submitted after the processing of event 810G. As a result, there are more entries 814 that include the default category, and thus more contributing events, in FIG. 12C. Specifically, the default category is reflected in entry 814C, entry 814F, and 814G.1, and these entries respectively identify event ID 3, event ID 6, and event ID 7. Thus, a statement 1222 is generated that reflects event information from the log for all 3 of these events. This reflects the above-described drill down, including which event(s) and the quantities that contributed to the running balance; that is, that: 1) event ID 3 and event ID 7 respectively contributed 20 and 30 to the quantity debit 190 of the categorized side 154B; and 2) event ID 6 contributed 20 to the quantity credit 192. In addition, it reflects the that total of the contributions to quantity debit 190 and quantity credit 192 are respectively 50 and 20.

FIG. 12D

FIG. 12D is a block diagram illustrating a second manner of easing explanation after example event 810G using a time range according to some embodiments of the invention. FIG. 12D is the same as FIG. 12C, except the query submitted is limited by a time range between timestamp 4 and timestamp 7. As a result, the query excludes entry 814C (because its timestamp of 3 is outside of the time range) but includes entry 814F and 814G.1. Therefore, event ID 3 is excluded, but event ID 6 and event ID 7 are included in the query result. This is reflected in statement 1232. This reflects the above-described drill down, including which event(s) and the quantities that contributed to the running balance; that is, that: 1) event ID 7 contributed 30 to the quantity debit 190 of the categorized side 154B; and 2) event ID 6 contributed 20 to the quantity credit 192. In addition, it reflects the that total of the contributions to quantity debit 190 and quantity credit 192 are respectively 30 and 20.

Example 1 with the Optional Addition of a Subset

Below, an additional inventory purpose CS is introduced for which is defined an inventory purpose subset as part of inventory purpose CS subset(s) 135 according to some embodiments. This is by way of example and not limitation (e.g., the additional inventory purpose CS need not have a subset; additionally or alternatively a subset could be defined for inventory purpose CS ID 132B; additionally or alternatively additional inventory purpose CSs could be defined for which respective subsets are or are not defined; etc.).

FIG. 13A

FIG. 13A is a block diagram illustrating the configuration information for the first example with the addition of a third CSS according to some embodiments of the invention. FIG. 13A is like FIG. 8A, with the differences including: 1) an additional column that identifies CS3 under inventory purpose CS ID 132C; 2) an additional main row that is at the bottom of the table, that is part of the orthogonal categorization schemes definition 131, that has CG3 under the sub column category group names 802, that has 3 sub rows. These sub rows have CG3.1, CG3.2, and CG3.3 respectively under the sub column categories 806, and mappings definition 134 shows that these belong to CS3.

FIG. 13B

FIG. 13B is a block diagram illustrating configuration information including a subset(s) definition according to some embodiments of the invention. FIG. 13B shows the inventory purpose CS subset(s) 135 as a table with: 1) columns CS ID and subset; and 2) a row for each inventory purpose CS ID with the respective inventory purpose CS IDs under the column CS ID and the respective subset definitions under the column subset. For CS2, "Total" is under the column subset. While in some embodiments all inventory purpose CS IDs are listed in inventory purpose CS subset(s) 135 and "Total" is used to indicate a given inventory purpose CS ID has no subset, alternative embodiments may use a different indication or not include inventory purpose CS(s) for which there is no subset defined.

For CS3, the column subset indicates the criteria that defines the subset for the inventory purpose CSS for CS3. In FIG. 13B, the criteria are defined in terms of the set of characteristics 180; namely, a set of one or more characteristics that, if included in the set of characteristics 180 of an event, will determine if an entry needs to be generated for the CSS of CS3. For example, the subset for CS3 could be defined to: 1) exclude events/impacts that involve outgoing inventory or that are to cover an overdraw; and/or 2) to include only events/impacts that involve incoming inventory and that are not related to covering an overdraw.

FIG. 13C

FIG. 13C is a block diagram describing additional relationships between CSSs, including the third CSS, according to some embodiments of the invention. FIG. 13C is like FIG. 1F, with the differences including: 1) that CS3 is another orthogonal categorization scheme that includes the CG3 categories in the categories definition 133, and thus CS3 can be viewed as providing yet another dimension, referred to here as dimension3; 2) the purpose for CS3 is to track and manage according to a third aspect by a third dimension (dimension3); and 3) that relative to the previously describe application 1, dimension3 may be by supplier of an item, the CG3 categories may represent different suppliers, and the purpose may be to track and manage the inventory by the suppliers of the items and create statistics.

FIG. 13D

Figure 13D:
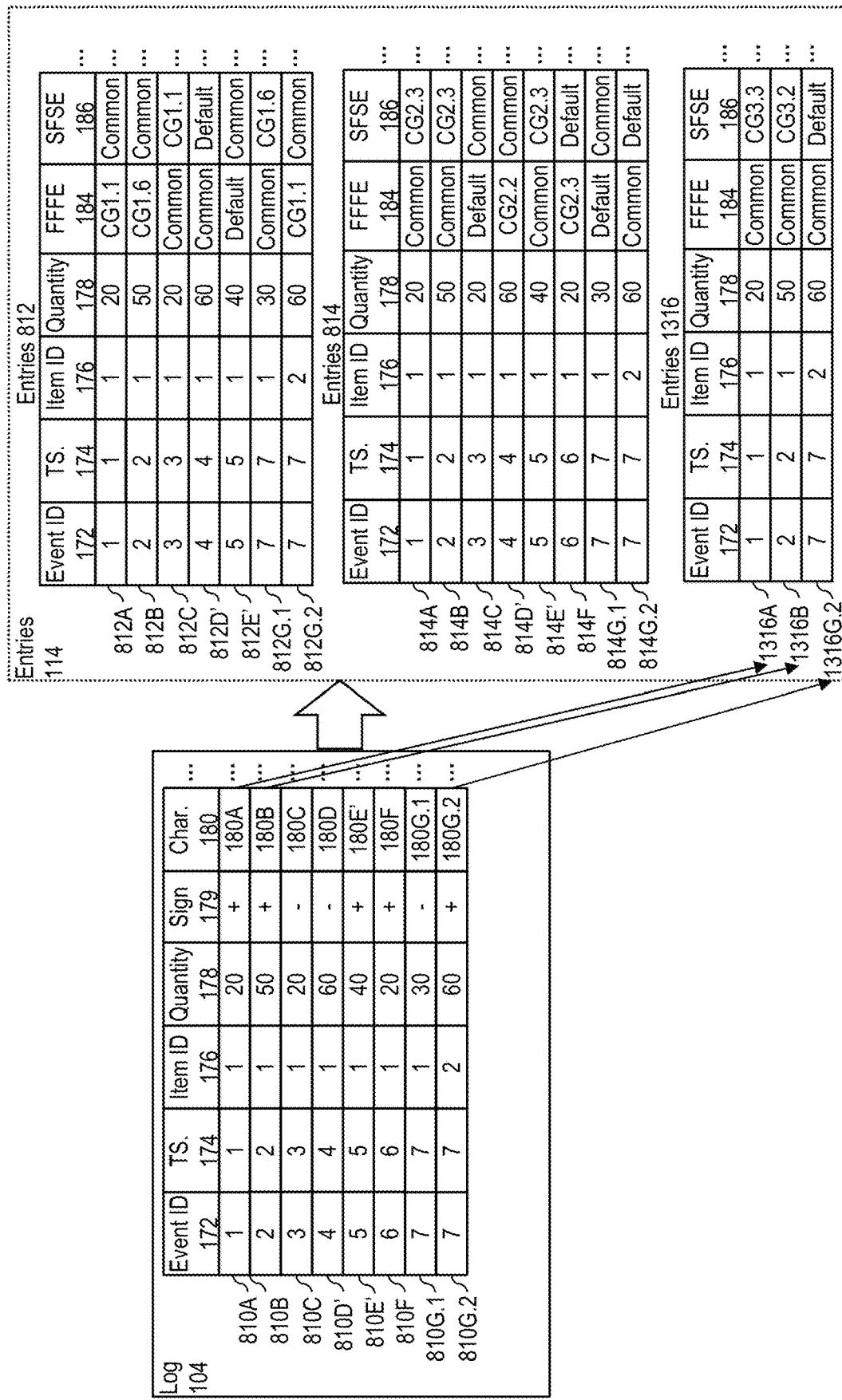
FIG. 13D is a block diagram illustrating the example events in a log and the example entries generated based on the example events, including those for the third CSS, according to some embodiments of the invention.

FIG. 13D is a block diagram illustrating the example events in a log and the example entries generated based on the example events, including those for the third CSS, according to some embodiments of the invention. FIG. 13D is like FIG. 8B, except it: 1) shows the event 810D' and event 810E' (the previously described events that involve an overdraw and a cover), where 180E' is under set of one or more characteristics 180 for event 810E'; 2) includes entries 1316 for updating inventory purpose CSS 152C; 3) includes entry 1316A, entry 1316B, and entry 1316G.2 because entries should only be generated for event/impact 810A, event/impact 810B, and event 810G/impact 810G.2 per the inventory purpose subset(s) 135; 4) the data in entry 1316A, entry 1316B, and entry 1316G.2 that is under event ID 172, timestamp 174, item ID 176, and quantity 178 is respectively the same as that for the respective A, B, and G.2 entries in entries 812 and entries 814; 5) the data in entry 1316A, entry 1316B, and entry 1316G.2 that is under FFFE 184 is the common representation side ID; and 6) the data in entry 1316A, entry 1316B, and entry 1316G.2 that is under SFSE 186 is respectively CG3.3, CG3.2, and the default category for CS3.

Per the example subset in FIG. 13B, the following has occurred: 1) event/impact 810A, event/impact 810B, and event 810G/impact 810G.2 cause the generation of entries because they pertain to incoming inventory and do not pertain to covering an overdraw; 2) event 810C, event 810D', event 810G.1 does not cause the generation of entries because they pertain to outgoing inventory; 3) event 810E' does not cause the generation of an entry because it pertains to covering an overdraw (which would be reflected, in some embodiments, in 180E'); and event 810F does not cause the generation of an entry because it pertains to a purpose positive transfer relative to CS2.

By way of a second example, if the events were as shown in FIG. 8B (that is, with event 810D and event 810E, and thus not an overdraw and cover), then event 810D would generate an entry 1316E because it would pertain to incoming inventory and not pertain to covering an overdraw.

Thus, some embodiments, based on configuration data (e.g., inventory purpose subset(s) 135) and the event, automatically determine that no entry should be generated for a third categorization scheme, wherein the third categorization scheme is orthogonal to each the first and second categorization schemes, wherein the third categorization scheme is used to manage only a certain aspect of the inventory. By way of example, with reference to FIG. 1A, the mismatch checker 116 would automatically determine that there was no mismatch relative to CS3 for events/impacts that do not require an entry for CS3; and thus, would not trigger the automatic alignment entries generator 122. By way of another example, with reference to FIG. 2A, block 212 shows checking, for each of the impacts, whether the set of entries (generated in block 210 based upon the content of the event) includes an entry for every CS that should have one (check for Mismatches). Thus, as described above, in some embodiments, the phrase "should have one" may refer to scenarios that include transfer events/impacts and inventory purpose subset(s). For a transfer event/impact, there only needs to be an entry for one of the CSs. For an exchange event/impact, there only needs to be an entry relative to a given inventory purpose CS (e.g., CS3) if that event/impact is included (put another way, not excluded by the subset, if any, for that inventory purpose CS.

Thus, inventory purpose subset(s) enables not representing all the inventory in every categorization scheme. Further, in embodiments that implement categorization rules (described later herein), inventory purpose subset(s) can operate: 1) as an optimization in that they avoid the generation of alignment entries and/or application of categorization rules (in embodiments that implement them) that pertain to any inventory purpose CSs for which an entry need not be generated; and 2) reduce the chance of categorization rules (in embodiments that implement them) being triggered that should not be (per above, embodiments can skip any categorization rules that pertain any inventory purpose CSs for which an entry need not be generated).

FIG. 14A

FIG. 14A is a block diagram illustrating the first positive exchange event with complete information, but relative to the third CSS, according to some embodiments of the invention. FIG. 14A is like FIG. 9A, with the differences including: 1) entry 1316A; 2) inventory purpose CSS 152C instead of inventory purpose CSS 152B; 3) common representation side and categorized side 154C of inventory purpose CSS 152C; and 4) based on entry 1316A, balances updater 128 (A) locates the running balance in common representation side 160 based on item ID 1 and the common representation side ID under FFFE 184 of entry 1316A, and updates the quantity debit 190 with 20 from the entry 1316A (see the first part of line 1442A; and since the initial value was 0, the update makes it 20) and (B) locates the running balance in categorized side 154C based on the combination of item ID 1 and CG3.3 under SFSE 186 of entry 1316A (see line 1442A), and updates the quantity credit 192 in categorized side 154C with the 20 from the entry 1316A (see the second part of line 1440A; and since the initial value was 0, the update makes it 20).

FIG. 14B

FIG. 14B is a block diagram illustrating the second positive exchange event with complete information, but relative to the third CSS, according to some embodiments of the invention. FIG. 14B is like FIG. 9B, with the differences including: 1) entry 1316B; 2) inventory purpose CSS 152C instead of inventory purpose CSS 152B; 3) common representation side and categorized side 154C of inventory purpose CSS 152C; and 4) based on entry 1316B, balances updater 128 (A) locates the running balance in common representation side 160 based on item ID 1 and the common representation side ID under FFFE 184 of entry 1316B, and updates the quantity debit 190 with 50 from the entry 1316B (see the first part of line 1440B; and since the initial value was 20, the update makes it 70) and (B) locates the running balance in categorized side 154B based on the combination of item ID 1 and CG3.2 under SFSE 186 of entry 1316B (see line 1442B), and updates the quantity credit 192 in categorized side 154B with the 50 from the entry 814B (see the second part of line 1440B; and since the initial value was 20, the update makes it 70).

Event 810G

As previously described, event 810G includes impact 810G.1 and 810G.2. As shown in FIG. 13D, impact 810G.2 has a "60" and a "+" for quantity 178 and sign 179. Entry 812G.2, entry 814G.2, and entry 1316G.2 show that impact 810G.2 is a purpose mismatch on a positive exchange (thus, like FIG. 4C).

Example 1 with the Optional Addition of Segmentation and a Hierarchy

FIG. 15A

FIG. 15A is a block diagram illustrating the configuration information for the first example with the addition of a hierarchy and segmentation schemes according to some embodiments of the invention. FIG. 15A is like FIG. 13A, with the differences including: 1) an additional sub column that is labeled "one or more optional hierarchies 1504," and that is part of the column category groups 800, that is between the sub columns category group names 802 and categories 806; 2) the main row with CG1 under the sub column category group names 802 splits into three intermediate rows under the new sub column "one or more optional hierarchies 1504;" 3) the first of these intermediate rows includes an "A" and spans the sub rows CG1.1-CG1.3; 4) the second of these intermediate rows includes a "B" and spans the sub rows CG1.4-CG1.5; and 5) the third of these intermediate rows includes a "C" and spans the sub row CG1.6. In short, a level of a hierarchy is added between the category group names CG1 and the categories CG1.1-CG1.5. Thus, CG1 can be viewed as a root node with three branches labeled A, B, and C, and each of these branches respectively ends in leaf nodes CG1.1-CG1.3, CG1.4-CG1.5, and CG1.6 (also referred to as leaf categories). Additionally or alternatively, CG1.1-CG1.3 may be referred to: 1) as child nodes of parent node A; or 2) as descendants of node A and/or node CG1. Similar nomenclature may be used relative to nodes B and CG1.4-CG1.5, as well as C and CG1.6.

While FIG. 15A shows a hierarchy for a single one of the orthogonal categorization schemes, embodiments may additionally or alternatively have hierarchies for one or more others of the orthogonal categorization schemes. Also, while FIG. 15A shows a particular relationship of nodes in the hierarchy and a particular size of hierarchy, alternative embodiments may include hierarchies with more levels and/or different relationships.

A hierarchy is useful for generating reports that group or sum quantities and/or running balances at a level between the category group names 802 and the categories 806. For example, where a given categorization scheme (e.g., CS1) includes a hierarchy of categories, where the hierarchy includes a number of leaf categories (e.g., CG1.1-CG1.6), and where a first category (e.g., CG1.2) of the first categorization scheme is one of the leaf categories, the system may generate a report that includes a specific category (e.g., A) and a quantity for the specific category, where the quantity is based combining balances for the subset of the leaf categories (CG1.1-CG1.3) that depend from the specific category (e.g., A) directly or indirectly.

Another difference between FIG. 15A and FIG. 13A is that FIG. 15A includes two additional main rows that: 1) are at the bottom of the table; 2) are part of segmentation scheme(s) definition 136; 3) respectively have CG4 and CG5 under the sub column category group names 802; and 4) respectively have 2 sub rows. The CG4 sub rows have CG4.1 and CG4.2 under the sub column categories 806, and mappings definition 134 shows that these belong to CS1. The CG5 sub rows have CG5.1 and CG5.2 under the sub column categories 806, and mappings definition 134 shows that these belong to CS2.

While FIG. 15B shows a single segmentation of two of the orthogonal categorization schemes, embodiments may additionally or alternatively segment one or more others of the orthogonal categorization schemes. Also, while FIG. 15A shows a particular number of segments per segmentation, alternative embodiments include more segments per segmentation.

Segmentation allows for the addition of one or more other dimensions to one or more CSSs. Transfer events/impacts relative to a given CSS between segmentation categories (e.g., between CG4.1 and 4.2 on inventory purpose CSS 152B) only affect the categorized side of the CSS (not the common representation side) since they are not related to automatic alignment.

While FIG. 15A shows a CS with a subset, a hierarchy, and two segmentations, these are independent features and different embodiments may support none, one, two or all these features.

Some embodiments support the following relationships: 1) a categorization scheme includes a set of categories that provide an initial dimension; 2) a segmentation includes multiple segments, and adds an additional dimension to a categorization scheme; 3) the categories of a categorization scheme are used to group/differentiate impacts based on specific criteria in the events; 4) the segments of a segmentation are used to group/differentiate impacts based on properties related to the impacts (thus, segment selection is impact specific, but category selection need not be impact specific; 5) there can be multiple segmentations on a single categorization scheme; and 6) a given segmentation may be applied to different categorization schemes.

FIG. 15B

FIG. 15B is a block diagram illustrating additional relationships between CSSs, including hierarchy and segmentation, according to some embodiments. FIG. 15B is like FIG. 13C, with the differences including: 1) that the table, in addition to the orthogonal categories type, includes a hierarchy type and a segmentation type; 2) the hierarchy type has a single row, while the segmentation type has 2 rows.

The hierarchy row has Hierarchy1, CS1, dimension1 under the columns type, CS, and Dimension. Since a hierarchy adds other levels of categories, but does not add a dimension, the row has higher level categories/CF1 categories in column Categories of Dimension. The purpose for Hierarchy1 is to track and manage the inventory (aspect1) by higher level categories in addition to the leaf categories. Relative to extending application 1, the higher-level categorization could be by region, the higher-level categories may represent different regions including different sets of the CG1 categories, and the purpose may be to track and manage the inventory by regions in addition to the locations within those regions.

The first segmentation row has segementation1 and CS1 under the columns type and CS. Since a segmentation adds a dimension, the row has dimension1/dimension4 and CG1 categories/CG4 categories under the columns Dimension and Categories of Dimension. The purpose for Segementation1 is to track and manage the inventory (aspect1) by dimension1, as differentiated by dimension4. Relative to extending application 1, dimension4 could reflect status of availability, the CG4 categories may represent different statues of availability of items (e.g., in transit, in stock), and the purpose may be to track and manage the inventory by location even when it is not yet under the control of the organization (e.g., in transit to a location).

The second segmentation row has segementation2 and CS2 under the columns type and CS. Again, since a segmentation adds a dimension, the row has dimension2/dimension5 and CG2 categories/CG5 categories under the columns Dimension and Categories of Dimension. The purpose for Segementation2 is to track and manage the aspect 2 by dimension2, as differentiated by dimension5. Relative to extending application 1, dimension5 could reflect status of availability of items by divisions in the organization, the CG5 categories may represent different statues of availability of items for use by divisions in the organization (e.g., reserved, available), and the purpose may be to track and manage the performance for inflow and outflow of items by division (e.g., business unit) and to allow/prevent different divisions from using items for a certain period.

FIG. 15C

FIG. 15C is a block diagram illustrating an additional example event in the log and the additional example entries generated based on the additional example event according to some embodiments of the invention. FIG. 15C illustrates an example in which the segmentation scheme labeled "Segmentation2" was added after event 810G, and as a result the segments are being backfilled as opposed to having been present and part of entries 814 starting with entry 814A. While the example shows backfilling, embodiments also support segmentation having been present from the start.

FIG. 15C is like FIG. 8B, with the differences including: 1) the addition of event 810H to log 104, where event 810H includes impact 810H.1 through impact 810H.5; 2) representing entries 812 with a vertical " . . . ;" and 3) the addition of entry 814H.1 through entry 814H.5 to entries 814. Impact 810H.1 through impact 810H.4 and entry 814H.1 through entry 814H.4 have 8, 8, and 1 under item ID 176, event ID 172, and timestamp 174, while impact 810H.5 and entry 814H.5 have 8, 8, and 2. These impacts and entries respectively have 60, 50, 40, 30, and 60 under quantity 178, while these impacts have +, −, −, +, and + under sign 179. Thus, entry 814H.1 is moving quantity 60 to CG2.2/CG4.1 under FFFE 184 from CF2.2 under SFSE 186; entry 814H.2 is moving quantity 50 from CG2.3 under FFFE 184 to CG2.2/CG4.1 under SFSE 186; entry 814H.3 is moving quantity 40 from CG2.3 under FFFE 184 to CG2.2/CG4.2 under SFSE 186; and entry 814H.4 and entry 814H.5 are respectively moving quantity 30 and 60 to Default/CG4.1 under FFFE 184 from Default under SFSE 186.

FIG. 15D

Figure 15D:
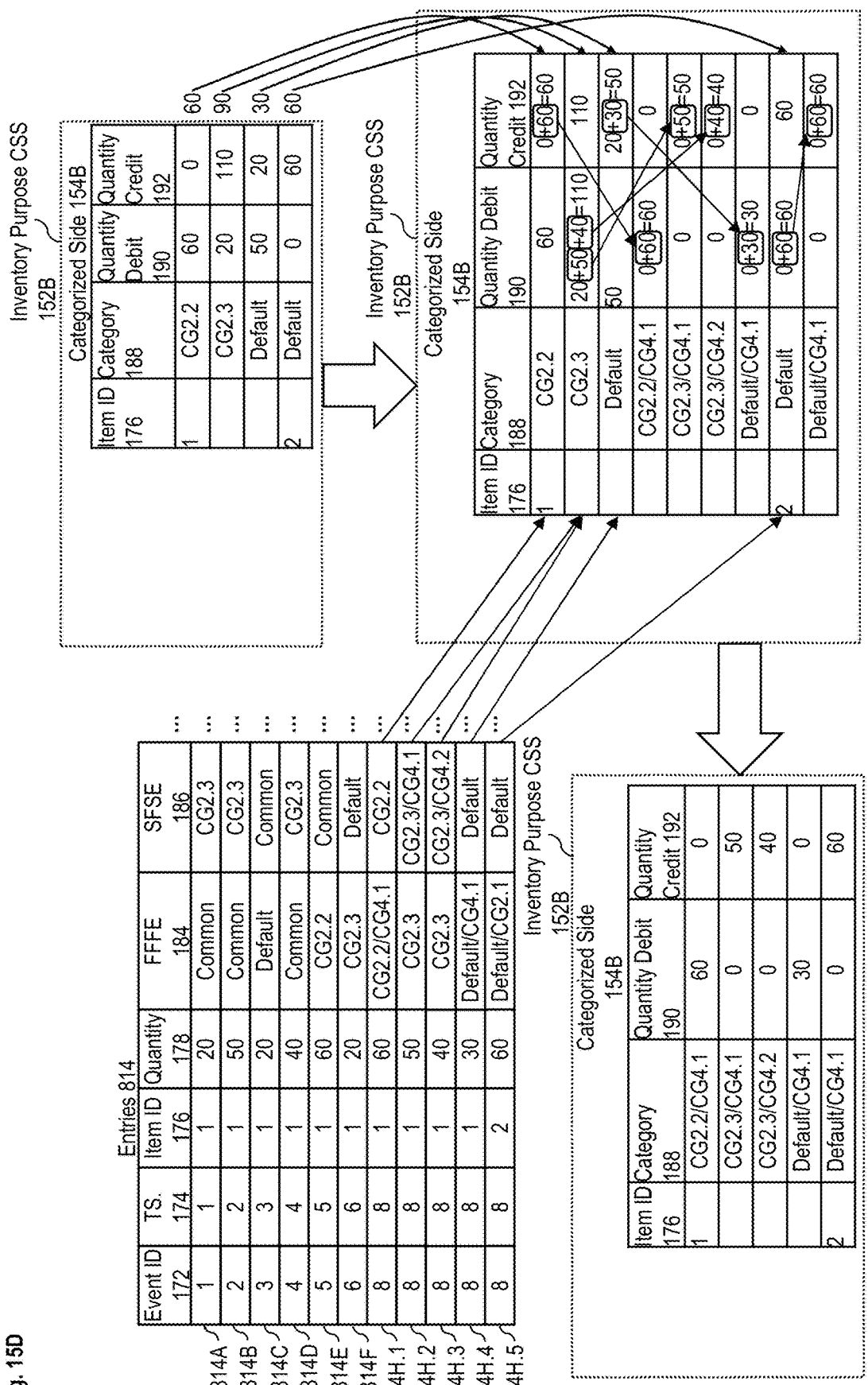
FIG. 15D is a block diagram illustrating the updating of an inventory purpose CSS based on the additional example entries according to some embodiments of the invention.

FIG. 15D is a block diagram illustrating the updating of an inventory purpose CSS based on the additional example entries according to some embodiments of the invention. FIG. 15D shows the pre-segmentation state: 1) which is shown in a first version of categorized side 154B of inventory purpose CSS 152B following event 814G.2 (e.g., see the same in FIGS. 12C and 12D); and 2) entry 814A through entry 814F which generated this starting state (recall, entry 814G does not impact inventory purpose CSS 152B).

FIG. 15D also shows entry 814H.1 through entry 814H.5, as well as a representation of the total quantities (60, 90, 30, and 60) being moved from the pre-segmentation categories (CF2.2, CG2.3, and default for item 1, and default for item 2). There are only 4 quantities shown in this representation even though there are 5 entries. This is due to entry 814H.2 and entry 814H.3 respectively moving quantities of 50 and 40 out of the same pre-segmentation category CF2.3 (thus, total movement is a quantity of 90 from the pre-segmentation category CF2.3).

In addition, FIG. 15D shows: 1) a second version of categorized side 154B of inventory purpose CSS 152B reflecting how the state in the first version is modified responsive to the entry 814H.1 through entry 815H.2; and 2) a third version of categorized side 154B that only includes the post-segmentation running balances.

The second version shows arithmetic operations performed on the state under quantity debit 190 or quantity credit 192 for the pre-segmentation categories, as well as equal operations performed under the opposite one of quantity debit 190 and quantity credit 192 for the post-segmentation categories. For example, since the first version of categorized side 154B has pre-segmentation category CG2.2 with 60 and 0 under quantity debit 190 and quantity credit 192, and since entry 814H.1 is moving quantity 60 to CG2.2/CG4.1 under FFFE 184 from CG2.2 under SFSE 186, the second version of categorized side 154B shows: 1) pre-segmentation category CG2.2 respectively with 60 and 0+60=60 under quantity debit 190 and quantity credit 192, which zeros out that running balance; 2) post-segmentation category CG2.2/CG4.1 respectively with 0+60=60 and 0 under quantity debit 190 and quantity credit 192; and 3) as between pre-segmentation category CG2.2 post-segmentation category CG2.2/CG4.1, the 0+60=60 is the equal but on the opposite ones of quantity debit 190 and quantity credit 192.

In some embodiments, the quantities moved from a category before segmentation to a category/segment after segmentation will result in the record in the CSS for the former having a running total of zero (credit-debit=0). For instance, the movement from CG2.2 to CG2.2/CG4.1 involves: 1) the record (referred to as the first record) for the quantity debit 60 of item 1 categorized as CG2.2 being updated to quantity debit 60 and quantity credit 60, making the total zero (60−60=0); and 2) the creation of a second record for category CG2.2/CG4.1 for item 1 with quantity debit 60. In this case, the first record will be kept for a period of time, and then archived.

Also, since the first version of categorized side 154B has pre-segmentation category CG2.3 with a running balance of 90 (20 and 110 under quantity debit 190 and quantity credit 192), and since entry 814H.2 and entry 814H.3 are respectively moving quantities 50 and 40 from CG2.3 respectively to CG2.3/CG4.1 and CG2.3/CG4.1, the running balance of 90 in pre-segmentation category CG2.3 is split/segmented into running balances of 50 and 40 respectively in post-segmentation categories/segments CG2.3/CG4.1 and CG2.3/CG4.1. With reference to application 1, this would reflect that relative to the division CG2.3 within the organization, there are 50 of item ID 1 with a first status (e.g., reserved) and 40 with a second status (e.g., available).

FIG. 15E

Figure 15E:
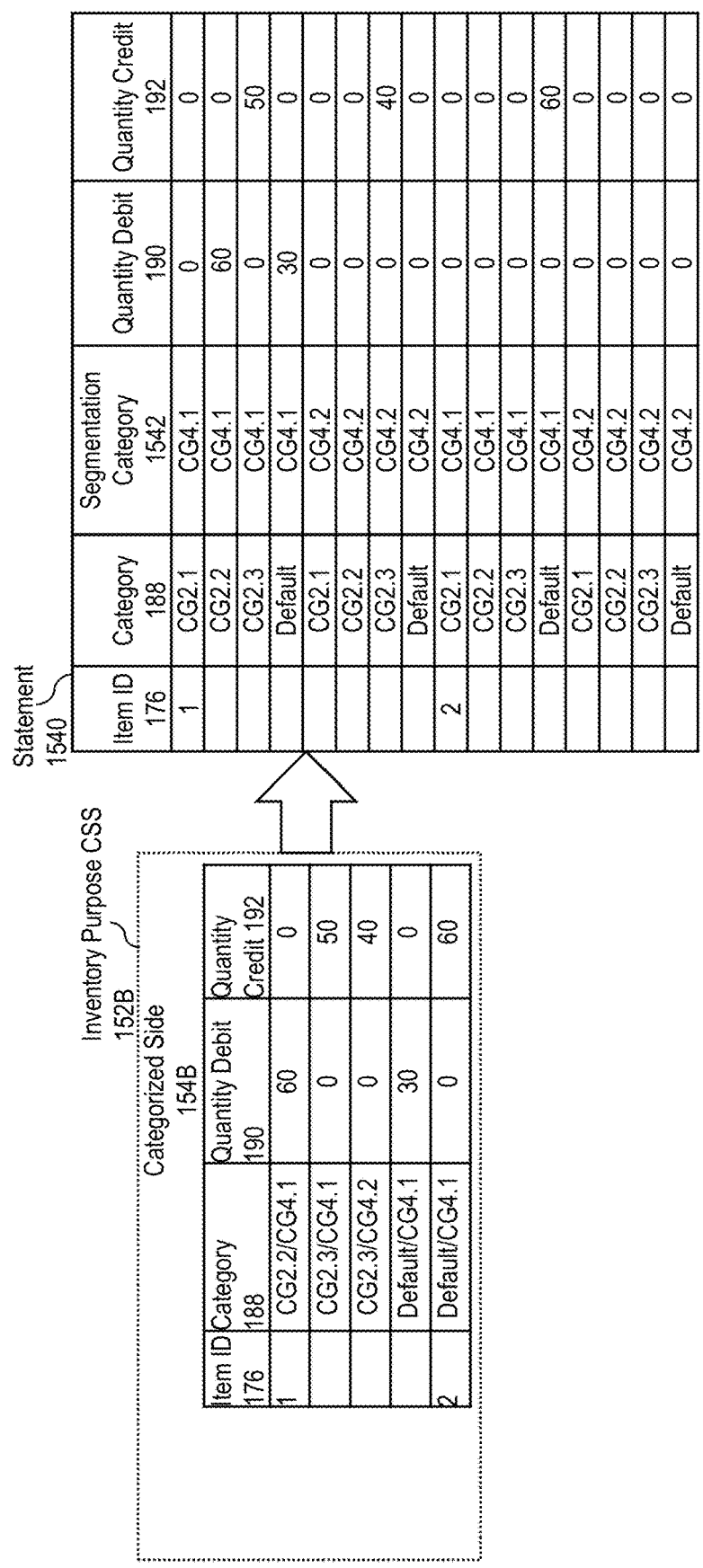
FIG. 15E is a block diagram illustrating a statement generated based on the segmentation added to the inventory purpose CSS according to some embodiments of the invention.

FIG. 15E is a block diagram illustrating a statement generated based on the segmentation added to the inventory purpose CSS according to some embodiments of the invention. FIG. 15E shows: 1) the third version of categorized side 154B that only includes the post-segmentation running balances; and 2) an exemplary statement format 1540 generated based on that third version. The pre-segmentation version of categorized side 154B was two dimensional. Since the categories of a given CS provide a first dimension, since each segmentation scheme adds a dimension, the exemplary statement format 1540 represents three-dimensional data with a two-dimensional representation. In particular, the schema of the exemplary statement format 1540 is item ID 176, category 188, segmentation category 1542, quantity debit 190, and quantity credit 192.

Example 2

FIG. 16A

FIG. 16A is a block diagram illustrating a second example of configuration information including a hierarchy and a segmentation scheme according to some embodiments of the invention. FIG. 16A is like FIG. 15A, with the differences including: 1) has only CG4 in segmentation scheme(s) definition 136 (CG5 is not present); and 2) mappings definition 134 indicates that the segmentation applies to both CS1 and CS2. Thus, FIG. 16A provides an example of the same segmentation scheme being applied to two different categorization schemes.

FIG. 16B

FIG. 16B is a block diagram illustrating a second example of relationships between CSSs, including the third CSS, according to some embodiments of the invention. FIG. 16B continues example 2. FIG. 16B is like FIG. 15B, with the differences including: 1) no row for Segmentation2; 2) additional data in the row for Segmentation1; 2) and a different example application (example application 2) in the last column. Since segmentation1 applies to two categorization schemes, the data in this row includes: 1) the same data from the corresponding row in FIG. 15B for CS1; and 2) additional data describing segemenation1 relative to CS2. The additional data has "and CS2," "and Dimension2/Dimension 4," "and CG2 Categories/CG4 Categories," and "and track and manage aspect2 by Dimension2, as differentiated by dimension4" in the columns CS, Dimension, Categories of Dimension, and Purpose.

The column example application 2 is to a trading example that may apply to a capital markets institution (e.g., bank, credit union, etc.). In this context, accounting terminology is used. In accounting terminology, an item is like a contract, an item ID is a identifier of that contract (e.g., a currency, a ticker symbol, etc.), the different orthogonal category schemes are like a chart of accounts (also known as a list of accounts), the different categories are like accounts, a CSS is like a ledger, the statements are financial statements (e.g., using XBRL (eXtensible Business Reporting Language)), the categorization rules (in embodiments that support them) are like account rules, an event is a financial event (sometimes called a transaction), and the entries are double leg entries (also referred to as double legged entries). While in some embodiments the entries are not treated like a journal (but the entries can be provided to system(s) outside of the inventory management system 100 for those system(s) to make a journal(s) out of them, likely adding additional information, to integrate into the system(s)), in other embodiments the management system can include logic to create, based on the entries, journals to be provided to such systems.

Using this terminology, the column example application 2 has the following: 1) for CS1, dimension1 is accounts, the CG1 categories represent different accounts, and the purpose is to track and manage the inventory by the accounts; 2) for CS2, dimension2 is trading desk, the CG2 categories represent different trading desks, and the purpose is to track and manage the inflow/outflow performance of items by the trading desk; 3) for CS3, dimension3 is market, the CG3 categories may represent different markets, and the purpose may be to compare markets of the items and create statistics; 4) for hierarch 1, the higher-level categorization could be by custodian, the higher level categories may represent different custodians, and the purpose may be to track and manage inflow/outflow performance by the custodians in addition by the accounts; 5) for segementation1, dimension4 could reflect settlement status, the CG4 categories may represent different settlement statuses (e.g., settled, not settled), and the purpose may be to track and manage (A) the inventory by account as differentiated by settlement status (B) inflow/outflow performance by trading desk, as differentiated by settlement status.

While example application 1 is limited to trading, inventory management system 100 may be used relative to more activities within a capital markets institution. As background, there are various types of actors that perform several types of internal activities within an entity such as a capital markets institution (e.g., bank, credit union, etc.). For instance, the several types of actors within a capital markets institution may include: traders; risk managers; collateral operators (Settlements and Clearing); and accountants. The several types of activities within a capital markets institution may include: trading, determining and managing risk (risk management), operations (e.g., settlements and clearing), accounting, etc. Often, different systems (e.g., trading systems, risk management systems, operations systems, accounting systems, etc.), where each such system is software executed by electronic device(s) and are sometimes referred to as an internal activity system, are used for the different types of activities, and each such system manages different data and/or manages the data differently to provide the views of the capital markets institution's data required to perform that type of activity. In some cases, multiple systems are used for a single type of activity. A capital markets institution, and thus the actors in the capital markets institution, must organize the capital markets institution's data (integrate it and reconcile it) so that data can be communicated externally (to other entities in the market) according to various standards. The integration/consolidation/reconciliation of the data between the different systems is typically done using period reconciliation (e.g., at certain times of the day, extracting and reconciling the data from two or more systems). As a result, significant effort is currently required to integrate/consolidate/reconcile the data between the different systems. While there are various ways to integrate/consolidate/reconciliate data between the different systems (e.g., various extraction, transformation & load solutions and/or reconciliation procedures), the data is often not synced in real time (e.g., per above, the data from two or more systems may be extracted and reconciled periodically—that is, at only certain times of the day). As a result, when trading, a trader does not know how much cash is really available because that is only up to date in the operations system. Also, every new integration (e.g., a new report to an external regulatory entity and/or reconciliation of data internally for use by internal systems or regulatory entity) requires a custom effort.

In contrast, in some embodiments that apply the inventory management system 100: 1) the internal activity systems: a) generate events for the inventory management system 100; and b) receive statements from the inventory management system 100; 2) the inventory management system 100: a) processes the events sent by the internal activity systems; and b) generates statements for the internal activity systems. The events represent decisions made in the internal activity systems (e.g., according to business logic implemented in those internal activity systems). In other words, responsive to a decision made using an internal activity system, that decision is sent as an event for processing by the inventory management system 100, which includes automatic mismatch, may include automatic alignment, may include confirmations, may include notifications, etc. In some embodiments, the data managed by the inventory management system 100 (and thus, that may be included on the statements) represents the information used for making decisions on the positions on the inventory managed by the management systems. As described, segmentation may be included in this data. One or more of the internal activity systems may be used to enrich the data on a statement received from the inventory management system 100. Enrichment refers to adding/combining the data on the statement with additional data (e.g., related to the item(s)) that is not managed by the inventory management system 100 (e.g., is not used for making decisions on the positions on the inventory managed by the inventory management system 100). In some embodiments, the statements reflect the quantities of items as positive or negative numbers (sometimes referred to as the total, sum, position, running balance, or balance); that is, the quantity debit and quantity credit are combined/converted into a single positive or negative number. In some such embodiments, the manner of determining the sign depends on the CSS: 1) for the inventory hub CSS, the sign is positive when the quantity debit>quantity credit; and 2) for an inventory purpose CSS, the sign is positive when the quantity credit>quantity debit. In some embodiments, use of the inventory management system 100 allows the internal activity systems to focus on how to integrate into the data model provided by the inventory management system 100, rather than focus on how to integrate with the other internal activity systems. As a result, the following can be avoided: 1) the significant effort currently required to set up the integration/consolidation/reconciliation of the data between the different internal activity systems; and 2) the existing error prone and time intensive procedures to perform the periodic reconciliations of the internal activity systems. It also reduces the level of effort to generate a new report to an external regulatory entity because the data may be structured in the manner required for the external reporting; in some embodiments, this does not include how to communicate this data, but includes the needed content in a structured way required for the external reporting. Then, if a regulatory entity says something needs to be changed regarding the data or the structured way, then this can be changed at the inventory management system 100 rather than one or more of the internal activity systems. As described above, the inventory management system 100 allows for the syncing of data between the internal activity systems in real time or near real time; as a result, when trading, a trader will know (or at least have a much more accurate number) of how much cash is available. Further, as described above, the inventory management system 100 can move forward, even if the provided events have incomplete, erroneous, and/or unexpected information. Assuming the third user determines the category and submits event 810F, the result of the effort to perform the categorization is evident in real time or near real time. This is a benefit over systems that rely on periodic reconciliation because such systems would need to perform the reconciliation process again after submitting the categorization to ensure that the issue was fixed.

Additional Details Regarding Converting Events to Entries

As previously described, in some embodiments the determination as to what categories to assign to the entries depends on processes external to the inventory management system 100. These processes may, at least partially, be based on the organization's internal business processes (also referred to as business logic). As mentioned above, while these assignments may be explicitly provided in the event, these assignments may additionally or alternatively be entered in the management system programmatically (e.g., as categorization rules). For a given transaction involving a given item ID and a given CSS, a given category may be determined based on the content of the event where the event includes sufficient information (e.g., the event may explicitly include the category, or includes characteristic(s) from which the inventory management system 100 can determine the category). In this case, the categorization is performed by the inventory management system 100 when processing that event. Additionally, the categorization may be performed in a sequence of events; such as: 1) an initial event, which lacks sufficient information (e.g., explicitly includes a "default" category, or lacks characteristic(s) from which the inventory management system 100 can determine the category) to generate the needed entry, results in the generation of a temporary substitute entry is generated that identifies a default category; and 2) a subsequent event provides the category (e.g., explicitly includes the category, or includes the missing characteristic(s) from which the management system can now determine the category). Regardless, the inventory management system 100 may employ a standardization of event format in which systems separate from inventory management system 100 can use to submit events.

FIG. 17

Figure 17:
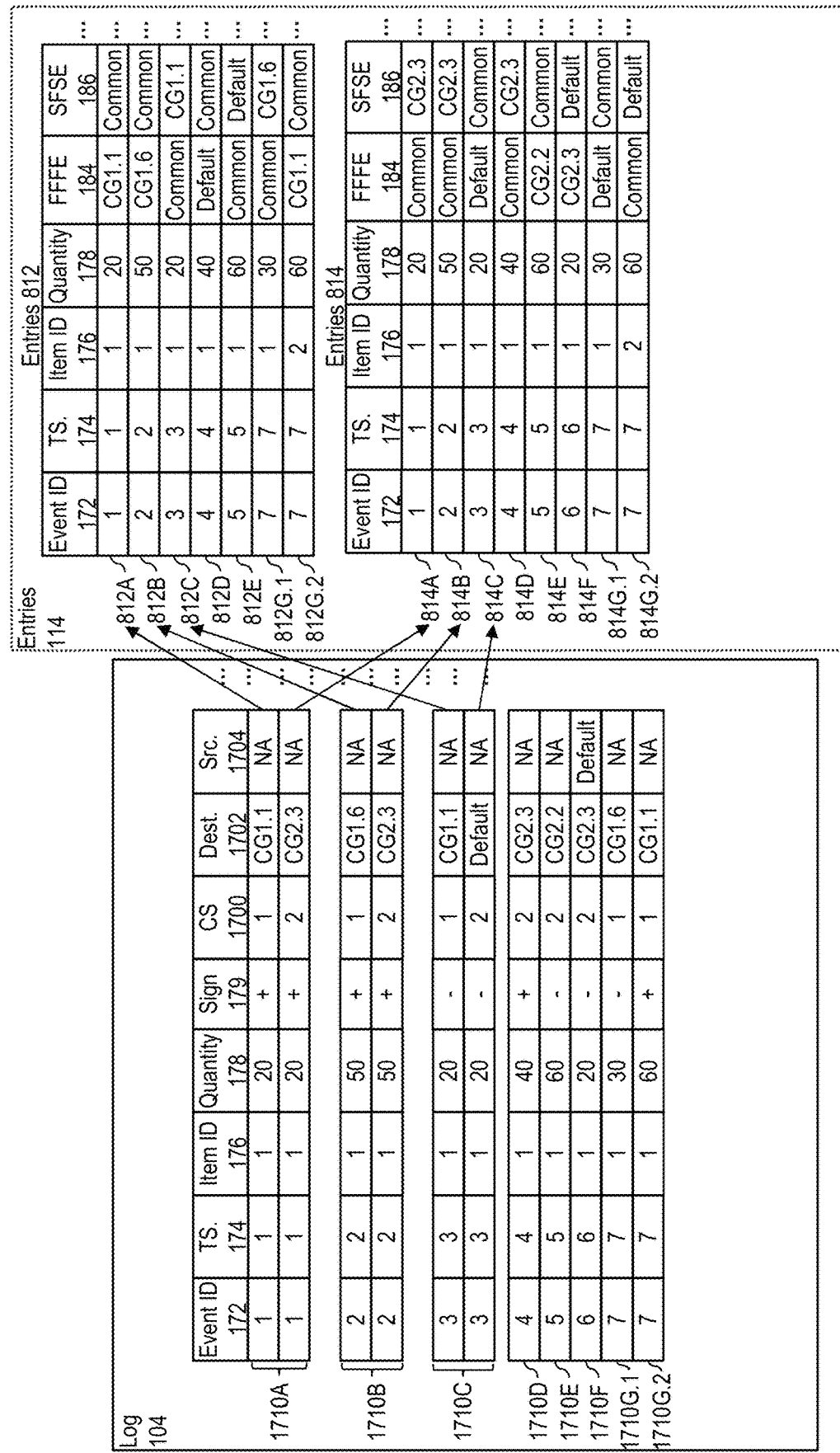
FIG. 17 is a block diagram illustrating a first manner of converting the same example events into entries according to some embodiments of the invention.

FIG. 17 is a block diagram illustrating a first manner of converting the same example events into entries according to some embodiments of the invention. FIG. 17 provides an example of the above-mentioned manner in which category assignments are explicitly provided in the content of the events.

FIG. 17 includes log 104 from FIG. 8B, but: 1) event 810A through event 810G are respectively replaced with event 1710A through event 1710G; 2) event 1710A, event 1710B, and event 1710C each have two rows, while the rest of the events have one row; 3) the column set of one or more characteristics 180 is replaced with CS 1700, Destination 1702, and Source 1704.

While event 1710G was split into two rows in the log because event 1710G include two impacts (impact 1710G.1 and impact 17G.2) as described earlier, event 1710A, event 1710B, and event 1710C using two rows is done as part of the exemplary first manner of converting the same example events into entries. Also, while event 1710A, event 1710B, and event 1710C are each shown using two rows, much of the content is duplicated in the two rows. While in some embodiments event 1710A, event 1710B, and event 1710C are received by inventory management system 100 with the duplicated data as shown, in alternative embodiments techniques are used to reduce the amount of data needed to be sent the information to the inventory management system 100 (e.g., send the data that is common between the two rows only once, and send the data that is not duplicated in the two rows, etc.) Regardless of how the data is received, in some embodiments techniques to reduce the amount of data to store the duplicated information are used (e.g., store the data that is common between the two rows in one row, and store the non-duplicate data in linked structures, etc.).

In FIG. 17, one of the two rows (the top one) of each of event 1710A, event 1710B, and event 1710C is to update CS1, while the other (the bottom one) is to update CS2. This is reflected under column CS 1700. Column Destination 1702 includes the category to be used relative to the identified CS. If the event/impact is an exchange event/impact then column source 1704 will indicate not applicable (or some other identifier to indicate a source is not provided) or, depending on how the data is stored, the location to store will not be present. In contrast, if the event/impact is a transfer event/impact then column source 1704 will indicate the source category for the transfer.

Each of event 1710A, event 1710B, and event 1710C are exchange events, and thus each have a category under column Destination 1702 and NA under column Source 1704. For example, for event 1710A, the two rows respectively have CG1.1 and CG2.3 in column Destination 1702 and are used to respectively generate entry 812A and entry 814A. Event 1710B is similar. Event 1710C is different in that the second row has "Default" under the column Destination 1702. This reflects that the inventory management system 100 received this data as part of the event, and thus the content of the event is sufficient for event-based entries generator 112 to generate the complete set of entries. This contrasts with, for example, event 1710D for which there is only one row in log 104, as previously described is an exchange type event requiring an entry for each CS, and from the content of the event as received is insufficient for event-based entries generator 112 to generate the complete set of entries. Specifically, the row for event 1710D includes the category for CS2 but not CS1, and thus the event-based entries generator 112 will generate a set of entries (including entry 814B), mismatch checker 116 will detect that the set does not include an entry for CS2, and automatic alignment entries generator 122 will be triggered to generate entry 812D (as previously describes, an automatically generated temporary substitute entry that uses the default category). Thus, in some such embodiments, an event received by inventory management system 100 can itself include one or more temporary substitute entries (e.g., see event 1710C) that will not need to be generated by automatic alignment entries generator 122. While some embodiments support receipt of an event that itself includes one or more temporary substitute entries, alternative embodiments may not.

In some embodiments in which a separate system sends an event like event 1710A to inventory management system 100, the event would include the data necessary to generate event 1710A in log 104. Additionally or alternatively, in some embodiments different parts of the data necessary to generate event 1710A in log 104 are sent by different systems that are separate from inventory management system 100 (e.g., some or all of the data on the first row of event 1710A is sent from a first system and the remainder of the data for event 1710A is sent from a second system, and inventory management system 100 matches and combines the sent data to generate event 1710A).

FIG. 18

Figure 18:
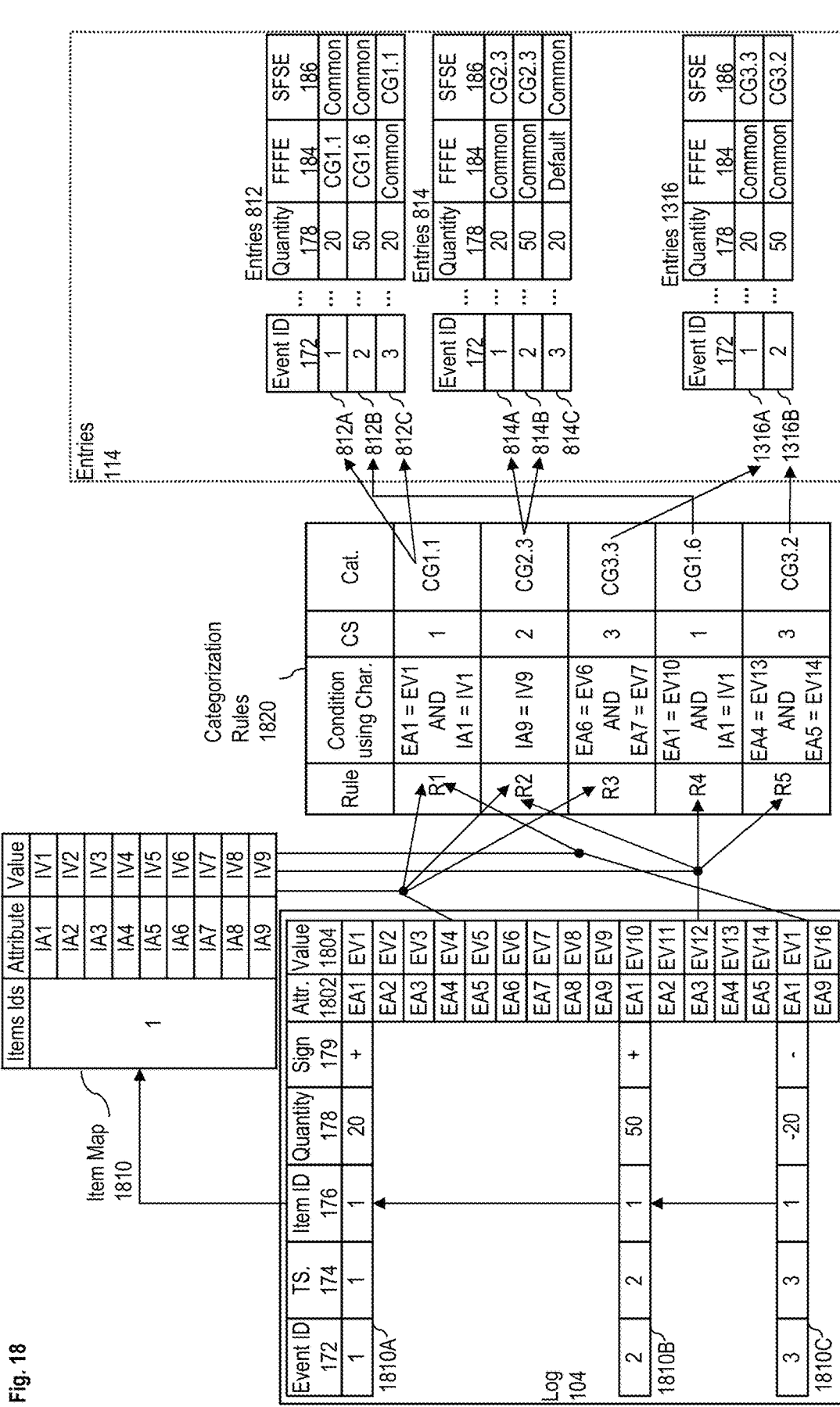
FIG. 18 is a block diagram illustrating a second manner of converting some of the same example events into some of the entries according to some embodiments of the invention.

FIG. 18 is a block diagram illustrating a second manner of converting some of the same example events into some of the entries according to some embodiments of the invention. As previously described, some embodiments use categorization rules. Categorization rules identify which CSSs; and for each CSS, generates one entry (or in embodiments that support multiple entries per impact, a set of one or more entries). Thus, each classification rule generates one entry (with at least two parts) that will affect one CSS. The categorization rules may be used to bring together, in a CSS, collections of impacts from events that the organization wishes to analyze. The categorization rules rely on the CSSs and impose consistency between the CSSs.

FIG. 18 shows entries 114 including entry 812A to entry 812C, entry 814A to entry 814C, and entry 1316A to entry 1316B. FIG. 18 includes log 104, but: 1) with event 1810A, event 1810B, and event 1810C respectively replacing event 810A, event 810B, and event 810C, but having the same data under column event ID 172 to column sign 179; 2) without any other of the events; 3) with columns attributes 1802 and value 1804 replacing the column set of one or more characteristics 180; and 4) with each event having one or more attribute/value pairs (e.g., EA1/EV1, EA2/EV2, EA1/EV10, etc.) under columns attribute 1802 and value 1804. Also, FIG. 18 shows an item map 1810 to translate item IDs into attribute/value pairs.

In addition, FIG. 18 shows categorization rules 1820 being used to convert events to entries based on the attribute/value pairs in the events and/or from the item map 1810. With reference to event 1810A, the 1 under item ID 176 is used to perform a look up in item map 1810 to output the attribute/value pairs IA1/IV1 to IA9/IV9, and these along with EA1/EV1 to EA9/EV9 under the columns attribute 1802 and value 1804 are applied to the categorization rules 1820. Upon applying these attribute/value pairs to the categorization rules 1820, the following occurs: 1) for CS1, the best match for the attribute/value pairs is rule 1 (R1) that has as its condition EA1=EV1 and IA1=IV1, and thus category CG1.1 is identified for CS1; 2) for CS2, the best match for these attribute/value pairs is rule 2 (R2) that has as its condition IA9=IV9, and thus category CG2.3 is identified for CS2; and 3) for CS3, the best match for these attribute/value pairs is rule 2 (R2) that has as its condition IA9=IV9, and thus category CG2.3 is identified for CS3. Based on this and event 1810A, entry 812A, entry 814A, and entry 1316A are generated.

With reference to event 1810B, the 1 under item ID 176 is used to perform a look up in item map 1810 to output the attribute/value pairs IA1/IV1 to IA9/IV9, and these along with EA1/EV10 to EA5/EV14 under the columns attribute 1802 and value 1804 are applied to the categorization rules 1820. Upon applying these attribute/value pairs to the categorization rules 1820, the following occurs: 1) for CS1, the best match for the attribute/value pairs is rule 4 (R4) that has as its condition EA1=EV10 and IA1=IV1, and thus category CG1.6 is identified for CS1; 2) for CS2, the best match for these attribute/value pairs is rule 2 (R2) that has as its condition IA9=IV9, and thus category CG2.3 is identified for CS2; and 3) for CS3, the best match for these attribute/value pairs is rule 5 (R5) that has as its condition EA4=EV13 and EA5=EV14, and thus category CG3.2 is identified for CS3. Based on this and event 1810A, entry 812A, entry 814A, and entry 1316A are generated. Based on this and event 1810B, entry 812B, entry 814B, and entry 1316B are generated.

With reference to event 1810C, the 1 under item ID 176 is used to perform a look up in item map 1810 to output the attribute/value pairs IA1/IV1 to IA9/IV9, and these along with EA1/EV1 and EA9/EV16 under the columns attribute 1802 and value 1804 are applied to the categorization rules 1820. Upon applying these attribute/value pairs to the categorization rules 1820, the following occurs: 1) for CS1, the best match for the attribute/value pairs is rule 1 (R1) that has as its condition EA1=EV1 and IA1=IV1, and thus category CG1.1 is identified for CS1; 2) for CS2, there is no match; and 3) for CS3, there is no match. As previously described, event 1810C will trigger a mismatch for CS2 but not CS2.

As a result of the mismatch, entry 814C will be generated as previously described. Based on this and event 1810C, entry 812C and entry 814C are generated.

While in some embodiments the data applied to the classification rules includes the attribute/value pairs from the events and item map 1810, other embodiments may additionally or alternatively apply data directly from the event (e.g., the item ID in addition the attribute/value pairs from item map 1810; the item ID in embodiments that do not support an item map; etc.). Also, while FIG. 18 shows an embodiment in which there is an item map 1810, other embodiments may additionally or alternatively use similar mapping tables that are based on other data in an event.

While FIG. 18 shows events with a set of one or more attribute/pairs as the set of characteristics 180, in other embodiments the set of characteristics includes one or more types including: 1) a set of one or more event characteristics; 2) a set of one or more impact characteristics; and 3) a set of one or more item characteristics, of which the item ID may or may not be considered one. In yet other embodiments, events may include a set of one or more event characteristics, a set of one or more item IDs, and a set of one or more impact characteristics; and the set of item IDs are translated using the item maps 1810 into a set of one or more item characteristics; and the resulting sets of event characteristics, impact characteristics, and item characteristics are applied to the categorization rules.

In some embodiments that support multiple impacts per event, impact characteristics may be used to provide different characteristics for different impacts on the same item ID(s). For example, the impact characteristics may distinguish between a categorization rule for incoming inventory and one for outgoing inventory. Further, some embodiments support having one or more impacts per item ID in a given event (in which case, each impact will have its own set of one or more impact characteristics to distinguish how to treat a given impact on the item ID from another impact on that item ID).

In some embodiments with event characteristics, an event taxonomy is defined based on events expected to be received from across the entire entity (standardized). In some embodiments, the event taxonomy is used to identify what happened to the item ID(s) and/or to segregate where an item is in a lifecycle. In some embodiments in which inventory management system 100 is receiving events from multiple other systems, the event characteristics operate as a way for the various systems to communicate with the inventory management system 100. In some embodiments that support multiple impacts per event, the event characteristics are used (at least in part) to express why the multiple impacts are grouped together in the event (e.g., because all the impacts relate to the same transaction. In some embodiments with item characteristics, an item taxonomy is defined. While the event taxonomy is typically at a high level, the item taxonomy tends to be more specific. In some embodiments, the event taxonomy has an implicit relationship with the item taxonomy.

In some embodiments that support event and item characteristics, the: 1) event characteristics are often used to select the categorization rules to use or a subset to analyze; 2) the item characteristics from the contract map are often used for selecting the categorization rules that identify the same CS; and 3) the impact characteristics from the contract map are often used for selecting between the categorization rules that identify the same CS. Additionally or alternatively, event characteristics are often used to group impacts related to the same transaction, item characteristics (generated by the item map based on the item IDs) are often used to factorize (reduce the number of categorization rules), and impact characteristics are often used to segregate (that is, distinguish between categorization rules).

Examples of categorization engines that can apply categorization rules 1820 include DROOLS (business rule management engine); Decisimo; Hyperon; etc. In some embodiments, that include event characteristics, item characteristics, an item map, and impact characteristics, the categorization engine operates as follows: 1) filters on the event characteristics to form a first set of the categorization rules that include (a) all rules with matching event characteristics and no other rules or (b) all rules that do not have an event characteristics; 2) filter on the item characteristic(s) of the set of items in the event to form a first subset of the first set of categorization rules with (a) all rules with matching item characteristics and no other rules or (b) all rules that do not have any event characteristics; and 3) find the best matching rule in the subset based upon the impact characteristics. In some embodiments, each event often has two event characteristics, but use only one to filter the categorization rules to form the first set. In some embodiments, each event will often have one impact characteristic per impact, and that impact characteristics will match a single one of the categorization rules in the first subset. However, some such embodiments support a mechanism to handle impacts that match more than one rule (e.g., priorities assigned to the rules so that one can be selected; apply them all and generate all the corresponding entries; etc.).

While some embodiments support using one, more than one, or all three types of characteristics, other embodiments support using less. For instance, some embodiments use just the item ID and the item map 1810. As another example, embodiments may use classification rules with conditions based on just item ID, and just apply the item ID for each event/impact to the classification rules.

In embodiments with an item map, the lookup may be based on all or only some of the item ID. In some embodiments with an item map, the item map will have multiple item IDs that map to the same set of item characteristics (e.g., by basing the lookup into the item map using less than all of the item IDs—such as a high order bits in a binary representation), and it is the sets of item characteristics from the item map used in selecting categorization rules (rather than separate rules by item ID). In which case, the item map 1810 is used to factorize, and thus reduce the number of categorization rules required (which reduces the effort to generate and maintain the categorization rules). Similarly, the item characteristics can make queries easier because the queries can be based on item characteristics rather than by each individual item ID.

Further, in embodiments that implement categorization rules and inventory purpose subset(s), the inventory purpose subset(s) can operate: 1) as an optimization in that they avoid the generation of alignment entries and/or application of categorization rules (in embodiments that implement them) that pertain to any inventory purpose CSs for which an entry need not be generated; and 2) reduce the chance of categorization rules (in embodiments that implement them) being triggered that should not be (per above, embodiments can skip any categorization rules that pertain any inventory purpose CSs for which an entry need not be generated).

The inventory management system 100 may employ a standardized event format in which systems that are separate from inventory management system 100 can use to submit events. A standardized event format makes the generation of the categorization rules easier.

In some embodiments, when a new categorization rule is entered or an existing categorization rule edited, the categorization rule is checked against the configuration 130 to confirm that the category identified by the categorization rule is part of the CS identified by the categorization rule.

In some embodiments, the categorization rules are a way to automate the categorization process so that categories for most, if not all entries, can be determined in real or near real time.

Example Electronic Devices and Environments

Electronic Device and Machine-Readable Media

One or more parts of the above embodiments may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all the instructions in that program.

An electronic device (also referred to as a device, computing device, computer, machine, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer electronic devices for other users, and thus an administrator often works directly and/or indirectly with server devices and client devices.

FIG. 19A

Figure 19A:
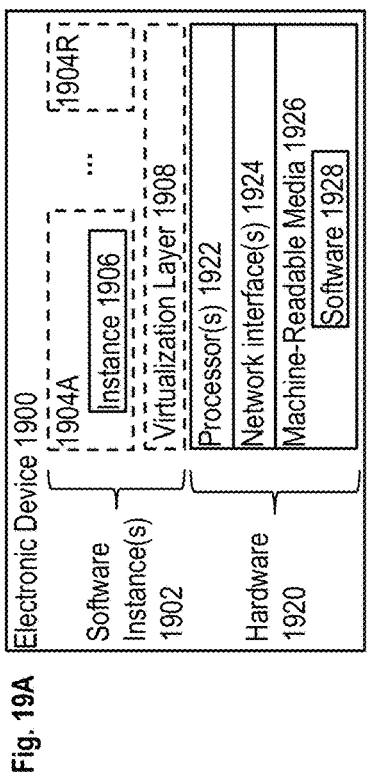
FIG. 19A is a block diagram illustrating an electronic device 1900 according to some example embodiments.

FIG. 19A is a block diagram illustrating an electronic device 1900 according to some example embodiments. FIG. 19A includes hardware 1920 comprising a set of one or more processor(s) 1922, a set of one or more network interfaces 1924 (wireless and/or wired), and machine-readable media 1926 having stored therein software 1928 (which includes instructions executable by the set of one or more processor(s) 1922). The machine-readable media 1926 may include non-transitory and/or transitory machine-readable media. Each of the previously described embodiments may be implemented in one or more electronic devices like electronic device 1900.

During operation, an instance of the software 1928 (illustrated as instance 1906 and referred to as a software instance; and in the more specific case of an application, as an application instance) is executed. In electronic devices that use compute virtualization, the set of one or more processor(s) 1922 typically execute software to instantiate a virtualization layer 1908 and a set of one or more software containers, shown as software container 1904A to software container 1904R (e.g., with operating system-level virtualization, the virtualization layer 1908 may represent a container engine (such as Docker Engine by Docker, Inc. or rkt in Container Linux by Red Hat, Inc.) running on top of (or integrated into) an operating system, and it allows for the creation of multiple software containers (representing separate user space instances and also called virtualization engines, virtual private servers, or jails) that may each be used to execute a set of one or more applications; with full virtualization, the virtualization layer 1908 represents a hypervisor (sometimes referred to as a virtual machine monitor (VMM)) or a hypervisor executing on top of a host operating system, and the software containers each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1928 is executed within the software container 1904A on the virtualization layer 1908. In electronic devices where compute virtualization is not used, the instance 1906 on top of a host operating system is executed on the "bare metal" electronic device 1900. Instances of the software 1928, as well as the virtualization layer 1908 and the software containers if implemented, are collectively referred to as software instance(s) 1902.

Alternative embodiments of an electronic device may have numerous variations from those described above. For example, customized hardware and/or accelerators might also be used in an electronic device.

Example Deployment Environments

The inventory management system 100 may be deployed several ways and in various environments. For example, inventory management system 100 may be implemented as server software that provides a service to client software that is implemented to be capable of submitting queries/receiving statements and/or submitting events. This server software and client software may be deployed on a single electronic device, or across several in a variety of ways (some exemplary ones of which are described below).

FIG. 19B

Figure 19B:
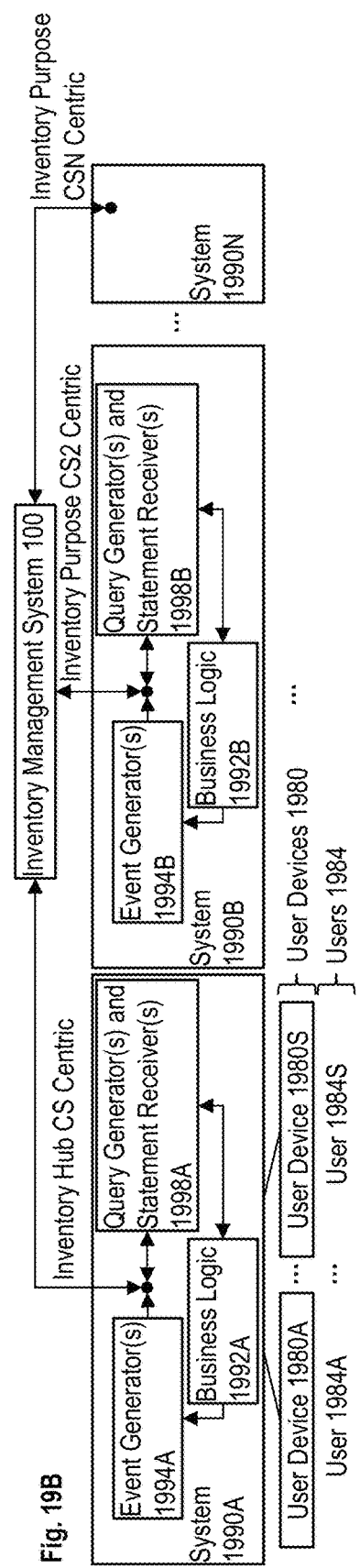
FIG. 19B is a block diagram of a first deployment environment according to some example embodiments.

FIG. 19B is a block diagram of a first deployment environment according to some example embodiments. In FIG. 19B, inventory management system 100 is shown as communicatively coupled to system 1990A through system 1990N.

In addition, FIG. 19B shows a set of user devices 1980 (user device 1980A to user device 1980S) that are communicatively coupled with system 1990A and that are operated by a set of users (user 1984A to user 1984S). Users operating other user devices will be communicatively coupled to the others of system 1990B to system 1990N. Depending on roles and permissions, different relationships of user devices to systems 1990 may be configured, such as: 1) one or more user devices may be communicatively coupled to different ones of the systems 1990 at different times or at the same time; 2) different users using the same user device may cause that user device to be communicatively coupled to different ones of the systems 1990; etc.

In this environment, different embodiments may implement access control and/or permissions relative to inventory management system 100 at one or more different levels, including at the user level, user device level, system 1990 level, and/or the inventory management system level. Further, access control and permissions may be achieved through configuration and/or implementing systems 1990 with different capabilities. With regard to configuration, all systems 1990 may be implemented the same, and the systems 1990 and/or inventory management system 100 configured to apply access control and/or permissions at the user level (thus, the access control and/or permissions limit what a user operating any of user devices 1980 can cause to happen relative to inventory management system 100), the user device level (thus, the access control and/or permissions limit what different ones of the user devices 1980 can cause to happen relative to inventory management system 100), and/or at the system 1990 level (thus, the access control and/or permissions limit what different ones of the systems 1990 can cause to happen relative to inventory management system 100). These access control and/or permissions limits can be implemented differently in different embodiments, such as limiting by CS, by read/write access, and/or by type of interaction with inventory management system 100 (e.g., access to some, all, or none of configuration 130; ability to submit queries and receive statements; and/or ability to submit events). Additionally or alternatively, with regard to implementing systems 1990 with different capabilities, different ones of systems 1990 may: 1) have different business logic (e.g., business logic 1992A may be different from business logic 1992B) designed to operate relative to different categorization systems (e.g., business logic 1992A and business logic 1992B may be respectively designed to operate relative to the inventory hub CS and one of the inventory purpose CSs); and 2) support less than all of the sub-systems (CS configuration sub-system 162, decision sub-system 164, and delayed categorization sub-system 166) of a categorization scheme system 124.

By way of specific example, FIG. 19B illustrates each of system 1990A through system 1990N: 1) being a categorization scheme system 124 (thus, each of these systems is shown to include business logic 1992x, event generator(s) 1994x, and query generator(s) and statement receiver(s) 1998x, where "x" matches the letter of the system (e.g., system 1990A includes business logic 1992A, and so on), and where business logic 1992x, event generator(s) 1994x, and query generator(s) and statement receiver(s) 1998x operate like business logic 138, event generator(s) 103, and query generator(s) and statement receiver(s) 107); and 2) operating relative to a different one of the categorization schemes (e.g., system 1990A is inventory hub CS centric, system 1990B is inventory purpose CS centric (specifically, for CS ID CS2); and so on, such that system 1990N is inventory purpose CS centric (specifically, for CS ID CSn)). As mentioned above, this may be by configuration and/or capability (e.g., different business logic). Further, in this specific example, different users, through configuration at the system 1990 and/or inventory management system 100 level, have different read/write access and/or type of interaction access relative to inventory management system 100 (e.g., user 1984A operating user device 1980A may cause system 1990A to access configuration information, submit queries, receives statements, and submit events relative to CS1 (the inventory hub CS), but not relative to other CSs; user 1984B operating user device 1980B may be limited by user level configuration to causing system 1990B to only read configuration information, submit queries, and receives statements relative to CS1 (the inventory hub CS), but not edit configuration information or sub events relative to CS1 and not do any of the above relative to other CSs; a different user operating a different user device communicatively coupled to system 1990B may cause it to access configuration information, submit queries, receives statements, and submit events relative to CS2 (an inventory purpose CS), but not other CSs; and so on). Of course, a set of one or more users may have a role with permissions and/or access control that allows for greater access.

By way of another specific example, each of system 1990A through system 1990N may be a categorization scheme system 124 capable of operating relative to all the categorization schemes. Further, in this specific example, different users, through configuration at the system 1990 level and/or inventory management system 100 level, have different read/write access and/or type of interaction access relative to inventory management system 100 (e.g., user 1984A operating user device 1980A may cause system 1990A to access configuration information, submit queries, receives statements, and submit events relative to CS1 (the inventory hub CS), but not relative to other CSs; user 1984B operating user device 1980B may be limited by user level configuration to causing system 1990B to only read configuration information, submit queries, and receives statements relative to CS1 (the inventory hub CS), but not edit configuration information or sub events relative to CS1 and not do any of the above relative to other CSs; a different user operating a different user device communicatively coupled to system 1990B may cause it to access configuration information, submit queries, receives statements, and submit events relative to CS2 (an inventory purpose CS), but not other CSs; and so on). Of course, a set of one or more users may have a role with permissions and/or access control that allows for greater access.

Different embodiments may implement inventory management system 100 and systems 1990 on a set of one or more electronic devices (e.g., all on one electronic device, each of a different electronic device, or different combinations thereof). For example, inventory management system 100 and each of systems 1990 may be implemented on a different set of one or more electronic devices, where each is a server device, but where the systems 1990 operate as a server relative to user devices 1980 and as a client relative to inventory management system 100. Further, relative to the organization, these electronic devices may be on premises, in the cloud, or a hybrid (e.g., the electronic device(s)

operating as systems 1990 being on premises and the electronic device(s) operating as inventory management system 100 in the cloud).

As described above, embodiments may implement one of more of systems 1990 with less than all the sub-systems, such as just: 1) CS configuration sub-system 162; 2) decision sub-system 164; 3) delayed categorization sub-system 166; or 4) a combination of two or more of these sub-systems. To provide some examples, in some such alternative embodiments: 1) one or more of these systems is a CS configuration sub-system 162, while others of these systems are each a combination of a decision sub-system 164 and a delayed categorization sub-system 166; 2) some of these systems are each a categorization scheme system 124, while one or more others are each a combination of a decision sub-system 164 and a delayed categorization sub-system 166; and 3) some of these systems are each a categorization scheme system 124, others are each a decision sub-system 164, and others are each a delayed categorization sub-system 166.

The electronic devices use in a deployment like that in FIG. 19B may be communicatively coupled by any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the electronic devices.

Each of the user devices 1980 (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by one of systems 1990. For example, user devices 1980 can be used to access data and applications hosted by systems 1990, and systems 1990 may interact with inventory management system 100 (e.g., to perform searches on stored data, and otherwise allow one or more of users 1984 to interact with various GUI pages that may be presented to the one or more of users 1984). The involved electronic devices (e.g., user devices 1980, those implementing systems 1990 and inventory management system 100) may communicate using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more of the user devices 1980 may include an HTTP client, commonly referred to as a "browser," for sending and receiving HTTP messages to and from systems 1990, thus allowing one or more of the users 1984 to access, process and view information, pages and applications available from systems 1990 over a network.

Each of the user devices 1980 may be like electronic device 1900 (e.g., the software 1928 represents the software to implement clients to interface directly and/or indirectly with the inventory management system 100 (e.g., software 1928 represents a web browser, a native client, a portal, a command-line interface, and/or an application programming interface (API) based upon protocols such as Simple Object Access Protocol (SOAP), Representational State Transfer (REST), etc.)). Also, inventory management system 100 may be implemented in one or more electronic devices that is each like electronic device 1900 (e.g., a set of one or more server devices where the software 1928 represents the software to implement the service provided inventory management system 100). Similarly, each of systems 1990 may be implemented in one or more electronic devices that is each like electronic device 1900 (e.g., a set of one or more devices where the software 1928 represents the software to implement one or more of the sub-systems of a categorization scheme(s) system 124).

FIG. 19C

Figure 19C:
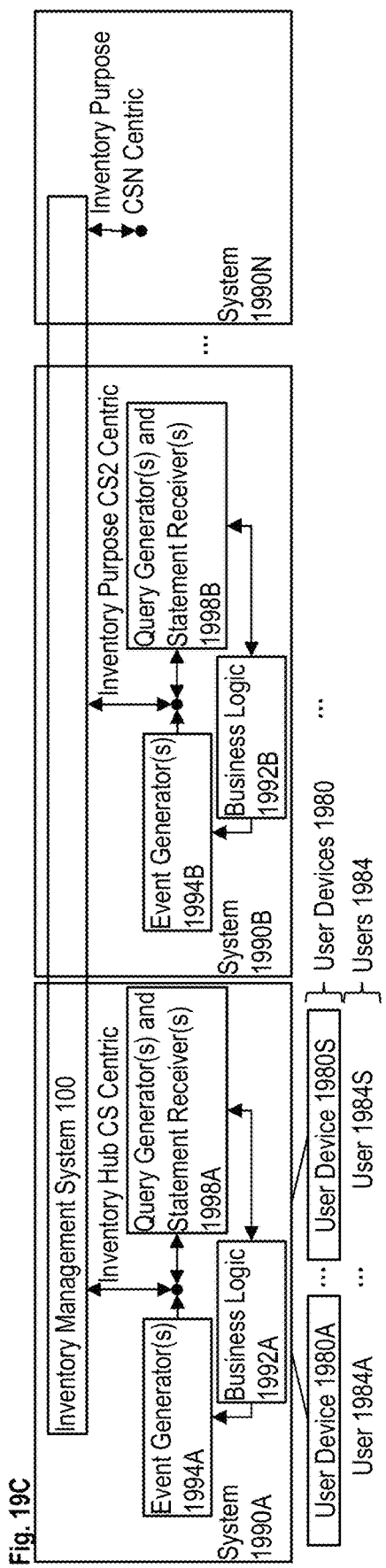
FIG. 19C is a block diagram of a second deployment environment according to some example embodiments.

FIG. 19C is a block diagram of a second deployment environment according to some example embodiments. FIG. 19C is like FIG. 19B, with the differences including that inventory management system 100 is implemented in a distributed manner across the systems 1990. For instance, a set of one or more electronic devices may be used, where each operates as one of systems 1990 and an instance of inventory management system 100. The instances of inventory management system 100 in these electronic devices would stay synchronized. All the above alternatives described with reference to FIG. 19B would apply here as well, apart from those that require inventory management system 100 to be separate from the systems 1990.

FIG. 19D

Figure 19E:
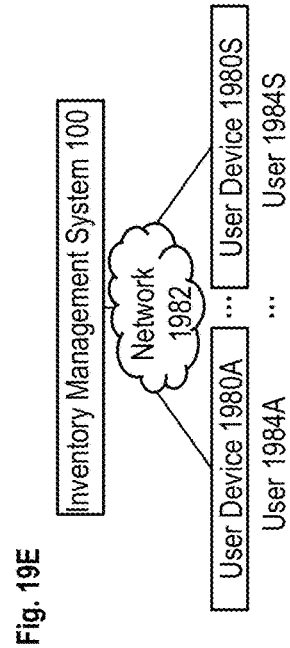
FIG. 19E is a block diagram of a third deployment environment according to some example embodiments.
Figure 19D:
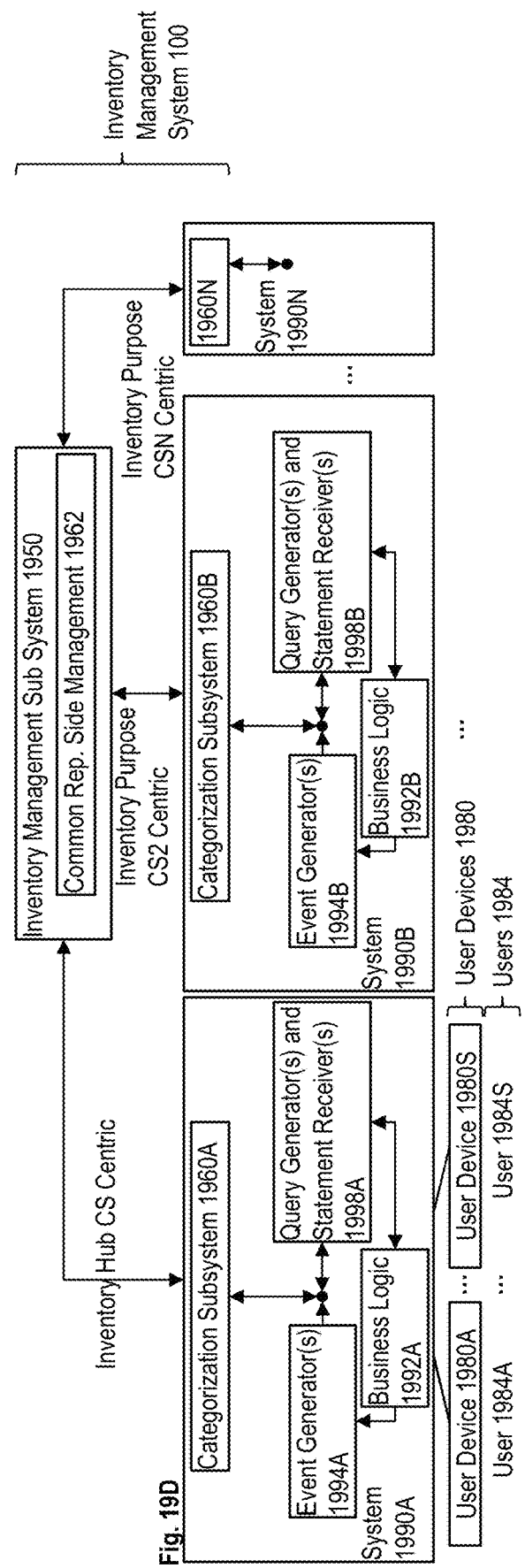
FIG. 19D is a block diagram of a third deployment environment according to some example embodiments.

FIG. 19D is a block diagram of a third deployment environment according to some example embodiments. FIG. 19C is like FIG. 19B and FIG. 19C, except inventory management system 100 is split into multiple sub-systems. Those sub-systems include: 1) inventory management sub-system 1950 that implements common representation side management 1962 and that is separate from systems 1990; and 2) categorization sub-system 1960A to categorization sub-system 1960N respectively implemented in system 1990A to system 1990N. Each of the categorization sub-systems: 1) maintains the categorized side of a different CSS; and 2) interacts with the inventory management sub-system 1950 to maintain the common representation sides of the different CSSs. For example, in some embodiments, responsive to an event submitted to one of the categorization sub-systems 1960: 1) that categorization sub-system would update the categorized side of its CSS and notify the inventory management sub-system 1950; 2) the inventory management sub-system 1950 would update the common representation side for that CSS and propagate the information to the other categorization sub-systems; 3) the other categorization sub-systems would update the categorized sides of their respective CSSs as necessary and notify the inventory management sub-system 1950 as necessary; and 4) inventory management sub-system 1950 would update the common representation side of the CSS of these other categorization sub-systems as necessary.

As another example, in some embodiments, responsive to an event submitted to one of the categorization sub-systems 1960: 1) that categorization sub-system would update the categorized side of its CSS and notify the inventory management sub-system 1950; 2) the inventory management sub-system 1950 would update the common representation side of all CSSs as necessary and propagate the information to the other categorization sub-systems that need to receive it; 3) the other categorization sub-systems would update the categorized sides of their respective CSSs as necessary.

As another example, in some embodiments, responsive to an event submitted to one of the categorization sub-systems 1960: 1) that categorization sub-system would update the categorized side of its CSS and only notify the inventory management sub-system 1950 as necessary (e.g., notify on an exchange type impact/event but not on a transfer type impact/event); 2) the inventory management sub-system 1950 would update the common representation side of all CSSs as necessary and propagate the information to the other categorization sub-systems that need to receive it; 3) the other categorization sub-systems would update the categorized sides of their respective CSSs as necessary. Thus, in such embodiments: 1) each categorization sub-systems 1960 would include a version of mismatch checker 116 to check the type of impact/event and notify inventory management sub-system 1950 as necessary; 2) inventory management sub-system 1950 would include a version of event-based entries generator 112, mismatch checker 116, and mismatch responder 118; 3) inventory management sub-system 1950 would include a version of balances updater 128 to update the relevant common representation sides; and 4) each categorization sub-systems 1960 would include a version of balances updater 128 to update the respective categorized side.

Many of the above alternatives described with reference to FIG. 19B would apply here as well.

FIG. 19E

FIG. 19E is a block diagram of a third deployment environment according to some example embodiments. In FIG. 19E, the user devices 1980 are each themselves operating as both a user device and one of the systems 1990. Each of the user devices 1980 is communicatively coupled via network 1982 with a set of one or more electronic devices implementing inventory management system 100.

Thus, FIG. 19B to FIG. 19E provide various examples of deployment environments. FIG. 19B uses a centralized architecture in which all systems 1990 communicate with inventory management system 100; while FIG. 19E uses a centralized architecture in which all user devices (which themselves implement systems 1990) communicate with inventory management system 100. Compared to FIG. 19B, FIG. 19C uses a distributed architecture. As compared to FIG. 19B and FIG. 19C, FIG. 19D is a hybrid architecture. Where some form of systems already exist that implement different business logic of an organization, a centralized architecture (as compared to a distributed system) will: 1) require less alteration of these systems to integrate inventory management system 100; 2) allow for enforcement of a common communication format for configuration information, events, queries, and statements; and 3) allows for the common representation sides to be co-located.

CONCLUSION

In the above description, numerous specific details such as resource partitioning/sharing/duplication embodiments, types and interrelationships of system components, and logic partitioning/integration choices are set forth to provide a more thorough understanding. The invention may be practiced without such specific details, however. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, and/or characteristic is described in connection with an embodiment, one skilled in the art would know to affect such feature, structure, and/or characteristic in connection with other embodiments whether or not explicitly described.

For example, the figure(s) illustrating flow diagrams sometimes refer to the figure(s) illustrating block diagrams, and vice versa. Whether or not explicitly described, the alternative embodiments discussed with reference to the figure(s) illustrating block diagrams also apply to the embodiments discussed with reference to the figure(s) illustrating flow diagrams, and vice versa. At the same time, the scope of this description includes embodiments, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain embodiments, such order is exemplary and not limiting (e.g., alternative embodiments may perform the operations in a different order, combine certain operations, perform certain operations in parallel, overlap performance of certain operations such that they are partially in parallel, etc.).

While the above description includes several example embodiments, the invention is not limited to the embodiments described and can be practiced with modification and alteration within the spirit and scope of the appended claims. The description is thus illustrative instead of limiting.

What is claimed is:

1. A computer implemented method to support at least a first system and a second system being used to manage an inventory of an organization, wherein the first system and the second system respectively use first and second categorization schemes, which are orthogonal to each other, to categorize the inventory of the organization in different ways, the method comprising:

receiving an event from the first system that reflects a change made to the inventory relative to the first categorization scheme;

generating a first entry that is based on the event, that is for the first categorization scheme, that identifies a type of item in the inventory, and that identifies a first quantity of the type of item, the first quantity is to be used a first way to perform an update to a first balance for a combination of the type of item and a first category of the first categorization scheme, and the first quantity is to be used a second way to perform a second update to a second balance that is for the type of item and that is irrespective of the first categorization scheme, wherein the first way is opposite to the second way;

automatically determining a reconciliation is required between the first and second systems because no entry was generated based on the event for the second categorization scheme;

responsive to the determining, automatically generating as part of the reconciliation a second entry that is based on the event, that is for the second categorization scheme, and that identifies the type of item in the inventory, the first quantity of the type of item, the first quantity is to be used the second way to perform a third update to a third balance that is for the type of item and that is irrespective of the second categorization scheme, and the first quantity is to be used the first way to perform a fourth update to a fourth balance that is for a combination of the type of item and a default category of the second categorization scheme, wherein the second entry aligns the balances between the first and second systems without requiring categorization according to the second categorization scheme as part of the reconciliation between the first and second systems caused at least in part by the event; and generating, based on a non-zero balance for the combination of the type of item and the default category of the second categorization scheme, a report that indicates categorization is needed to complete the reconciliation between the first and second systems caused at least in part by the event.

2. The method of claim 1, further comprising:
performing the fourth update to generate an updated version of the fourth balance; and
providing data based on the updated version of the fourth balance to the second system to provide to a user to make a decision.

3. The method of claim 1, wherein the event is of a first type that reflects an agreement to exchange or an actual exchange of a quantity of items in the real world.

4. The method of claim 1, further comprises:
responsive to receiving the event, generating a respective event ID and storing the event and the respective event ID in a log that stores other events and respective event IDs; and
wherein the generating the report includes:
determining, based on the type of item, a set of one or more of entries that contributed to the non-zero balance;
determining a set of one or more of the event IDs are associated with the set of one or more of the entries; and
accessing a set of one or more of the events from the log based on the set of one or more of the event IDs.

5. The method of claim 4, wherein the automatically determining is performing a mismatch detection step of reconciliation, wherein the automatically generating is an alignment step of reconciliation, and wherein the generating the report is to ease performance of an explanation step of reconciliation.

6. The method of claim 1, wherein the method further comprises:

receiving second event from the second system that reflects a second change made to the inventory relative to the second categorization scheme; and generating a third entry that is based on the second event, that is for the second categorization scheme, that identifies the type of item, that identifies a second quantity of the type of item, that identifies the default category, that identifies another category of the second categorization scheme, that indicates the second way to perform a fifth update to the fourth balance, and that indicates the first way to perform a sixth update to the third balance.

7. The method of claim 1, wherein at least one of the first entry and the second entry also identifies one of a plurality of segments that add a dimension to the respective one of the first categorization scheme and the second categorization scheme.

8. The method of claim 1, wherein the first categorization scheme includes a hierarchy of categories, wherein the hierarchy includes a plurality of leaf categories, wherein the first category of the first categorization scheme is one of the plurality of leaf categories, and wherein the method further comprises:
generating a report that includes a specific category that is in the plurality of categories, wherein a subset of the plurality of leaf categories depend from the specific category directly or indirectly, and wherein the report also includes a quantity for the specific category that is based on combining balances for the subset of the plurality of leaf categories.

9. The method of claim 1, further comprising:
automatically determining, based on configuration data and the event, that no entry should be generated for a third categorization scheme, wherein the third categorization scheme is orthogonal to each the first and second categorization schemes, wherein the third categorization scheme is used to manage only certain aspects of the inventory.

10. The method of claim 1, wherein the method further comprises:
receiving a second event from a particular system that is one of the first system and the second system, wherein the second event reflects a second change made to the inventory relative to at least one of the first categorization scheme and the second categorization scheme;
generating a set of one or more entries based on the second event, wherein the set of entries represent one of a plurality of different types, wherein the types include an exchange type and a transfer type;
determining either that there is a mismatch or that the set of one or more entries includes one entry for each of the first categorization scheme and the second categorization scheme that should have one, wherein:
when the set of entries represents the exchange type, the set of entries should include at least separate entries for the first categorization scheme and the second categorization scheme, wherein the separate entries identify one of a plurality of item IDs, a second quantity, opposite ones of the first way and the second way to perform updates to balances kept for a combination of the identified one of the plurality of item IDs and respective categories from the first categorization scheme and the second categorization scheme, and opposite ones of the first way and the second way to perform updates to balances kept for the identified one of the plurality of item IDs and that are irrespective of the first categorization scheme and the second categorization scheme; and when the set of entries represents the transfer type, the set of entries should include one entry that is for the particular one of the first categorization scheme and the second categorization scheme, that identifies a set of two categories in that categorization scheme, and opposite ones of the first way and the second way to perform updates to balances kept for a combination of the identified one of the plurality of item IDs and each of the set of categories from that categorization scheme;

when it is determined that there is a mismatch, taking corrective action; and when it is determined that there is not a mismatch, updating the balances according to the set of one or more entries.

11. The method of claim 1, wherein the first categorization scheme and the second categorization scheme are part of a plurality of categorization schemes, wherein the first system and the second system are part of a plurality of systems, the method comprising:

receiving additional events from different ones of the plurality of systems, wherein the event and at least some of the additional events are of a first type, wherein events of the first type are events that reflect an agreement or an actual exchange of quantities of the items in the real world, wherein some of the additional events are of a second type, wherein a plurality of item IDs is used to distinguish between different types of items in the inventory, and wherein at least one of the plurality of items IDs is identified for each of the events; and updating, based on the additional events, balances of quantities of different ones of the item IDs, wherein the updating includes:

generating, for each of the additional events, a complete set of one or more entries, wherein the generating the complete set comprises:

generating an initial set of one or more of the entries for the additional event, wherein:

for the additional events of the first type, each entry in the initial set indicates:

a specific category within the one of the plurality of categorization schemes for which the entry was generated, and an assignment of opposite ones of the first way and the second way to be used to update a first pair of the balances, wherein the first pair of the balances include one that is based on the item ID identified for the entry and one that is based on a combination of the item ID identified for the entry and the specific category; and for the events of the second type, each entry in the initial set indicates:

two specific categories within that categorization scheme, and an assignment of opposite ones of the first way and the second way that is to be used to update a second pair of the balances, wherein the second pair includes one that is based on the item ID identified for the entry and one of the two specific categories, and wherein the second pair includes one that is based on a combination of the item ID identified for the entry and the other of the two specific categories;

determining if any additional entries should be generated;

automatically generating, based on the determining, any additional entries, wherein:

for the additional events of the first type, each additional entry indicates:

a default category within the one of the plurality of categorization schemes for which the additional entry was generated, and an assignment of opposite ones of the first way and the second way to be used to update a third pair of the balances, wherein the third pair of the balances include one that is based on the item ID identified for the entry and one that is based on a combination of the item ID identified for the entry and the default category; and updating the balances based on the complete set of entries.

12. The method of claim 1, wherein:

a first categorization scheme state and a second categorization scheme state store the balances for respective ones of the first categorization scheme and the second categorization scheme, wherein each of the first categorization scheme state and the second categorization scheme state comprises:

a categorized side that includes balances of the inventory broken down by combinations of the types of items and categories of the respective one of the first categorization scheme and the second categorization scheme; and a common representation side that includes balances of the inventory broken down the types of items irrespective of any categorization scheme;

each of the first entry and the second entry is a double legged entry that manages both the categorized side and the common representation side of the respective one of the first categorization scheme state and the second categorization scheme state;

the automatically determining and the automatically generating are automatic mismatch detection and automatic alignment responsive to a detected mismatch, wherein the second entry is based on the second update of the first entry, wherein the second update is for the common representation side of the first categorization scheme state; and transmitting, to at least the second system, the report based on the second categorization scheme state, wherein the report includes an updated version of the fourth balance that was updated as a result of the second entry generated by the automatic alignment.

13. The method of claim 1, wherein the inventory includes various types of items, and wherein a plurality of item IDs is used to distinguish between the various types of items.

14. The method of claim 13, wherein:

the type of item is assigned a first item ID of the plurality of item IDs, the event identifies the first item ID, the first quantity of the type of item, the first quantity is to be used a first way to perform an update to a first balance, one of two opposite effects, and a set of one or more characteristics, and the generating the first entry comprises:

determining, based on the set of one or more characteristics, the first entry is for the first categorization scheme; and determining, based on the first entry being for the first categorization scheme the one of the two opposite effects, the first way is to be used to perform the update to the first balance and the second way is to be used to perform the second update.

15. A non-transitory computer readable storage medium that provides instructions that, when executed by an inventory management system, causes the inventory management system to perform operations comprising:
receiving, from a first system, an event that reflects a change made to an inventory relative to a first categorization scheme, wherein the inventory management system is to support at least the first system and a second system being used to manage the inventory of an organization, wherein the first system and the second system respectively use the first categorization scheme and a second categorization scheme, which are orthogonal to each other, to categorize the inventory of the organization in different ways;
generating a first entry that is based on the event, that is for the first categorization scheme, that identifies a type of item in the inventory, and that identifies a first quantity of the type of item, the first quantity is to be used a first way to perform an update to a first balance for a combination of the type of item and a first category of the first categorization scheme, and the first quantity is to be used a second way to perform a second update to a second balance that is for the type of item and that is irrespective of the first categorization scheme, wherein the first way is opposite to the second way;
automatically determining a reconciliation is required between the first and second systems because no entry was generated based on the event for the second categorization scheme;
responsive to the determining, automatically generating a second entry that is based on the event, that is for the second categorization scheme, and that identifies the type of item in the inventory, the first quantity of the type of item, the first quantity is to be used the second way to perform a third update to a third balance that is for the type of item and that is irrespective of the second categorization scheme, and the first quantity is to be used the first way to perform a fourth update to a fourth balance that is for a combination of the type of item and a default category of the second categorization scheme, wherein the second entry aligns the balances between the first and second systems without requiring categorization according to the second categorization scheme as part of the reconciliation between the first and second systems caused at least in part by the event; and
generating, based on a non-zero balance for the combination of the type of item and the default category of the second categorization scheme, a report that indicates categorization is needed to complete the reconciliation between the first and second systems caused at least in part by the event.

16. The non-transitory computer readable storage medium of claim 15, wherein the operations further comprise:
performing the fourth update to generate an updated version of the fourth balance; and
providing data based on the updated version of the fourth balance to the second system to provide to a user to make a decision.

17. The non-transitory computer readable storage medium of claim 15, wherein the event is of a first type that reflects an agreement to exchange or an actual exchange of a quantity of items in the real world.

18. The non-transitory computer readable storage medium of claim 15, wherein the operations further comprise:
responsive to receiving the event, generating a respective event ID and storing the event and the respective event ID in a log that stores other events and respective event IDs; and
wherein the generating the report includes:
determining, based on the type of item, a set of one or more of entries that contributed to the non-zero balance;
determining a set of one or more of the event IDs are associated with the set of one or more of the entries; and
accessing a set of one or more of the events from the log based on the set of one or more of the event IDs.

19. The non-transitory computer readable storage medium of claim 18, wherein the automatically determining is performing a mismatch detection step of reconciliation, wherein the automatically generating is an alignment step of reconciliation, and wherein the generating the report is to ease performance of an explanation step of reconciliation.

20. The non-transitory computer readable storage medium of claim 15, wherein the operations further comprise:
receiving second event from the second system that reflects a second change made to the inventory relative to the second categorization scheme; and
generating a third entry that is based on the second event, that is for the second categorization scheme, that identifies the type of item, that identifies a second quantity of the type of item, that identifies the default category, that identifies another category of the second categorization scheme, that indicates the second way to perform a fifth update to the fourth balance, and that indicates the first way to perform a sixth update to the third balance.

21. The non-transitory computer readable storage medium of claim 15, wherein at least one of the first entry and the second entry also identifies one of a plurality of segments that add a dimension to the respective one of the first categorization scheme and the second categorization scheme.

22. The non-transitory computer readable storage medium of claim 15, wherein the first categorization scheme includes a hierarchy of categories, wherein the hierarchy includes a plurality of leaf categories, wherein the first category of the first categorization scheme is one of the plurality of leaf categories, and wherein the operations further comprise:
generating a report that includes a specific category that is in the plurality of categories, wherein a subset of the plurality of leaf categories depend from the specific category directly or indirectly, and wherein the report also includes a quantity for the specific category that is based on combining balances for the subset of the plurality of leaf categories.

23. The non-transitory computer readable storage medium of claim 15, wherein the operations further comprise:
automatically determining, based on configuration data and the event, that no entry should be generated for a third categorization scheme, wherein the third categorization scheme is orthogonal to each the first and second categorization schemes, wherein the third categorization scheme is used to manage only certain aspects of the inventory.

24. The non-transitory computer readable storage medium of claim 15, wherein the operations further comprise:
receiving a second event from a particular system that is one of the first system and the second system, wherein the second event reflects a second change made to the inventory relative to at least one of the first categorization scheme and the second categorization scheme;

generating a set of one or more entries based on the second event, wherein the set of entries represent one of a plurality of different types, wherein the types include an exchange type and a transfer type;

determining either that there is a mismatch or that the set of one or more entries includes one entry for each of the first categorization scheme and the second categorization scheme that should have one, wherein:

when the set of entries represents the exchange type, the set of entries should include at least separate entries for the first categorization scheme and the second categorization scheme, wherein the separate entries identify one of a plurality of item IDs, a second quantity, opposite ones of the first way and the second way to perform updates to balances kept for a combination of the identified one of the plurality of item IDs and respective categories from the first categorization scheme and the second categorization scheme, and opposite ones of the first way and the second way to perform updates to balances kept for the identified one of the plurality of item IDs and that are irrespective of the first categorization scheme and the second categorization scheme; and when the set of entries represents the transfer type, the set of entries should include one entry that is for the particular one of the first categorization scheme and the second categorization scheme, that identifies a set of two categories in that categorization scheme, and opposite ones of the first way and the second way to perform updates to balances kept for a combination of the identified one of the plurality of item IDs and each of the set of categories from that categorization scheme;

when it is determined that there is a mismatch, taking corrective action; and when it is determined that there is not a mismatch, updating the balances according to the set of one or more entries.

25. The non-transitory computer readable storage medium of claim 15, wherein the first categorization scheme and the second categorization scheme are part of a plurality of categorization schemes, wherein the first system and the second system are part of a plurality of systems, and where the operations further comprise:

receiving additional events from different ones of the plurality of systems, wherein the event and at least some of the additional events are of a first type, wherein events of the first type are events that reflect an agreement or an actual exchange of quantities of the items in the real world, wherein some of the additional events are of a second type, wherein a plurality of item IDs is used to distinguish between different types of items in the inventory, and wherein at least one of the plurality of items IDs is identified for each of the events; and updating, based on the additional events, balances of quantities of different ones of the item IDs, wherein the updating includes:

generating, for each of the additional events, a complete set of one or more entries, wherein the generating the complete set comprises:

generating an initial set of one or more of the entries for the additional event, wherein:

for the additional events of the first type, each entry in the initial set indicates:

a specific category within the one of the plurality of categorization schemes for which the entry was generated, and an assignment of opposite ones of the first way and the second way to be used to update a first pair of the balances, wherein the first pair of the balances include one that is based on the item ID identified for the entry and one that is based on a combination of the item ID identified for the entry and the specific category; and for the events of the second type, each entry in the initial set indicates:

two specific categories within that categorization scheme, and an assignment of opposite ones of the first way and the second way that is to be used to update a second pair of the balances, wherein the second pair includes one that is based on the item ID identified for the entry and one of the two specific categories, and wherein the second pair includes one that is based on a combination of the item ID identified for the entry and the other of the two specific categories;

determining if any additional entries should be generated;

automatically generating, based on the determining, any additional entries, wherein:

for the additional events of the first type, each additional entry indicates:

a default category within the one of the plurality of categorization schemes for which the additional entry was generated, and an assignment of opposite ones of the first way and the second way to be used to update a third pair of the balances, wherein the third pair of the balances include one that is based on the item ID identified for the entry and one that is based on a combination of the item ID identified for the entry and the default category; and updating the balances based on the complete set of entries.

26. The non-transitory computer readable storage medium of claim 15, wherein:

a first categorization scheme state and a second categorization scheme state store the balances for respective ones of the first categorization scheme and the second categorization scheme, wherein each of the first categorization scheme state and the second categorization scheme state comprises:

a categorized side that includes balances of the inventory broken down by combinations of the types of items and categories of the respective one of the first categorization scheme and the second categorization scheme; and a common representation side that includes balances of the inventory broken down the types of items irrespective of any categorization scheme;

each of the first entry and the second entry is a double legged entry that manages both the categorized side and the common representation side of the respective one of the first categorization scheme state and the second categorization scheme state;

the automatically determining and the automatically generating are automatic mismatch detection and automatic alignment responsive to a detected mismatch, wherein the second entry is based on the second update of the first entry, wherein the second update is for the common representation side of the first categorization scheme state; and transmitting, to at least the second system, the report based on the respective the second categorization scheme state, wherein the report includes an updated version of the fourth balance that was updated as a result of the second entry generated by the automatic alignment.

27. The non-transitory computer readable storage medium of claim 15, wherein the inventory includes various types of items, and wherein a plurality of item IDs is used to distinguish between the various types of items.

28. The non-transitory computer readable storage medium of claim 27, wherein:

the type of item is assigned a first item ID of the plurality of item IDs, the event identifies the first item ID, the first quantity of the type of item, the first quantity is to be used a first way to perform an update to a first balance, one of two opposite effects, and a set of one or more characteristics, and the generating the first entry comprises:

determining, based on the set of one or more characteristics, the first entry is for the first categorization scheme; and determining, based on the first entry being for the first categorization scheme the one of the two opposite effects, the first way is to be used to perform the update to the first balance and the second way is to be used to perform the second update.

\* \* \* \* \*